United States Patent
Shin et al.

(10) Patent No.: US 12,231,372 B2
(45) Date of Patent: Feb. 18, 2025

(54) METHOD AND DEVICE FOR TRANSMITTING AND RECEIVING SIGNALS IN WIRELESS COMMUNICATION SYSTEM

(71) Applicant: LG ELECTRONICS INC., Seoul (KR)

(72) Inventors: Seokmin Shin, Seoul (KR); Seonwook Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 204 days.

(21) Appl. No.: 17/912,448

(22) PCT Filed: Mar. 16, 2021

(86) PCT No.: PCT/KR2021/003238
§ 371 (c)(1),
(2) Date: Sep. 16, 2022

(87) PCT Pub. No.: WO2021/187866
PCT Pub. Date: Sep. 23, 2021

(65) Prior Publication Data
US 2023/0155799 A1    May 18, 2023

(30) Foreign Application Priority Data

Mar. 16, 2020   (KR) .................. 10-2020-0031900
Mar. 16, 2020   (KR) .................. 10-2020-0031922
(Continued)

(51) Int. Cl.
*H04L 27/26*    (2006.01)
*H04L 5/00*     (2006.01)

(52) U.S. Cl.
CPC .......... *H04L 5/0092* (2013.01); *H04L 5/0035* (2013.01); *H04L 27/2607* (2013.01)

(58) Field of Classification Search
CPC ............... H04J 11/0073; H04J 11/0076; H04J 11/0079; H04L 27/26025; H04L 27/2607;
(Continued)

(56) References Cited

U.S. PATENT DOCUMENTS

2019/0159180 A1   5/2019   Ly et al.
2021/0045144 A1*  2/2021   Kim ..................... H04W 16/28

FOREIGN PATENT DOCUMENTS

| CA | 3124306    | 2/2020  |
| WO | 2019156472 | 8/2019  |
| WO | 2019190251 | 10/2019 |

OTHER PUBLICATIONS

Xiaomi, "On NR-U initial access signals/channels," 3GPP TSG-RAN WG1 #98b, R1-1911292, Oct. 2019, 6 pages.
(Continued)

*Primary Examiner* — Melvin C Marcelo
*Assistant Examiner* — Natali Pascual Peguero
(74) *Attorney, Agent, or Firm* — LEE, HONG, DEGERMAN, KANG & WAIMEY

(57) ABSTRACT

In a method and a device for transmitting and receiving signals in a wireless communication system according to an embodiment of the present invention, N control resource set #0s (CORESET #0s) are received on the basis of first
(Continued)

subcarrier spacing (SCS), and N synchronization signal blocks (SSBs) are received on the basis of second SCS. The SSBs are continuously located in the time domain. The CORESET #0s are located in a slot to which a most advanced SSB in the time domain from among the SSBs belongs, and are continuously located from symbol #0 within the slot.

15 Claims, 113 Drawing Sheets

(30) Foreign Application Priority Data

| | | |
|---|---|---|
| Mar. 16, 2020 | (KR) | 10-2020-0031934 |
| Aug. 5, 2020 | (KR) | 10-2020-0098189 |
| Aug. 6, 2020 | (KR) | 10-2020-0098771 |

(58) Field of Classification Search
CPC . H04L 27/261; H04L 27/2666; H04L 5/0007; H04L 5/0035; H04L 5/0092; H04L 5/005; H04L 5/0053; H04W 48/08; H04W 56/001; H04W 72/0446; H04W 72/0453; H04W 72/23

See application file for complete search history.

(56) References Cited

OTHER PUBLICATIONS

Spreadtrum Communications, "Discussion on initial access and mobility in NR-U," 3GPP TSG-RAN WG1 Meeting #98bis, R1-1910015, Oct. 2019, 17 pages.

Ericsson, "SSB rather design of Rel-16 NR-U for 5GHz band," 3GPP TSG-RAN4 Meeting #92bis, R4-1912017, Oct. 2019, 10 pages.

Qualcomm Incorporated, "DL signals and channels for NR-U," 3GPP TSG-RAN WG1 Meeting AH-1901, R1-1900871, Jan. 2019, 11 pages.

Nokia, Nokia Shanghai Bell, "On the Frame structure and Wideband operation for NR-U," 3GPP TSG-RAN WG1 Meeting #95, R1-1812697, Nov. 2018, 16 pages.

PCT International Application No. PCT/KR2021/003238, International Search Report dated Jun. 29, 2021, 3 pages.

European Patent Office Application Serial No. 21770472.5, Search Report dated Apr. 2, 2024, 10 pages.

LG Electronics, "Physical layer design of initial access signals and channels for NR-U," 3GPP TSG RAN WG1 #96bis, R1-1904619, Apr. 2019, 16 pages.

* cited by examiner (a) Carrier aggregation between L-band and U-band (b) Standalone U-band(s)

FIG. 18

| (120 kHz for $\mu_1$) | | #0 | | #01 | | #2 | | #3 | | #4 | | #5 | |
|---|---|---|---|---|---|---|---|---|---|---|---|---|---|
| | SCS | CP | Symbol | CP | Symbol | CP | Symbol | CP | Symbol | CP | Symbol | CP | Symbol |
| slot n, slot n $+2^{\mu_1-1}$ | 120 | 4160 | 16384 | 4160 | 16384 | 4160 | 16384 | 4160 | 16384 | 4160 | 16384 | 4160 | 16384 |
| | 240 | 2080 | 8192 | 2080 | 8192 | 2080 | 8192 | 2080 | 8192 | 2080 | 8192 | 2080 | 8192 |
| | 480 | 1040 | 4096 | 1040 | 4096 | 1040 | 4096 | 1040 | 4096 | 1040 | 4096 | 1040 | 4096 |
| | SCS | CP | Symbol | CP | Symbol | CP | Symbol | CP | Symbol | CP | Symbol | CP | Symbol |
| other slot | 120 | 4074.667 | 16384 | 4074.667 | 16384 | 4074.667 | 16384 | 4074.667 | 16384 | 4074.667 | 16384 | 4074.667 | 16384 |
| | 240 | 2037.333 | 8192 | 2037.333 | 8192 | 2037.333 | 8192 | 2037.333 | 8192 | 2037.333 | 8192 | 2037.333 | 8192 |
| | 480 | 1018.667 | 4096 | 1018.667 | 4096 | 1018.667 | 4096 | 1018.667 | 4096 | 1018.667 | 4096 | 1018.667 | 4096 |

FIG. 19

| (120 kHz for $\mu_1$) | | #0 | | #01 | | #2 | | #3 | | #4 | | #5 | |
|---|---|---|---|---|---|---|---|---|---|---|---|---|---|
| | SCS | CP | Symbol | CP | Symbol | CP | Symbol | CP | Symbol | CP | Symbol | CP | Symbol |
| First half of slot n, slot n + $2^{\mu_1 - 1}$ | 120 | 4245.333 | 16384 | 4245.333 | 16384 | 4245.333 | 16384 | 4245.333 | 16384 | 4245.333 | 16384 | 4245.333 | 16384 |
| | 240 | 2122.667 | 8192 | 2122.667 | 8192 | 2122.667 | 8192 | 2122.667 | 8192 | 2122.667 | 8192 | 2122.667 | 8192 |
| | 480 | 1061.333 | 4096 | 1061.333 | 4096 | 1061.333 | 4096 | 1061.333 | 4096 | 1061.333 | 4096 | 1061.333 | 4096 |
| | SCS | CP | Symbol | CP | Symbol | CP | Symbol | CP | Symbol | CP | Symbol | CP | Symbol |
| other slot | 120 | 4074.667 | 16384 | 4074.667 | 16384 | 4074.667 | 16384 | 4074.667 | 16384 | 4074.667 | 16384 | 4074.667 | 16384 |
| | 240 | 2037.333 | 8192 | 2037.333 | 8192 | 2037.333 | 8192 | 2037.333 | 8192 | 2037.333 | 8192 | 2037.333 | 8192 |
| | 480 | 1018.667 | 4096 | 1018.667 | 4096 | 1018.667 | 4096 | 1018.667 | 4096 | 1018.667 | 4096 | 1018.667 | 4096 |

[FIG. 112]
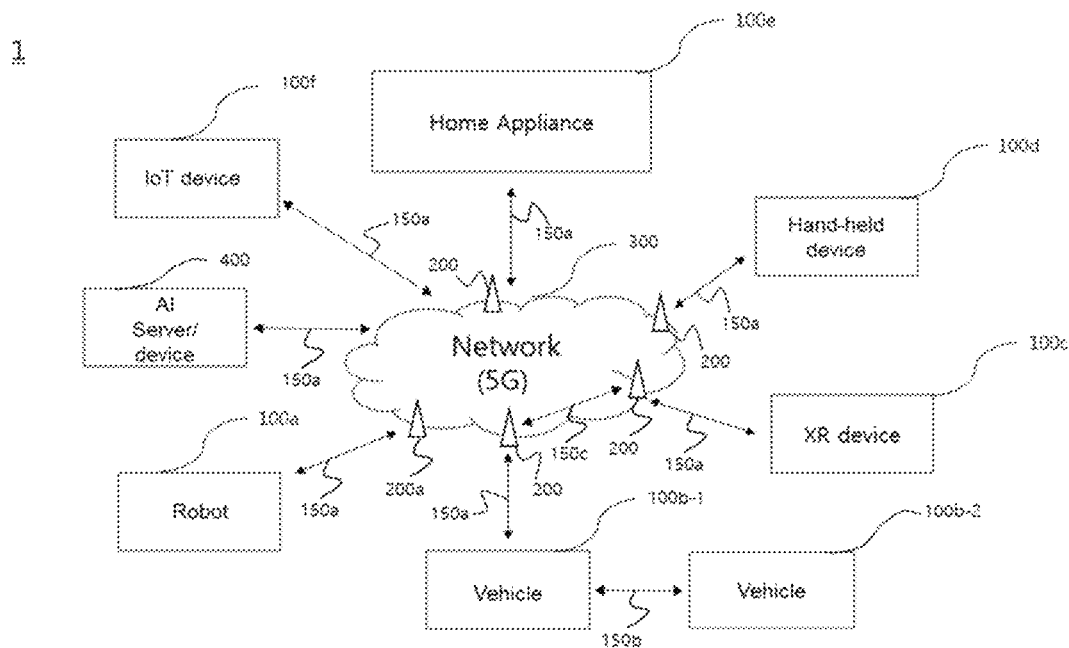
[FIG. 113]
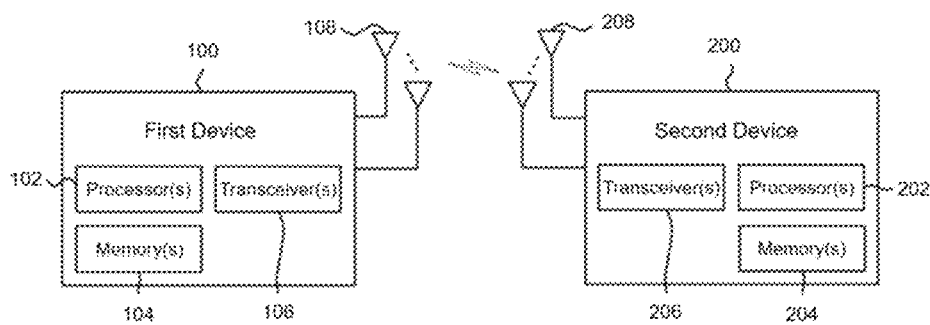

[FIG. 114]
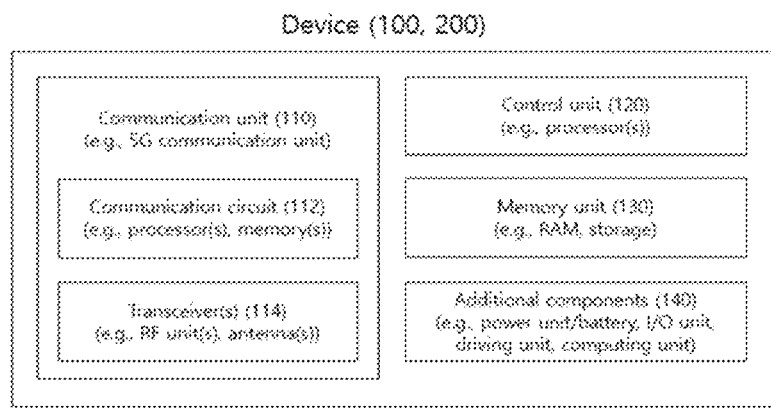
[FIG. 115]
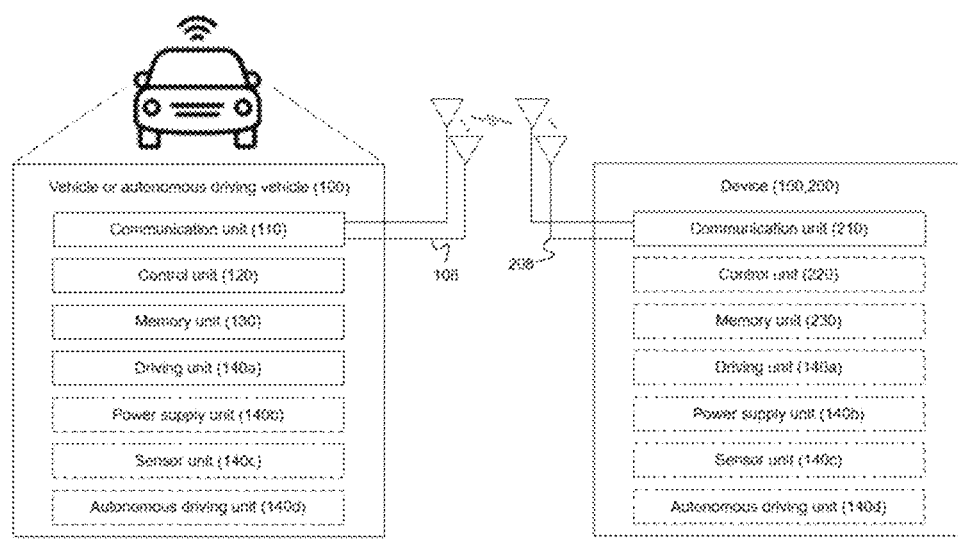

METHOD AND DEVICE FOR TRANSMITTING AND RECEIVING SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2021/003238, filed on Mar. 16, 2021, which claims the benefit of earlier filing date and right of priority to Korean Application Nos. 10-2020-0031900, filed on Mar. 16, 2020, 10-2020-0031922, filed on Mar. 16, 2020, 10-2020-0031934, filed Mar. 16, 2020, 10-2020-0098189, filed on Aug. 5, 2020, and 10-2020-0098771, filed on Aug. 6, 2020, the contents of which are all incorporated by reference herein in their entirety.

TECHNICAL FIELD

The present disclosure relates to a method and apparatus for use in a wireless communication system. More particularly, the present disclosure relates to a method and apparatus for transmitting and receiving a signal related to initial access.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

DISCLOSURE

Technical Problem

The object of the present disclosure is to provide a method and apparatus for performing an initial access procedure efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for transmitting and receiving a signal in a wireless communication system.

In one aspect of the present disclosure, there is provided a method of transmitting and receiving a signal by a user equipment (UE) in a wireless communication system. The method may include: receiving N control resource set #0s (CORESET #0s) based on a first subcarrier spacing (SCS); and receiving N synchronization signal blocks (SSBs) based on a second SCS. The SSBs may be continuously located in a time domain. The CORESET #0s may be located in a slot including an earliest SSB in the time domain among the SSBs, and the CORESET #0s may be continuously located from symbol #0 in the slot.

In another aspect of the present disclosure, there is provided a UE configured to transmit and receive a signal in a wireless communication system. The UE may include: at least one transceiver; at least one processor; and at least one memory operably connected to the at least one processor and configured to store instructions that, when executed, cause the at least one processor to perform operations. The operations may include: receiving N CORESET #0s based on a first SCS; and receiving N SSBs based on a second SCS. The SSBs may be continuously located in a time domain. The CORESET #0s may be located in a slot including an earliest SSB in the time domain among the SSBs, and the CORESET #0s may be continuously located from symbol #0 in the slot.

In another aspect of the present disclosure, there is provided an apparatus for a UE. The apparatus may include: at least one processor; and at least one computer memory operably connected to the at least one processor and configured to, when executed, cause the at least one processor to perform operations. The operations may include: receiving N CORESET #0s based on a first SCS; and receiving N SSBs based on a second SCS. The SSBs may be continuously located in a time domain. The CORESET #0s may be located in a slot including an earliest SSB in the time domain among the SSBs, and the CORESET #0s may be continuously located from symbol #0 in the slot.

In another aspect of the present disclosure, there is provided a computer-readable storage medium having at least one computer program configured to cause at least one processor to perform operations. The operations may include: receiving N CORESET #0s based on a first SCS; and receiving N SSBs based on a second SCS. The SSBs may be continuously located in a time domain. The CORESET #0s may be located in a slot including an earliest SSB in the time domain among the SSBs, and the CORESET #0s may be continuously located from symbol #0 in the slot.

In another aspect of the present disclosure, there is provided a method of transmitting and receiving a signal by a base station in a wireless communication system. The method may include: transmitting N CORESET #0s based on a first SCS; and transmitting N SSBs based on a second SCS. The SSBs may be continuously located in a time domain. The CORESET #0s may be located in a slot including an earliest SSB in the time domain among the SSBs, and the CORESET #0s may be continuously located from symbol #0 in the slot.

In a further aspect of the present disclosure, there is provided a base station configured to transmit and receive a signal in a wireless communication system. The base station may include: at least one transceiver; at least one processor; and at least one memory operably connected to the at least one processor and configured to store instructions that, when executed, cause the at least one processor to perform operations. The operations may include: transmitting N CORESET #0s based on a first SCS; and transmitting N SSBs based on a second SCS. The SSBs may be continuously located in a time domain. The CORESET #0s may be located in a slot including an earliest SSB in the time domain among the SSBs, and the CORESET #0s may be continuously located from symbol #0 in the slot.

In the methods and apparatuses, the first SCS may be twice the second SCS.

In the methods and apparatuses, a first extended cyclic prefix (ECP) may be applied to the CORESET #0s, and a second ECP may be applied to the SSBs.

In the methods and apparatuses, the first ECP may be configured such that a length of one slot with a reference SCS matches a length of M slots, and the second ECP may be configured such that the length of the one slot with the reference SCS matches a length of L slots. In this case, M and L may be $2^{\mu 2-\mu 1}$ and $2^{\mu 3-\mu 1}$, respectively, where µ1 denotes a value of µ related to the reference SCS, µ2 denotes a value of µ related to the first SCS, and µ3 denotes a value of µ related to the second SCS.

The ECP may be configured such that a length of a half-slot with a reference SCS matches a length of M slots, and the second ECP may be configured such that the length of the half-slot with the reference SCS matches a length of L slots. In this case, M and L may be $2^{\mu 2-\mu 1-1}$ and $2^{\mu 3-\mu 1-1}$, respectively, where µ1 denotes a value of g related to the reference SCS, µ2 denotes a value of µ related to the first SCS, and µ3 denotes a value of µ related to the second SCS.

The communication apparatus may include an autonomous driving vehicle communicable with at least a UE, a network, and another autonomous driving vehicle other than the communication apparatus.

The above-described aspects of the present disclosure are only some of the preferred embodiments of the present disclosure, and various embodiments reflecting the technical features of the present disclosure may be derived and understood from the following detailed description of the present disclosure by those skilled in the art.

Advantageous Effects

According to an embodiment of the present disclosure, a communication apparatus may perform an initial access procedure more efficiently in a different way from the prior art.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIGS. 112 to 115 illustrate devices according to an embodiment of the present disclosure.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

3GPP LTE 36.211: Physical channels and modulation
36.212: Multiplexing and channel coding
36.213: Physical layer procedures
36.300: Overall description
36.331: Radio Resource Control (RRC)

Figure 1:
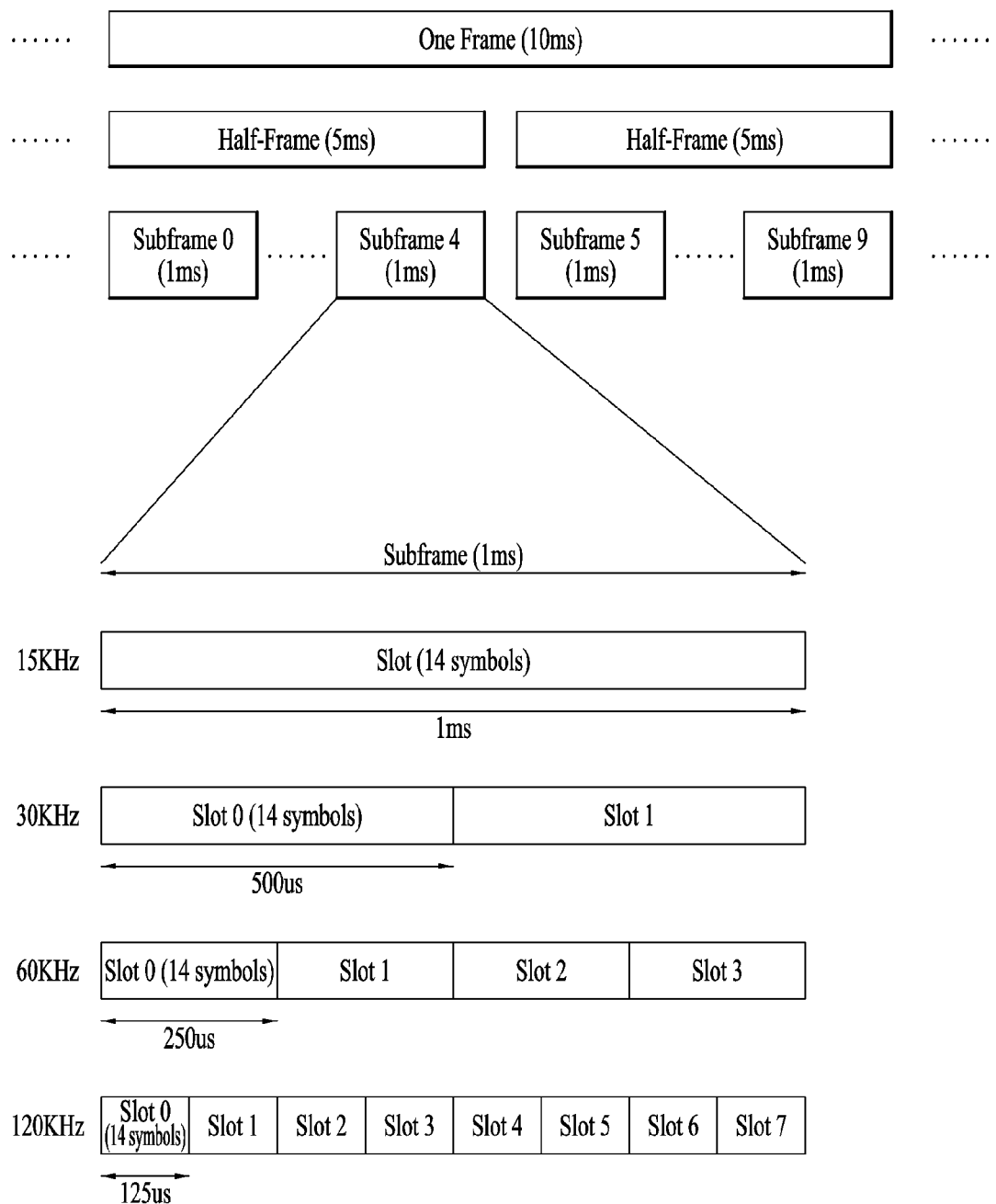
FIG. 1 illustrates a radio frame structure.

3GPP NR 38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (n = 3) | 14 | 80 | 8 |
| 240 KHZ (u = 4) | 14 | 160 | 16 |

* $N^{slot}_{symb}$: number of symbols in a slot
* $N^{frame, u}_{slot}$: number of slots in a frame
* $N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

Figure 2:
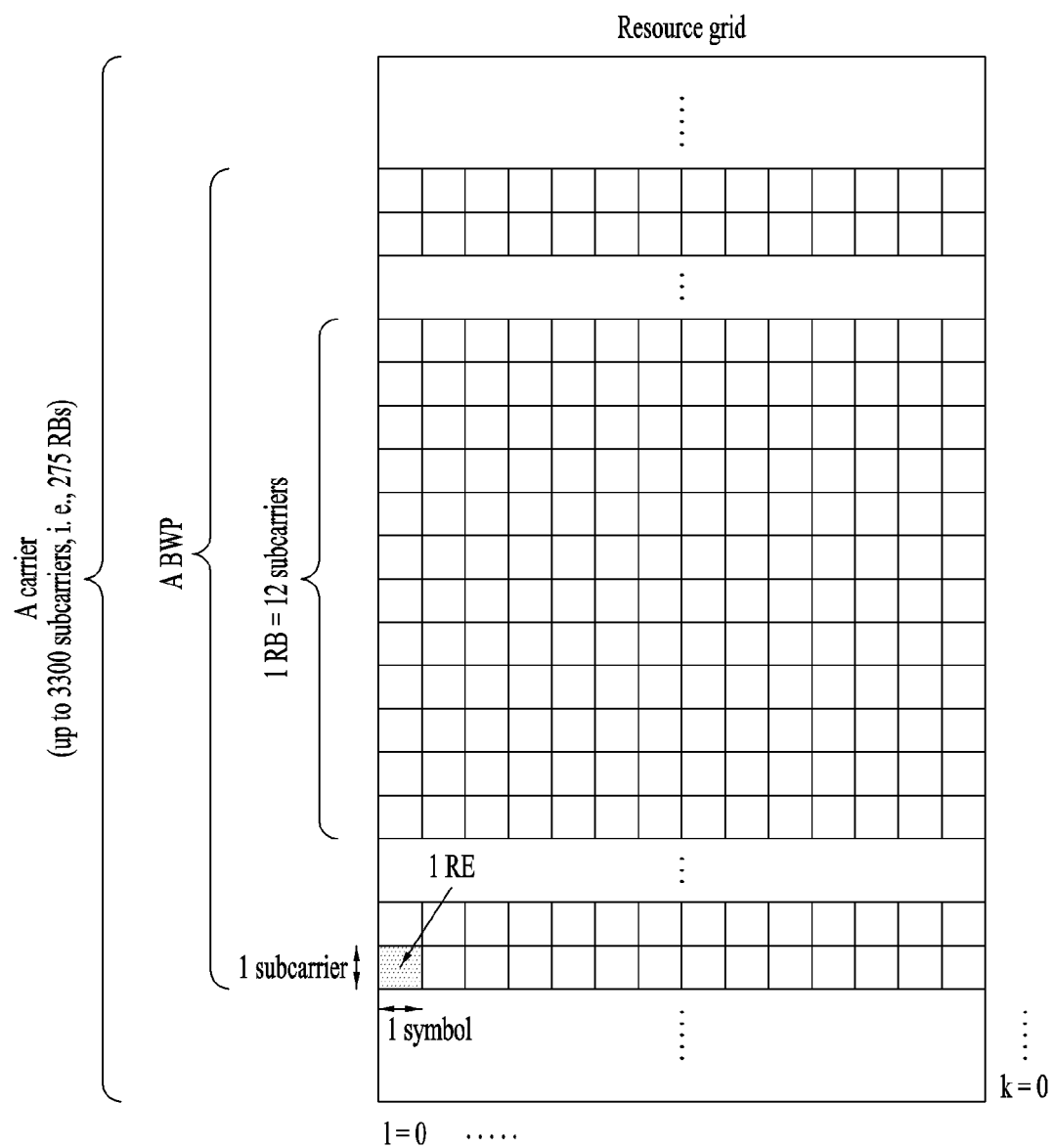
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 3:
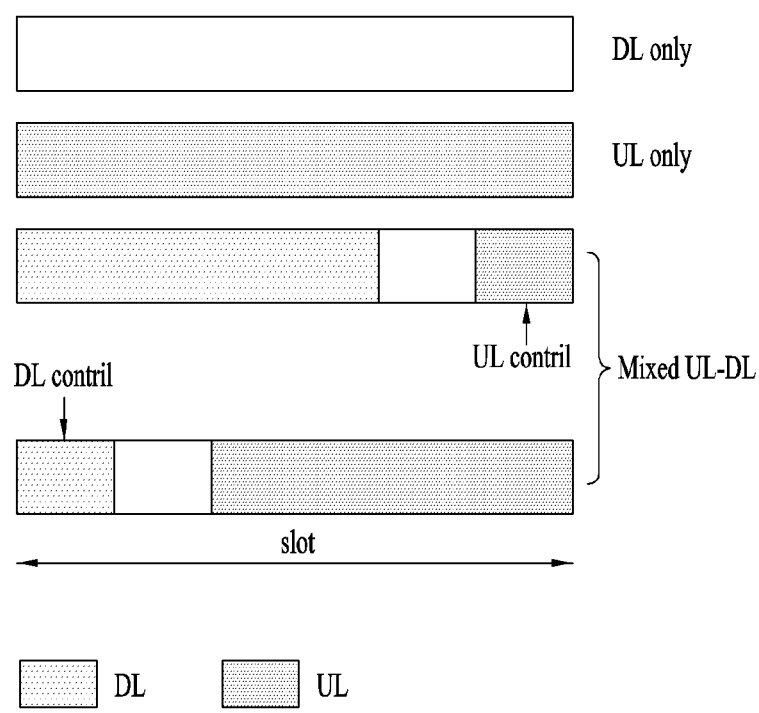
FIG. 3 illustrates a self-contained slot structure.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
    DL region+Guard period (GP)+UL control region
    DL control region+GP+UL region
    DL region: (i) DL data region, (ii) DL control region+DL data region
    UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

In the present disclosure, a base station (BS) may be, for example, a gNode B (gNB).

1. Wireless Communication System Supporting Unlicensed Band

Figure 4:
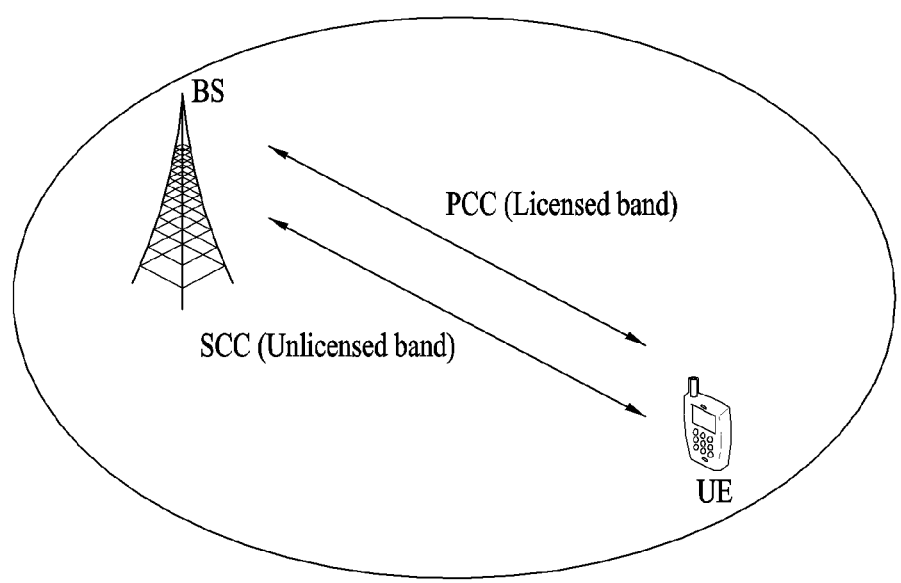
FIG. 4 illustrates a wireless communication system supporting an unlicensed band.
Figure 4:
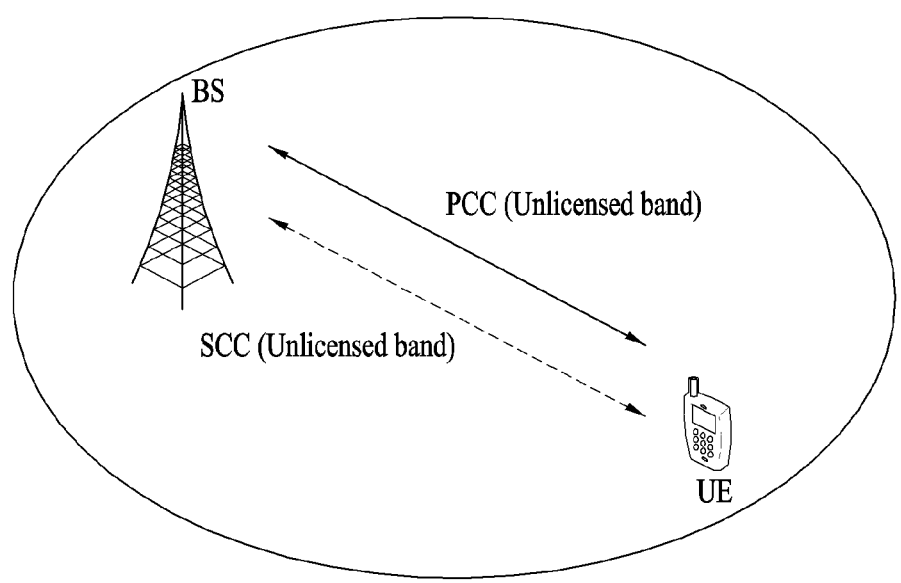

FIG. 4 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

Figure 7:
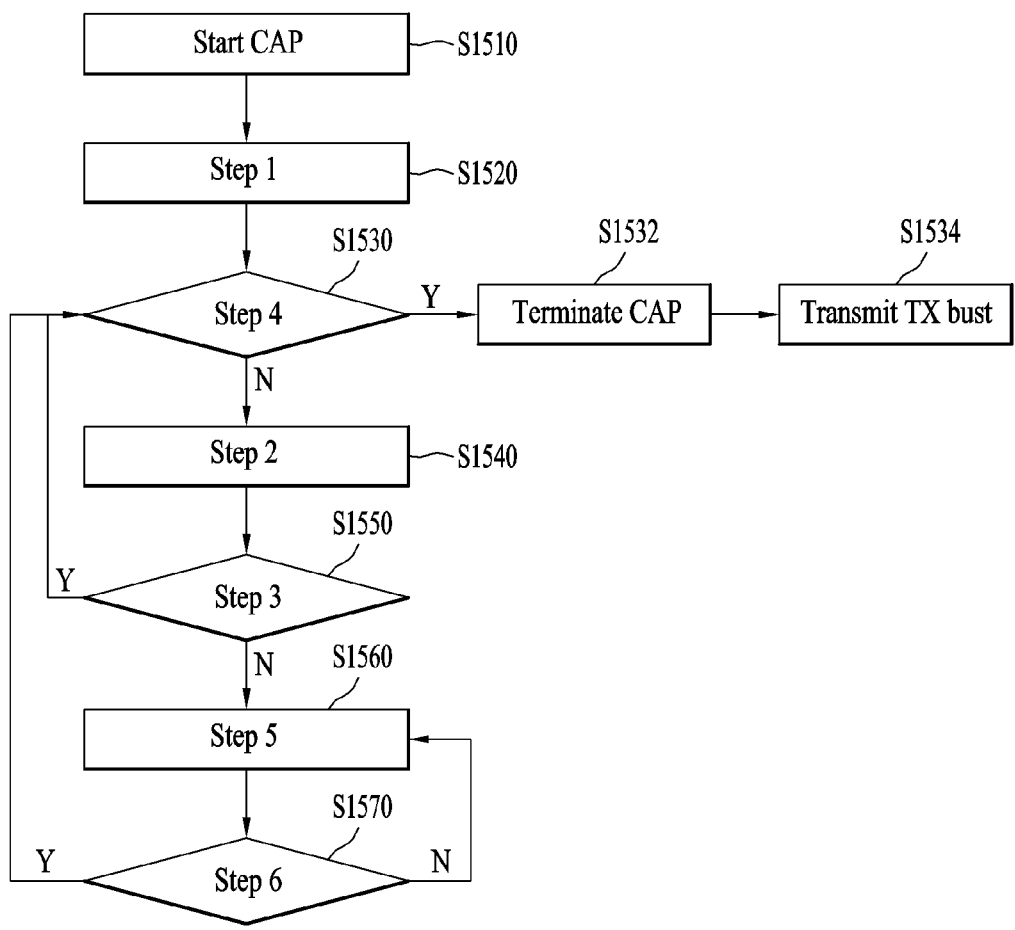

When a UE and a BS transmit and receive signals in a carrier-aggregated LCC and UCC as illustrated in FIG. 4(*a*), the LCC may be configured as a primary CC (PCC) and the UCC may be configured as a secondary CC (SCC). As illustrated in FIG. 7(*b*), the UE and the BS may transmit and receive signals in one UCC or a plurality of carrier-aggregated UCCs. That is, the UE and the BS may transmit and receive signals only in UCC(s) without an LCC.

(Unless otherwise specified), a signal transmission/reception operation in an unlicensed band described in the present disclosure may be performed based on all the above-described deployment scenarios.

Radio Frame Structure for Unlicensed Band

The NR frame structure of FIG. 1 may be used for an operation in an unlicensed band. The configuration of OFDM symbols occupied for UL/DL signal transmission in the frame structure for the unlicensed band may be configured by the BS. The term OFDM symbol may be replaced with SC-FDM(A) symbol.

In the following description, a plurality of CCs (CC indexes) may be replaced with a plurality of BWPs (BWP indexes) configured in one (or more) CC(s) or (serving) cell(s), or a plurality of CCs/cells each including a plurality of BWPs (i.e., CC (index)-BWP (index) combinations). In this situation, the proposed principle/operations of the present disclosure are also applicable in the same manner.

Figure 5:
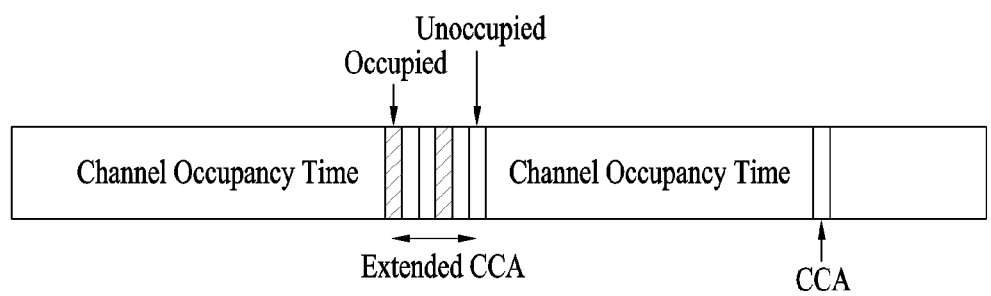
FIG. 5 illustrates an exemplary method of occupying resources in an unlicensed band.

FIG. 5 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.1 lac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP or CCA.

Specifically, for DL reception/UL transmission in an unlicensed band, one or more of the following channel access procedure (CAP) methods may be used in a wireless communication system related to the present disclosure.
Method of Transmitting DL Signal in Unlicensed Band To transmit a DL signal in an unlicensed band, the BS may indicate the configuration of OFDM symbols used in subframe #n to the UE by signaling. The term subframe may be replaced with slot or time unit (TU).

Figure 6:
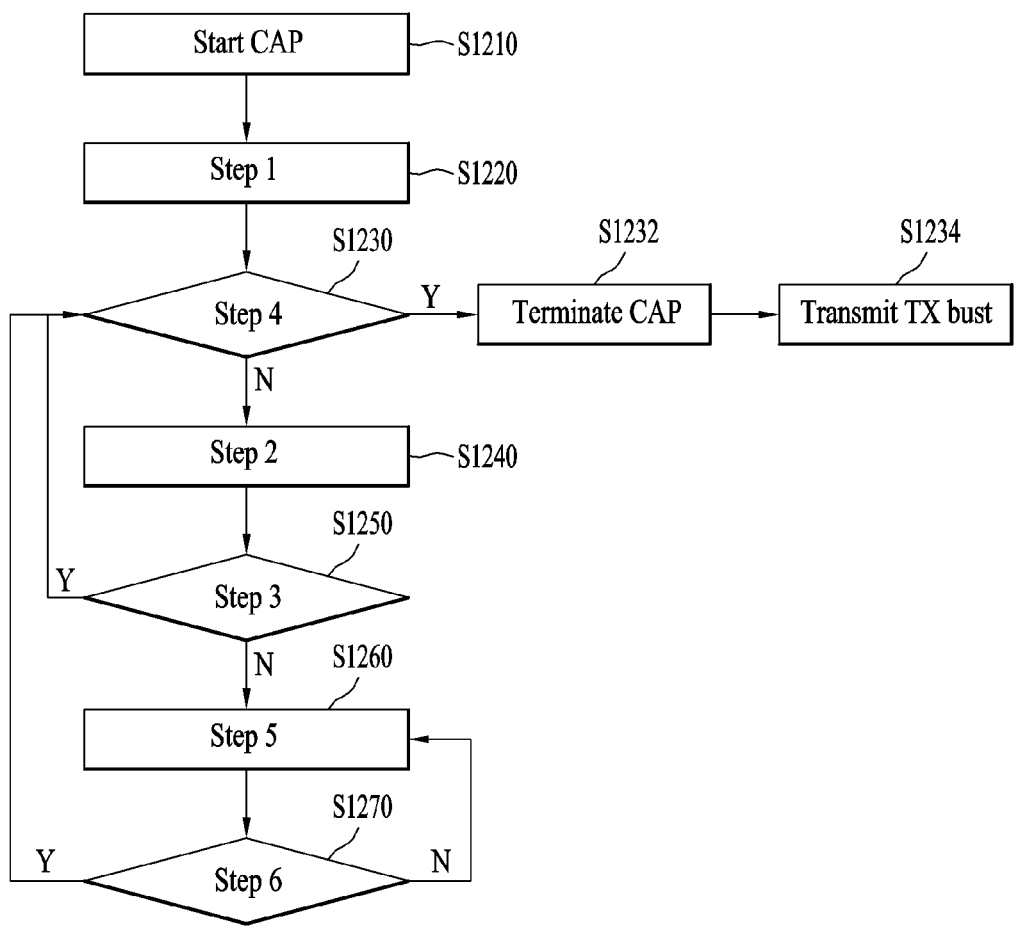
FIGS. 6 and 7 are flowcharts illustrating channel access procedures (CAPs) for signal transmission in an unlicensed band

The BS may perform one of the following unlicensed band access procedures (e.g., CAPs) to transmit a DL signal in the unlicensed band.
(1) First DL CAP Method FIG. 6 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S1210). The BS may randomly select a backoff counter N within a contention window (CW) according to step 1. N is set to an initial value $N_{init}$ (S1220). $N_{init}$ is a random value selected from the values between 0 and $CW_p$. Subsequently, when the backoff counter value N is 0 according to step 4 (S1230; Y), the BS terminates the CAP (S1232). The BS may then perform a Tx burst transmission including transmission of a PDSCH/PDCCH/EPDCCH (S1234). On the contrary, when the backoff counter value N is not 0 (S1230; N), the BS decrements the backoff counter value by 1 according to step 2 (S1240). Subsequently, the BS checks whether the channel of U-cell(s) is idle (S1250). If the channel is idle (S1250; Y), the BS determines whether the backoff counter value is 0 (S1230). On the contrary, when the channel is not idle, that is, the channel is busy (S1250; N), the BS determines whether the channel is idle during a longer defer duration $T_d$ (25 usec or longer) than a slot duration (e.g., 9 usec) according to step 5 (S1260). If the channel is idle during the defer duration (S1270; Y), the BS may resume the CAP. The defer duration may include a 16-usec duration and the immediately following $m_p$ consecutive slot durations (e.g., each being 9 usec). On the contrary, if the channel is busy during the defer duration (S1270; N), the BS re-checks whether the channel of the U-cell(s) is idle during a new defer duration by performing step S1260 again.

Table 3 illustrates that mp, a minimum CW, a maximum CW, a maximum channel occupancy time (MCOT), and an allowed CW size applied to a CAP vary according to channel access priority classes.

TABLE 3

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.
(2) Second DL CAP Method The BS may perform a DL signal transmission (e.g., a signal transmission including a discovery signal transmission, without a PDSCH) in an unlicensed band according to the second DL CAP method described below.

When the signal transmission duration of the BS is equal to or less than 1ms, the BS may transmit a DL signal (e.g., a signal including a discovery signal without a PDSCH) in the unlicensed band immediately after sensing the channel to be idle for at least a sensing duration $T_{drs}$=25 us. $T_{drs}$ includes a duration $T_f$ (=16 us) following one sensing slot duration $T_{sl}$ (=9 us).
(3) Third DL CAP Method The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining Ninit for a specific carrier.

Method of Transmitting UL Signal in Unlicensed Band

For a UL signal transmission in an unlicensed band, the BS may transmit information about a UL transmission period to the UE by signaling.

For a UL signal transmission in the unlicensed band, the UE performs a contention-based CAP. For example, the UE may perform a Type 1 CAP or a Type 2 CAP for UL signal transmission in the U-band. In general, the UE may perform a CAP configured/indicated by the BS (e.g., Type 1 CAP or Type 2 CAP) for the UL signal transmission.

(1) Type 1 UL CAP Method

FIG. 7 is a flowchart illustrating UE's Type 1 CAP operation for UL signal transmission.

To transmit a signal in the U-band, the UE may initiate a CAP (S1510). The UE may randomly select a backoff counter N within a contention window (CW) according to step 1. In this case, N is set to an initial value $N_{init}$ (S1520). $N_{init}$ may have a random value between 0 and $CW_p$. If it is determined according to step 4 that the backoff counter value (N) is 0 (YES in S1530), the UE terminates the CAP (S1532). Then, the UE may perform Tx burst transmission (S1534). If the backoff counter value is non-zero (NO in S1530), the UE decreases the backoff counter value by 1 according to step 2 (S1540). The UE checks whether the channel of U-cell(s) is idle (S1550). If the channel is idle (YES in S1550), the UE checks whether the backoff counter value is 0 (S1530). On the contrary, if the channel is not idle in S1550, that is, if the channel is busy (NO in S1550), the UE checks whether the corresponding channel is idle for a defer duration $T_d$ (longer than or equal to 25 usec), which is longer than a slot duration (e.g., 9 usec), according to step 5 (S1560). If the channel is idle for the defer duration (YES in S1570), the UE may resume the CAP. Here, the defer duration may include a duration of 16 usec and $m_p$ consecutive slot durations (e.g., 9 usec), which immediately follows the duration of 16 usec. If the channel is busy for the defer duration (NO in S1570), the UE performs step S1560 again to check whether the channel is idle for a new defer duration.

Table 4 shows that the values of $m_p$, a minimum CW, a maximum CW, a maximum channel occupancy time (MCOT), and allowed CW sizes, which are applied to the CAP, vary depending on channel access priority classes.

TABLE 4

| Channel Access Priority Class (p) | $m_p$ | $CW_{min, p}$ | $CW_{max, p}$ | $T_{ulmcot, p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcot, p}$ = 10 ms if the higher layer parameter 'absenceOfAnyOtherTechnology-r14' indicates TRUE, otherwise, $T_{ulmcot, p}$ = 6 ms.
NOTE 2:
When $T_{ulmcot, p}$ = 6 ms it may be increased to 8 ms by inserting one or more gaps. The minumum duration of a gap shall be 100 µs. The maximum duration before including any such gap shall be 6 ms.

The size of a CW applied to the Type 1 UL CAP may be determined in various ways. For example, the CW size may be adjusted depending on whether the value of of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min, p}$ for every priority class p ∈{1,2,3,4}. Otherwise, the UE may increase $CW_p$ for every priority class p ∈ {1,2,3,4} to a next higher allowed value.

A reference subframe (or slot) $n_{ref}$ is determined as follows.

When the UE receives a UL grant in a subframe (or slot) $n_g$ and transmits a UL-SCH in subframes (or slots) $n_0, n_1, \ldots n_w$, starting from the subframe (or slot) $n_0$ without a gap (the subframe (or slot) $n_w$ is the most recent subframe (or slot) before a subframe (or slot) $n_g$-3 in which the UE has transmitted a UL-SCH based on a Type 1 CAP), the reference subframe (or slot) $n_{ref}$ is the subframe (or slot) no.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

2. SSB(Synchronization Signal Block) 전송 및 관련 동작

Figure 8:
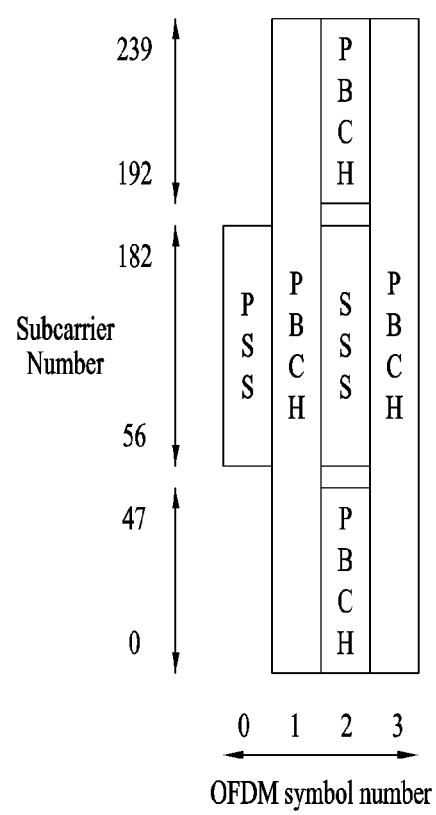
FIG. 8 illustrates a synchronization signal block (SSB) structure.

FIG. 8 illustrates an SSB structure. The UE may perform cell search, system information acquisition, beam alignment for initial access, DL measurement, and so on based on an SSB. The term SSB is used interchangeably with synchronization signal/physical broadcast channel (SS/PBCH) block.

Referring to FIG. 8, an SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS REs.

Cell Search

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 5 below.

TABLE 5

| | Type of Signals | Operations |
|---|---|---|
| 1st step | PSS | * SS/PBCH block (SSB) symbol timing acquisition<br>* Cell ID detection within a cell ID group (3 hypothesis) |
| 2nd Step | SSS | * Cell ID group detection (336 hypothesis) |
| 3rd Step | PBCH DMRS | * SSB index and Half frame (HF) index (Slot and frame boundary detection) |
| 4th Step | PBCH | * Time information (80 ms, System Frame Number (SFN), SSB index, HF)<br>* Remaining Minimum System Information (RMSI) Control resource set (CORESET)/Search space configuration |
| 5th Step | PDCCH and PDSCH | * Cell access information<br>* RACH configuration |

There may be 336 cell ID groups, and each cell ID group may include three cell IDs. Thus, there may be 1008 cell IDs in total, and the cell ID may be defined according to Equation 1.

$$N_{ID}^{cell} = 3N_{ID}^{(1)} + N_{ID}^{(2)} \text{ where } N_{ID}^{(1)} \in \{0,1,\ldots,335\}$$
$$\text{and } N_{ID}^{(2)} \in \{0,12\} \quad \text{[Equation 1]}$$

In Equation 1, $N_{ID}^{cell}$ denotes a cell ID (e.g., PCID). $N_{ID}^{(1)}$ denotes a cell ID group and is provided/obtained from an SSS, and $N_{ID}^{(2)}$ indicates a cell ID in a cell ID group and is provided/obtained from a PSS.

A PSS sequence, $d_{PSS}(n)$ may be defined to satisfy Equation 2.

$$d_{PSS}(n) = 1 - 2x(m) \quad \text{[Equation 2]}$$

$m = (n + 43N_{ID}^{(2)}) \bmod 127$
$0 \leq n < 127$, where
$x(1-7) = (x(1-4) - x(1)) \bmod 2$, and
$[x(6)\ x(5)\ x(4)\ x(3)\ x(2)\ x(1)\ x(0)] = [1\ 1\ 1\ 0\ 1\ 1\ 0]$ An SSS sequence, $d_{SSS}(n)$ may be defined to satisfy Equation 3.

$$d_{SSS}(n) = [1 - 2x_0((n + m_0) \bmod 127)] \quad \text{[Equation 3]}$$

$$[1 - 2x_1((n + m_1) \bmod 127)]$$

$$m_0 = 15 \left\lfloor \frac{N_{ID}^{(1)}}{112} \right\rfloor + 5N_{ID}^{(2)}$$

$$m_1 = N_{ID}^{(1)} \bmod 112$$

Figure 9:
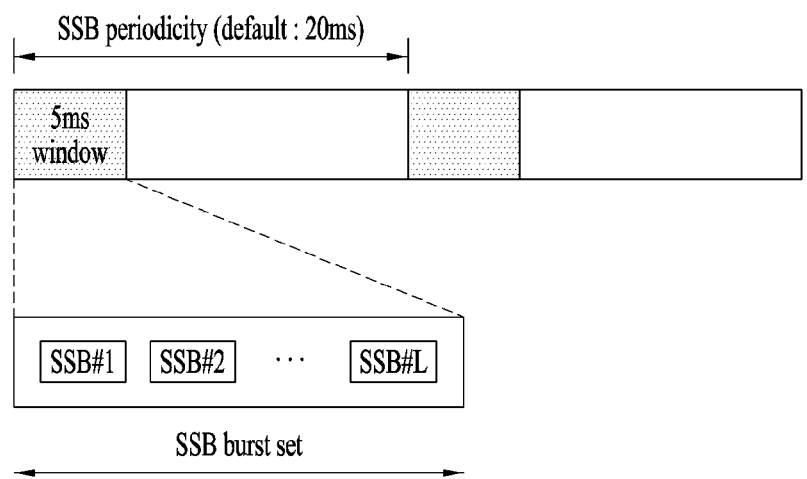
FIG. 9 illustrates SSB transmission.

$0 \leq n < 127$, where, $x_0(i + 7) = (x_0(i + 4) + x_0(i)) \bmod 2$ $x_1(i + 7) = (x_1(i + 1) + x_1(i)) \bmod 2$, and $[x_0(6)\ x_0(5)\ x_0(4)\ x_0(3)\ x_0(2)\ x_0(1)\ x_0(0)] = [0\ 0\ 0\ 0\ 0\ 0\ 1]$ $[x_1(6)\ x_1(5)\ x_1(4)\ x_1(3)\ x_1(2)\ x_1(1)\ x_1(0)] = [0\ 0\ 0\ 0\ 0\ 0\ 1]$ FIG. 9 illustrates SSB transmission.

Referring to FIG. 9, an SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to the SCS as follows. The time positions of SSB candidates are indexed as (SSB indexes) 0 to L-1 in temporal order within the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

Figure 10:
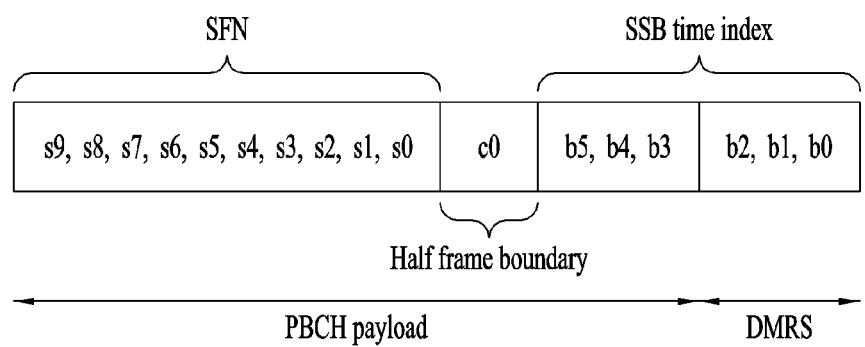
FIG. 10 illustrates exemplary acquisition of information about DL time synchronization at a UE.

FIG. 10 illustrates exemplary acquisition of information about DL time synchronization at a UE.

Referring to FIG. 10, the UE may acquire DL synchronization by detecting an SSB. The UE may identify the structure of an SSB burst set based on the index of the detected SSB, and thus detect a symbol/slot/half-frame boundary. The number of a frame/half-frame to which the detected SSB belongs may be identified by SFN information and half-frame indication information.

Specifically, the UE may acquire 10-bit SFN information, s0 to s9 from a PBCH. 6 bits of the 10-bit SFN information is acquired from a master information block (MIB), and the remaining 4 bits is acquired from a PBCH transport block (TB).

Subsequently, the UE may acquire 1-bit half-frame indication information c0. If a carrier frequency is 3 GH or below, the half-frame indication information may be signaled implicitly by a PBCH DMRS. The PBCH DMRS indicates 3-bit information by using one of 8 PBCH DMRS sequences. Therefore, if L=4, the remaining one bit except for two bits indicating an SSB index in the 3-bit information which may be indicated by 8 PBCH DMRS sequences may be used for half-frame indication.

Finally, the UE may acquire an SSB index based on the DMRS sequence and the PBCH payload. SSB candidates are indexed from 0 to L-1 in a time order within an SSB burst set (i.e., half-frame). If L=8 or 64, three least significant bits (LSBs) b0 to b2 of the SSB index may be indicated by 8 different PBCH DMRS sequences. If L=64, three most significant bits (MSBs) b3 to b5 of the SSB index is indicated by the PBCH. If L=2, two LSBs b0 and b1 of an SSB index may be indicated by 4 different PBCH DMRS sequences. If L=4, the remaining one bit b2 except for two bits indicating an SSB index in 3-bit information which may be indicated by 8 PBCH DMRS sequences may be used for half-frame indication.

System Information Acquisition

Figure 11:
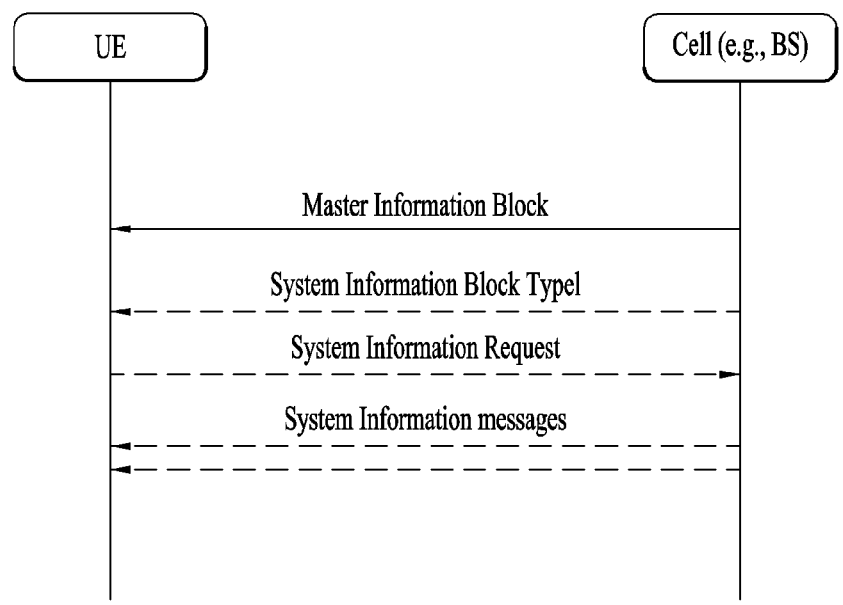
FIG. 11 illustrates a system information (SI) acquisition procedure.

FIG. 11 illustrates a system information (SI) acquisition procedure. The UE may obtain access stratum (AS)-/non-access stratum (NAS)-information in the SI acquisition procedure. The SI acquisition procedure may be applied to UEs in RRC_IDLE, RRC_INACTIVE, and RRC_CONNECTED states.

SI is divided into a master information block (MIB) and a plurality of system information blocks (SIBs). The MIB and the plurality of SIBs are further divided into minimum SI and other SI. The minimum SI may include the MIB and systemInformationBlock1 (SIB1), carrying basic information required for initial access and information required to obtain the other SI. SIB1 may also be referred to as remaining minimum system information (RMSI). For details, the following may be referred to.

The MIB includes information/parameters related to reception of SIB1 and is transmitted on the PBCH of an SSB. The UE assumes that a half-frame including an SSB is repeated every 20 ms during initial cell selection. The UE may determine from the MIB whether there is any control resource set (CORESET) for a Type0-PDCCH common search space. The Type0-PDCCH common search space is a kind of PDCCH search space and used to transmit a PDCCH that schedules an SI message. In the presence of a Type0-PDCCH common search space, the UE may determine (1) a plurality of contiguous RBs and one or more consecutive symbols included in a CORESET, and (ii) a PDCCH occasion (e.g., a time-domain position at which a PDCCH is to be received), based on information (e.g., pdcch-ConfigSIB1) included in the MIB. In the absence of a Type0-PDCCH common search space, pdcch-ConfigSIB1 provides information about a frequency position at which the SSB/SIB1 exists and information about a frequency range without any SSB/SIB1.

SIB1 includes information related to availability and scheduling (e.g., a transmission periodicity and an SI-window size) of the remaining SIBs (hereinafter, referred to as SIBx where x is an integer equal to or larger than 2). For example, SIB1 may indicate whether SIBx is broadcast periodically or in an on-demand manner upon UE request. If SIBx is provided in the on-demand manner, SIB1 may include information required for the UE to transmit an SI request. A PDCCH that schedules SIB1 is transmitted in the Type0-PDCCH common search space, and SIB1 is transmitted on a PDSCH indicated by the PDCCH.

SIBx is included in an SI message and transmitted on a PDSCH. Each SI message is transmitted within a periodic time window (i.e., SI-window).

Beam Alignment

Figure 12:
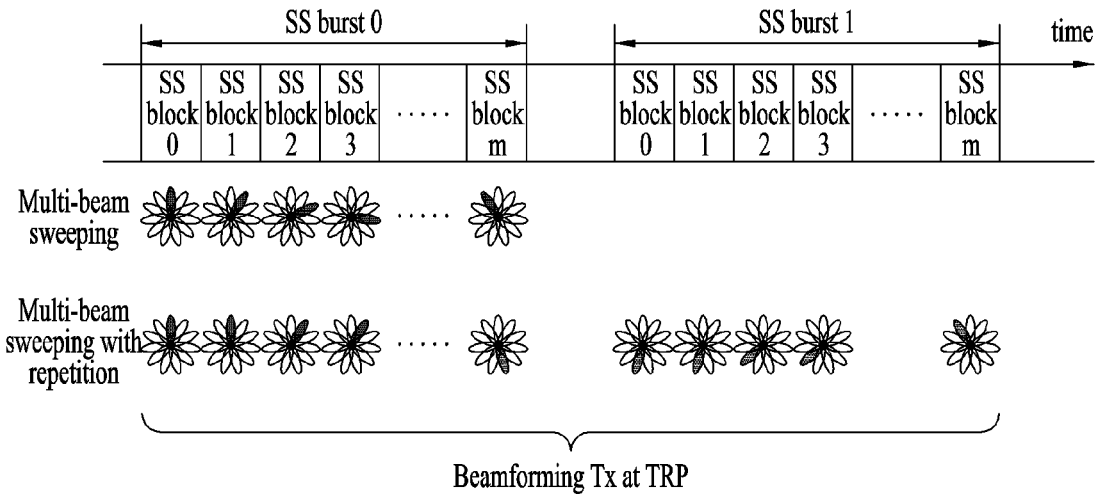
FIG. 12 illustrates exemplary multi-beam transmission of SSBs.

FIG. 12 illustrates exemplary multi-beam transmission of SSBs.

Beam sweeping refers to changing the beam (direction) of a wireless signal over time at a transmission reception point (TRP) (e.g., a BS/cell) (hereinafter, the terms beam and beam direction are interchangeably used). Referring to FIG. 10, an SSB may be transmitted periodically by beam sweeping. In this case, SSB indexes are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of successive SSBs. The maximum allowed transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, maximum number of beams=4

For frequency range from 3 GHz to 6 GHz, maximum number of beams=8

For frequency range from 6 GHz to 52.6 GHz, maximum number of beams=64

Without multi-beam transmission, the number of SSB beams is 1.

When the UE attempts initial access to the BS, the UE may align beams with the BS based on an SSB. For example, the UE performs SSB detection and then identifies a best SSB. Subsequently, the UE may transmit an RACH preamble in PRACH resources linked/corresponding to the index (i.e., beam) of the best SSB. The SSB may also be used for beam alignment between the BS and the UE even after the initial access.

Channel Estimation and Rate-Matching

Figure 13:
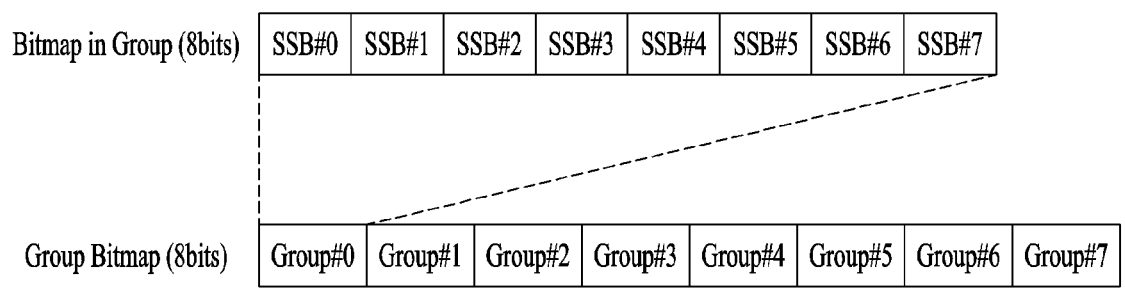
FIG. 13 illustrates an exemplary method of indicating actually transmitted SSBs.

FIG. 13 illustrates an exemplary method of indicating actually transmitted SSBs, SSB_tx.

Up to L SSBs may be transmitted in an SSB burst set, and the number and positions of actually transmitted SSBs may be different for each BS or cell. The number and positions of actually transmitted SSBs are used for rate-matching and measurement, and information about actually transmitted SSBs is indicated as follows.

If the information is related to rate matching, the information may be indicated by UE-specific RRC signaling or RMSI. The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated. Specifically, the information about actually transmitted SSBs may be indicated by a group-bitmap (8 bits)+an in-group bitmap (8 bits). Resources (e.g., REs) indicated by the UE-specific RRC signaling or the RMSI may be reserved for SSB transmission, and a PDSCH and/or a PUSCH may be rate-matched in consideration of the SSB resources.

If the information is related to measurement, the network (e.g., BS) may indicate an SSB set to be measured within a measurement period, when the UE is in RRC connected mode. The SSB set may be indicated for each frequency layer. Without an indication of an SSB set, a default SSB set is used. The default SSB set includes all SSBs within the measurement period. An SSB set may be indicated by a full bitmap (e.g., of length L) in RRC signaling. When the UE is in RRC idle mode, the default SSB set is used.

3. CP Length Design for Extended CP

The above descriptions (NR frame structure, U-band system, etc.) are applicable in combination with methods proposed in the present disclosure, which will be described later. Alternatively, the descriptions may clarify the technical features of the methods proposed in the present disclosure.

The following methods are related to DL transmission, which may be equally applied to DL signal transmission in the NR system (licensed bands) or U-Band system (unlicensed bands) described above. Thus, it is obvious that the terms, expressions, and structures in this document may be modified to be suitable for the system in order to implement the technical idea of the present disclosure in the corresponding system.

For example, UL transmission based on the following PUCCH transmission methods may be performed on an L-cell and/or U-cell defined in the U-band systems.

In cellular communication systems including the LTE/NR system, a method of using unlicensed bands such as 5/6 GHz and 60 GHz bands as well as unlicensed bands such as the 2.4 GHz band, which is widely used in the conventional Wi-Fi system, for traffic offloading is currently discussed.

As described above, the Wi-Fi standard (802.11ac) specifies a CCA threshold of −62 dBm for non-Wi-Fi signals and a CCA threshold of −82 dBm for Wi-Fi signals. In other words, a station (STA) or access point (AP) of the Wi-Fi system may transmit no signal in a specific band if the STA or AP receives a signal from a device not included in the Wi-Fi system in the specific band at a power of −62 dBm or higher.

In this specification, the term 'unlicensed band' may be replaced and interchanged with the term 'shared spectrum'.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 6

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Frequency bands above FR1 and FR2 (e.g., bands from 52.6 GHz to 114.25 GHz, and more particularly, bands from 52.6 GHz to 71 GHz) may be referred to as FR4. The waveforms, SCSs, CP lengths, timings, etc. defined for FR1 and FR2 in the current NR system may not be applied to FR4.

In the current NR system, the largest SCS defined for use in FR2 is 240 kHz. If the 240 kHz SCS is used in FR4, there may be no problem in a specific signal/channel (e.g., SS block), but phase noise may occur in other specific signals/channels (e.g., CORESET #0 and subsequent signals/channels). To address this issue, a larger SCS (e.g., 480 kHz SCS) may be required.

When the 240 kHz SCS is used (or when the 480 kHz SCS is further introduced in addition to the 240 kHz SCS), the length of a normal CP (NCP) may become 293 ns (240 kHz) or 146 ns (480 kHz) if the NCP length is calculated by scaling based on the current NR system. In front of a specific OFDM symbol, the NCP length may become 293 ns or 146 ns plus 520 ns. However, when cell coverage with a delay spread of about 100 ns is targeted, a CP length of about 300 ns may be required in consideration of an additional beam switching time. The present disclosure proposes methods of locating and configuring SSBs and CORESET #0 in consideration of the length of an extended CP (ECP) depending on SCSs.

To determine the ECP length in the simplest way, the method of determining an ECP with an SCS of 60 kHz, which is defined in the current NR system, may be applied to other SCSs (i.e., scaling up). This may be summarized as in Method 3-0.

Method 3-0: Method of Extending 60 kHz SCS ECP Determination Defined in Current NR System For example, if the 480 kHz SCS (p=5) is substituted in Equation 1, 48 symbols (12 symbols/slot) may be included in one msec for the 60 kHz SCS, and 384 (=48*8) symbols (12 symbols/slot) may be included in one msec for the 480 kHz SCS.

$$N_u^\mu = 2048\kappa \cdot 2^{-\mu} \qquad \text{[Equation 4]}$$

$$N_{CP,l}^\mu = \begin{cases} 512\kappa \cdot 2^{-\mu} & \text{extended cyclic prefix} \\ 144\kappa \cdot 2^{-\mu} + 16\kappa & \text{normal cyclic prefix}, l = 0 \text{ or } l = 7 \cdot 2^\mu \\ 144\kappa \cdot 2^{-\mu} & \text{normal cyclic prefix}, l \neq 0 \text{ and } l \neq 7 \cdot 2^\mu \end{cases}$$

Figure 14:
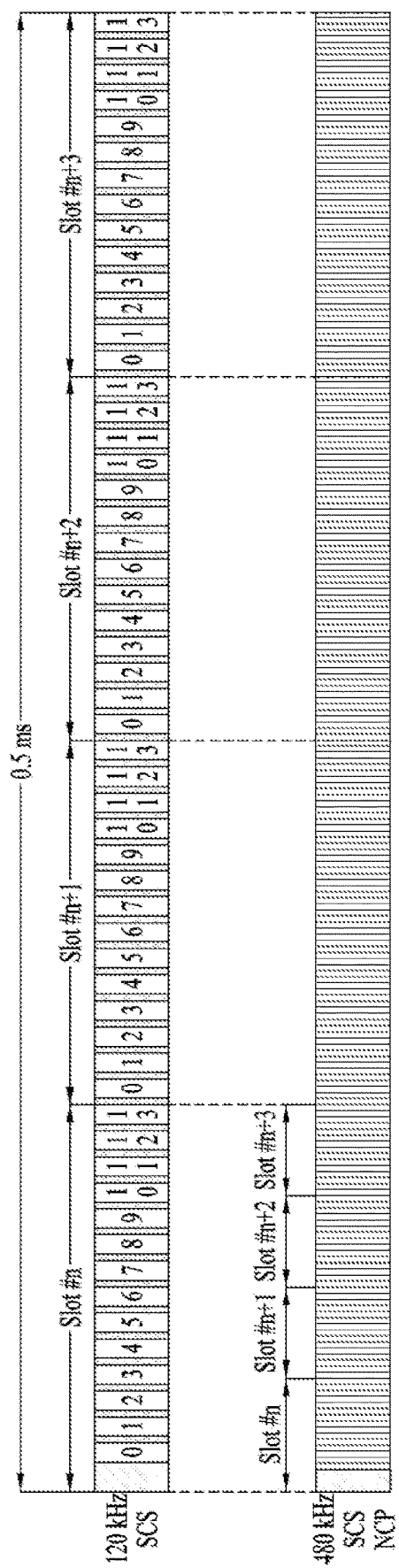
FIGS. 14 to 110 illustrate structures of an extended CP, an SSB, and/or control resource set #0 (CORESET #0) according to embodiments of the present disclosure.
Figure 15:
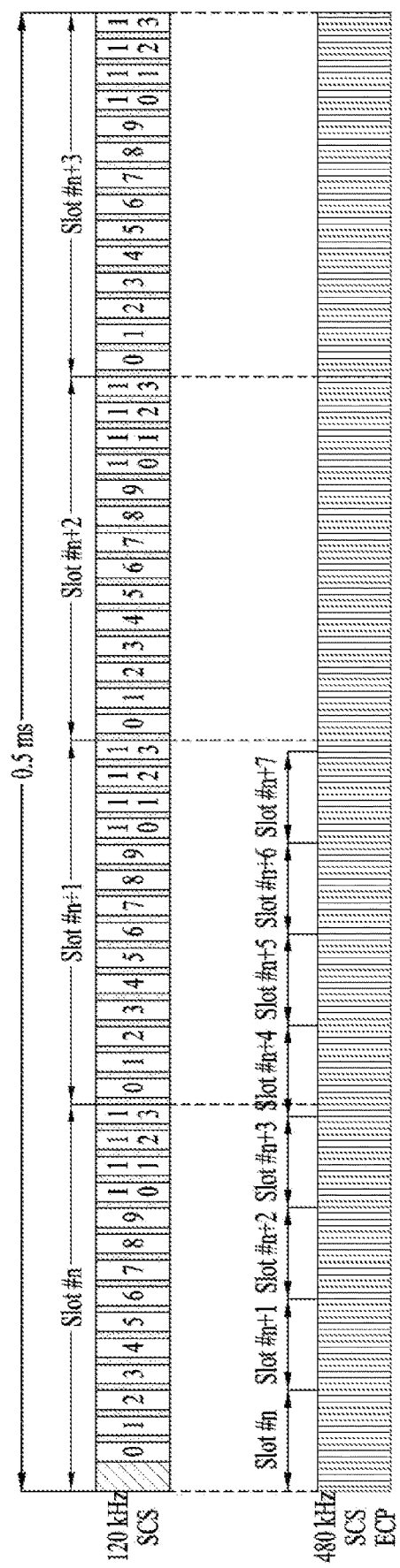

FIG. 14 illustrates an exemplary NCP when Method 3-0 is used for the 480 kHz SCS, and FIG. 15 illustrates an exemplary ECP when Method 3-0 is used for the 480 kHz SCS. According to Method 3-0, in the case of the ECP, slot level or symbol level alignment may not be achieved.

Table 7 shows the lengths of NCPs and ECPs when Method 3-0 is applied. In the conventional system, there are no CP combinations defined for the NCP for the 480 kHz SCS and the ECP for the 120, 240 and 480 kHz SCSs.

TABLE 7

| SCS | NCP | | | | ECP | | | |
| --- | --- | --- | --- | --- | --- | --- | --- | --- |
| [kHz] | 60 | 120 | 240 | 480 | 60 | 120 | 240 | 480 |
| Symbol duration | 16.7 us | 8.33 us | 4.17 us | 2.08 us | 16.7 us | 8.33 us | 4.17 us | 2.08 us |
| CP length | 1.17 ns | 586 ns | 293 ns | 146 ns | 4.17 ns | 2.085 ns | 1.043 ns | 521 ns |
| CP length with 16 Ts Every 0.5 ms | +0.52 us | +520 ns | +520 ns | +520 ns | | | | |

As described above, when the ECP is defined according to Method 3-0, the slot level or symbol level alignment may not be achieved. Thus, there may be restrictions when SSBs and CORESET #0 are located based on TDM or FDM. In consideration of this, the ECP length may be configured according to Method 3-1 below.

Method 3-1: Method of Calculating ECP Length of Specific Signal/Channel (e.g., Control/Data Channel Such as CORESET #0) in Consideration of Slot Level (or Half-Slot Level) Alignment with Other Specific Signals/Channels (e.g., SS Block) Using NCP Length Method 3-1 relates to a method of configuring the slot boundaries of a specific SCS/ECP combination to be aligned at the level of slots or half-slots of other SCS/NCP combinations (that is, the ECP is configured to have the same length within one slot or half-slot for each slot or half-slot).

The ECP length aligned at the level of the first slot/half-slot of other SCS/NCP combinations within 0.5 ms may be different from (e.g., longer than) the ECP length aligned at the level of other slots/half-slots.

Specifically, Method 3-1 is a method of allowing N slots (or N half-slots) corresponding to numerology #2 (e.g., SCS for control/data channels) to be present within one slot (or one half-slot) corresponding to numerology #1 (e.g., SCS for SSBs).

Figure 16:
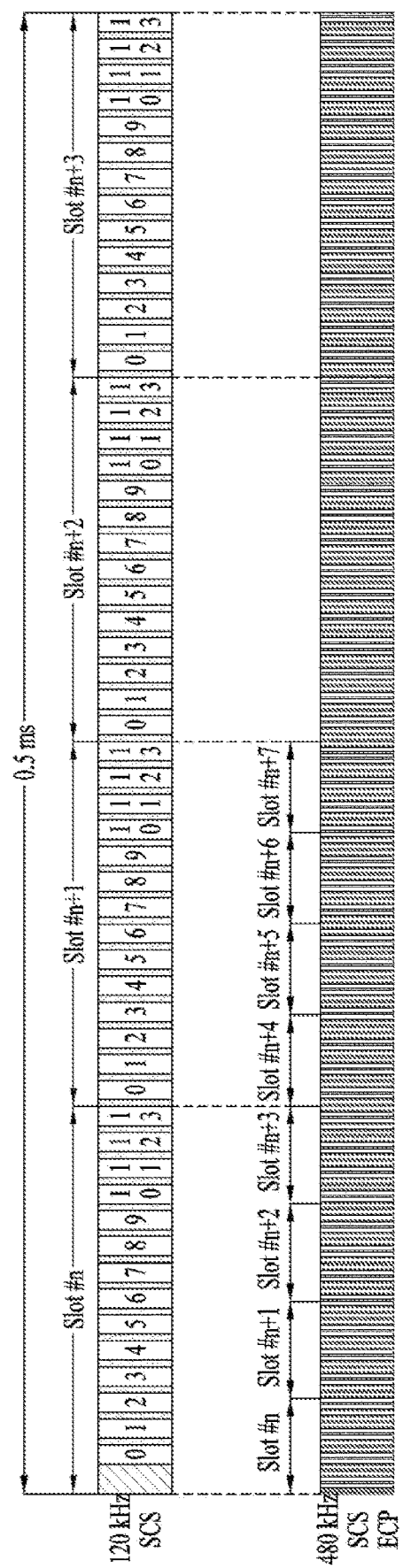

For example, assuming that numerology #1 (e.g., SCS for SSBs) is µ1 and numerology #2 (e.g., SCS for control/data channels) is µ2, for slot level alignment, a structure where $2^{\mu2-\mu1}$ slots corresponding to µ2 are arranged within one slot corresponding to µ1 may be implemented as shown in FIG. 16.

In Equation 5, one long CP length+13 NCP lengths+two symbols may be divided into $12 \cdot 2^{\mu2-\mu1}$ parts in slot n and slot $n+2^{\mu1-1}$. For other slots except slot n and slot $n+2^{\mu1-1}$, 14 NCP length+two symbols may be divided into $12 \cdot 2^{\mu2-\mu1}$ parts.

$$N_u^{\mu2} = 2048\kappa \cdot 2^{-\mu2} \quad \text{[Equation 5]}$$

$$N_{CP}^{\mu2} = \begin{cases} \dfrac{(144\kappa \cdot 2^{-\mu1} + 16\kappa) + 13 \cdot (144\kappa \cdot 2^{-\mu1}) + 2 \cdot 2048\kappa \cdot 2^{-\mu1}}{12 \cdot 2^{\mu2-\mu1}} & \text{slot } n, \text{ slot } n + 2^{\mu1-1} \\ \dfrac{14 \cdot (144\kappa \cdot 2^{-\mu1}) + 2 \cdot 2048\kappa \cdot 2^{-\mu1}}{12 \cdot 2^{\mu2-\mu1}} & \text{others} \end{cases}$$

Equation 5 may be rearranged as shown in Equation 6.

$$N_u^{\mu2} = 2048\kappa \cdot 2^{-\mu2} \quad \text{[Equation 6]}$$

$$N_{CP}^{\mu2} = \begin{cases} \dfrac{(6112 \cdot 2^{-\mu1} + 16) \cdot \kappa}{12 \cdot 2^{\mu2-\mu1}} & \text{slot } n, \text{ slot } n + 2^{\mu1-1} \\ \dfrac{6112\kappa \cdot 2^{-\mu1}}{12 \cdot 2^{\mu2-\mu1}} & \text{others} \end{cases}$$

FIG. 16 shows ECP length calculation results based on slot level alignment when µ1=3 and µ2=5. As shown in FIG. 16, since N slots with a high SCS are arranged along the boundary of one slot of a low SCS, alignment may be performed at the level of the slot with the low SCS when the BS indicates TDM/FDM of SSBs and CORESET #0.

Figure 17:
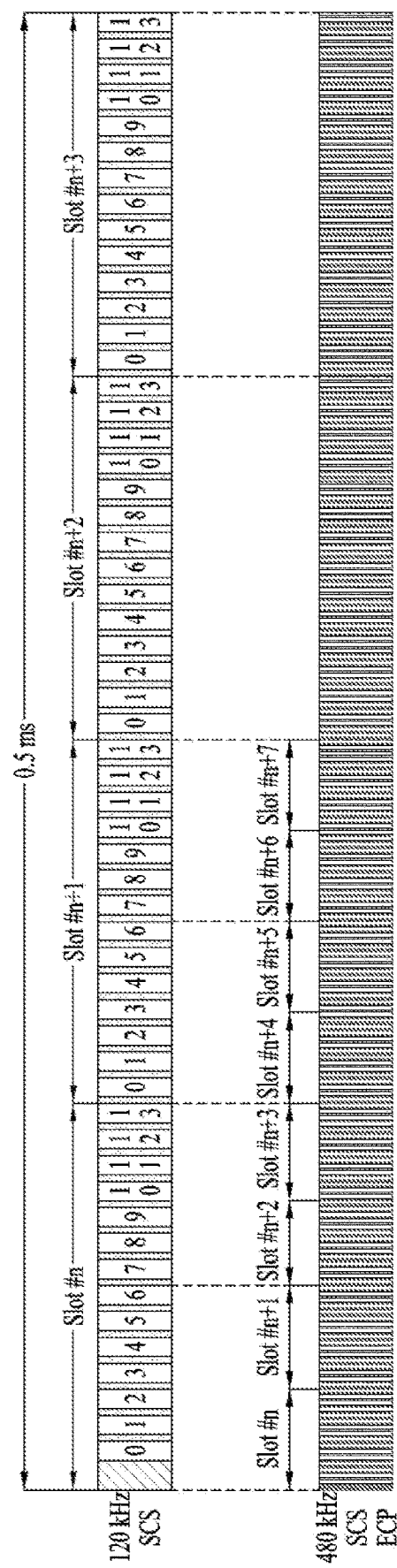

For half-slot level alignment, a structure where $2^{\mu2-\mu1-1}$ slots corresponding to µ2 are arranged based on a half-slot corresponding to µ1 may be implemented as shown in FIG. 17.

According to Equation 7, in the first half-slot of slot n and the first half-slot of slot $n+2^{\mu1-1}$, one long CP length+6 NCP lengths+one symbol are divided into $12 \cdot 2^{\mu2-\mu1-1}$ parts. For other half-slots except the first half-slot of slot n and the first half-slot of slot $n+2^{\mu1-1}$, 7 NCP length+one symbol are divided into $12 \cdot 2^{\mu2-\mu1-1}$ parts.

$$N_u^{\mu2} = 2048\kappa \cdot 2^{\mu2} \quad \text{[Equation 7]}$$

$$N_{CP}^{\mu2} = \begin{cases} \dfrac{(144\kappa \cdot 2^{\mu} + 16\kappa) + 6 \cdot (144\kappa \cdot 2^{\mu}) + 2048\kappa \cdot 2^{-\mu1}}{12 \cdot 2^{\mu2-\mu1-1}} & \text{first half of slot } n \text{ and slot } n + 2^{\mu1-1} \\ \dfrac{7 \cdot (144\kappa \cdot 2^{-\mu1}) + 2048\kappa \cdot 2^{-\mu1}}{12 \cdot 2^{\mu2-\mu1-1}} & \text{others} \end{cases}$$

Equation 7 may be rearranged as shown in Equation 8.

$$N_u^{\mu2} = 2048\kappa \cdot 2^{-\mu2} \quad \text{[Equation 8]}$$

$$N_{CP}^{\mu2} = \begin{cases} \dfrac{(3056 \cdot 2^{-\mu1} + 16) \cdot \kappa}{12 \cdot 2^{\mu2-\mu1-1}} & \text{first half of slot } n, \text{ slot } n + 2^{\mu1-1} \\ \dfrac{3056\kappa \cdot 2^{-\mu1}}{12 \cdot 2^{\mu2-\mu1-1}} & \text{others} \end{cases}$$

FIG. 17 illustrates ECP length calculation results based on half-slot level alignment when µ1=3 and µ2=5. As shown in FIG. 17, since N slots with a high SCS are arranged along the boundary of a half-slot with a low SCS, alignment may be performed at the level of the half-slot with the low SCS when the BS indicates TDM/FDM of SSBs and CORESET #0.

Table 8 shows the ECP length derived according to Method 3-1.

TABLE 8

| | Slot level alignment | | | Half slot level alignment | | |
|---|---|---|---|---|---|---|
| SCS [kHz] | 120 | 240 | 480 | 120 | 240 | 480 |
| Symbol duration | 8.33 us | 4.17 us | 2.08 us | 8.33 us | 4.17 us | 2.08 us |
| CP length of (half) slotn, slotn.slotn + $2^{\mu-1}$ | 2.118 us | 1.059 us | 529 ns | 2.161 us | 1.081 us | 540 us |
| CP length of another slots | 2.074 us | 1.037 us | 519 ns | 2.074 us | 1.037 us | 519 ns |

According to Method 3-1, if boundaries are aligned at the slot level or half-slot level, N slots based on a specific SCS/ECP combination may be allocated. However, regardless of which method is used, the number of time samples included in the CP or symbol needs to be an integer. Since the CP relates to an operation of copying the last few samples among the time samples and pasting the few samples in front of the symbol, copying non-integer time samples may have difficulties in implementation.

According to Method 3-1, non-integer time samples may be arranged in the CP as shown in FIG. 18 and FIG. 19, depending on the slot level or half-slot level alignment.

Method 3-1-1 is a reinforced version of Method 3-1 so that the number of time samples included in the ECP is always an integer.

Method 3-1-1: Method in which ECP length of specific signal/channel (e.g., control/data channel such as CORESET #0) is calculated in consideration of slot level (or half-slot level) alignment with other specific signals/channels (e.g., SS block) using NCP length and the number of time samples included in each ECP is set to be an integer.

According to Method 3-1-1, if the ECP length is not an integer multiple of time samples when Method 3-1 is applied, the CP length of a specific (e.g. first) symbol within a duration (i.e., slots/half-slots of other SCS/NCP combinations) where the corresponding ECP length is calculated may increase so that the lengths of all CPs within the duration may be an integer multiple of the time samples.

In particular, the numbers of ECP samples of first OFDM symbols of slots where the ECP is not an integer number of time samples may be adjusted, and the numbers of ECP samples of the remaining OFDM symbols may also be adjusted, so that the numbers of all CP samples may be set to positive integers.

For example, the numbers of ECP samples of first OFDM symbols of slots where the ECP is not an integer number of time samples may increase, and the numbers of ECP samples of the remaining OFDM symbols may decrease, so that the numbers of all CP samples may be set to positive integers.

For example, assuming that numerology #1 (e.g., SCS for SSBs) is μ1 and numerology #2 (e.g., SCS for control/data channels) is μ2, for slot level alignment, a structure where $2^{\mu 2 - \mu 1}$ slots corresponding to μ2 are arranged within one slot corresponding to p1 may be implemented as shown in FIG. 16.

In Equation 9, one long CP length+13 NCP lengths+two symbols may be divided into $12 \cdot 2^{\mu 2 - \mu 1}$ parts in slot n and slot $n+2^{\mu 1-1}$. For other slots except slot n and slot $n+2^{\mu 1-1}$, the CP length of the first symbol of each slot may be set greater by X samples than the CP length of a symbol other than the first symbol in the corresponding slot. The CP length of the other 11 symbols except the first symbol in each slot may be set smaller by X samples than the CP length of the first symbol of the corresponding slot. For example, X may be $32 \cdot 2^{\mu 1 - \mu 2}$.

$$N_u^{\mu 2} = 2048\kappa \cdot 2^{-\mu 2} \qquad \text{[Equation 9]}$$

$$N_{CP,l}^{\mu 2} = \begin{cases} (144\kappa \cdot 2^{-\mu 1} + 16\kappa) + \\ \dfrac{13 \cdot (144\kappa \cdot 2^{-\mu 1}) + 2 \cdot 2048\kappa \cdot 2^{-\mu 1}}{12 \cdot 2^{\mu 2 - \mu 1}} & \text{slot } n,\ \text{slot } n + 2^{\mu 1 - 1} \\ 14 \cdot (144\kappa \cdot 2^{-\mu 1}) + 2 \cdot \\ \dfrac{2048\kappa \cdot 2^{-\mu 1} - 4\kappa \cdot 2^{-\mu 1}}{12 \cdot 2^{\mu 2 - \mu 1}} + 32 \cdot 2^{\mu 1 - \mu 2} & l = 0 \text{ for other slots} \\ \dfrac{14 \cdot (144\kappa \cdot 2^{-\mu 1}) + 2 \cdot 2048\kappa \cdot 2^{-\mu 1} - 4\kappa \cdot 2^{-\mu 1}}{12 \cdot 2^{\mu 2 - \mu 1}} & l \ne 0 \text{ for other slots} \end{cases}$$

Equation 9 may be rearranged as shown in Equation 10.

$$N_u^{\mu 2} = 2048\kappa \cdot 2^{-\mu 2} \qquad \text{[Equation 10]}$$

$$N_{CP}^{\mu 2} = \begin{cases} \dfrac{(6112 \cdot 2^{-\mu 1} + 16) \cdot \kappa}{12 \cdot 2^{\mu 2 - \mu 1}} & \text{slot } n,\ \text{slot } n + 2^{\mu 1 - 1} \\ \dfrac{6108\kappa \cdot 2^{-\mu 1}}{12 \cdot 2^{\mu 2 - \mu 1}} + 32 \cdot 2^{\mu 1 - \mu 2} & l = 0 \text{ for other slots} \\ \dfrac{6108\kappa \cdot 2^{-\mu 1}}{12 \cdot 2^{\mu 2 - \mu 1}} & l \ne 0 \text{ for other slots} \end{cases}$$

For half-slot level alignment, a structure where $2^{\mu 2 - \mu 1 - 1}$ slots corresponding to μ2 are arranged based on a half-slot corresponding to μ1 may be implemented as shown in FIG. 17.

According to Equation 11, in the first half-slot of slot n and the first half-slot of slot $n+2^{\mu 1-1}$, one long CP length+6 NCP lengths+one symbol are divided into $12 \cdot 2^{\mu 2 - \mu 1 - 1}$ parts. In slot n and slot $n+2^{\mu 1-1}$, the CP length of the first symbol of each slot may be set greater by Y samples than the CP length of other symbols in each slot. The CP length of the other 11 symbols except the first symbol of each slot may be set smaller by Y samples than the CP length of the first symbol of the corresponding slot. For example, Y may be $32 \cdot 2^{\mu 1 - \mu 2}$.

For other half-slots except the first half-slot of slot n and the first half-slot of slot $n+2^{\mu 1-1}$, 7 NCP length+one symbol are divided into $12 \cdot 2^{\mu 2 - \mu 1 - 1}$ parts. For other half-slots except the first half-slot of slot n and the first half-slot of slot $n+2^{\mu 1-2}$, the CP length of the first symbol of each slot may be set greater by Z samples than the CP length of other symbols in the slot. The CP length of the other 11 symbols except the first symbol of each slot may be set smaller by Z samples than the CP length of the first symbol of the corresponding slot. Z may be, for example, $16 \cdot 2^{\mu 1 - \mu 2}$.

$$N_u^{\mu 2} = 2048\kappa \cdot 2^{-\mu 2} \qquad \text{[Equation 11]}$$

$$N_{CP}^{\mu 2} = \begin{cases} (144\kappa \cdot 2^{-\mu 1} + 16\kappa) + 6 \cdot \\ \dfrac{(144\kappa \cdot 2^{-\mu 1}) + 2048\kappa \cdot 2^{-\mu 1} - 4\kappa \cdot 2^{-\mu 1}}{12 \cdot 2^{\mu 2 - \mu 1 - 1}} + 32 \cdot 2^{\mu 1 - \mu 2} & l = 0 \text{ for first half of slot } n \text{ and slot } n + 2^{\mu 1 - 1} \\ (144\kappa \cdot 2^{-\mu 1} + 16\kappa) + 6 \cdot \\ \dfrac{(144\kappa \cdot 2^{-\mu 1}) + 2048\kappa \cdot 2^{-\mu 1} - 4\kappa \cdot 2^{-\mu 1}}{12 \cdot 2^{\mu 2 - \mu 1 - 1}} & l \ne 0 \text{ for first half of slot } n \text{ and slot } n + 2^{\mu 1 - 1} \\ \dfrac{7 \cdot (144\kappa \cdot 2^{-\mu 1}) + 2048\kappa \cdot 2^{\mu 1} - 2\kappa \cdot 2^{-\mu 1}}{12 \cdot 2^{\mu 2 - \mu 1 - 1}} + 16 \cdot 2^{\mu 1 - \mu 2} & l = 0 \text{ for other slots} \\ \dfrac{7 \cdot (144\kappa \cdot 2^{-\mu 1}) + 2048\kappa \cdot 2^{\mu 1} - 2\kappa \cdot 2^{-\mu 1}}{12 \cdot 2^{\mu 2 - \mu 1 - 1}} & l \ne 0 \text{ for other slots} \end{cases}$$

Equation 11 may be rearranged as shown in Equation 12.

$$N_u^{\mu 2} = 2048\kappa \cdot 2^{-\mu 2} \qquad \text{[Equation 12]}$$

$$N_{CP}^{\mu 2} = \begin{cases} \dfrac{(3052 \cdot 2^{-\mu 1} + 16) \cdot \kappa}{12 \cdot 2^{\mu 2 - \mu 1 - 1}} + 32 \cdot 2^{\mu 1 - \mu 2} & l = 0 \text{ for first half of slot } n,\ \text{slot } n + 2^{\mu 1 - 1} \\ \dfrac{(3052 \cdot 2^{-\mu 1} + 16) \cdot \kappa}{12 \cdot 2^{\mu 2 - \mu 1 - 1}} & l \ne 0 \text{ for first half of slot } n,\ \text{slot } n + 2^{\mu 1 - 1} \\ \dfrac{3054\kappa \cdot 2^{-\mu 1}}{12 \cdot 2^{\mu 2 - \mu 1 - 1}} + 16 \cdot 2^{\mu 1 - \mu 2} & l = 0 \text{ for other slots} \\ \dfrac{3054\kappa \cdot 2^{-\mu 1}}{12 \cdot 2^{\mu 2 - \mu 1 - 1}} & l \ne 0 \text{ for other slots} \end{cases}$$

When alignment is applied at the level of 0.5 ms and/or at the slot and/or half slot level, the minimum SCS to be aligned is 15 kHz, which is the smallest SCS (considerable in the NR system). However, since the minimum SCS supportable above 52.6 GHz (i.e., FR4) may be newly defined (e.g., 120 kHz), the present disclosure proposes the following methods for calculating the NCP and ECP.

In the following description, the expressions '#A symbol' and 'symbol #A' may mean that the index of a corresponding symbol is A. In addition, #A written before/after a certain element such as a slot or SSB including a symbol may mean that the index of the corresponding slot or SSB is A. However, CORESET #0 means a CORESET for at least SIB1 scheduling, which may be configured via MIB or dedicated RRC signaling. The index of CORESET #0 may be expressed as CORESET #0 #A.

The statement that 'a specific OFDM symbol additionally occupies B samples' may mean that the number of samples included in a CP configured for the specific symbol is determined by adding the B samples to the number of basic samples. The number of basic samples may be, for example, 144 for the NCP and 512 for the ECP.

For example, the statement that OFDM symbol #0 occupies additional 25 samples for the ECP may mean that the number of samples included in the CP configured for the OFDM symbol with index 0 in a certain slot is 512+25=537.

Method 3-2: Method of Calculating NCP Length and ECP Length in Consideration of New SCS Rather than 15 kHz SCS number of samples to be added to each OFDM symbol may be the largest integer smaller than 1024/56=18.2857. Accordingly, the number of samples to be added to each OFDM symbol may be 18. The remaining 1024-(18*56)=16 samples may be additionally distributed to the CP of the first OFDM symbol at every four slots.

Finally, each of the first OFDM symbols at every four slots may occupy additional 18+16=34 samples, and each of the remaining OFDM symbols may occupy additional 18 samples.

As another example, if the minimum SCS (new SCS) in FR4 is 240 kHz, each of the first OFDM symbols at every 8 slots may occupy additional 9+16=25 samples, and each of the remaining OFDM symbols may occupy additional 9 samples.

$$N_u^\mu = 2048\kappa \cdot 2^{-\mu} \qquad \text{[Equation 13]}$$

$$N_{CP,l}^\mu = \begin{cases} 512\kappa \cdot 2^{-\mu} & \text{extended cyclic prefix} \\ 144\kappa \cdot 2^{-\mu} + 18 \cdot 2^{-(\mu-2)} + 16 & \text{normal cyclic prefix, } l = 0 \text{ or } l = 7 \cdot 2^{\mu-1} \\ 144\kappa \cdot 2^{-\mu} + 18 \cdot 2^{-(\mu-2)} & \text{normal cyclic prefix, } l \neq 0 \text{ and } l \neq 7 \cdot 2^{\mu-1} \end{cases}$$

Table 9 shows the NCP length, the ECP length, and the number of time samples derived according to Option 3-2-1 when the new SCS is 120 kHz.

TABLE 9

| | NCP | | | ECP | | |
|---|---|---|---|---|---|---|
| SCS [kHz] | 120 | 240 | 480 | 120 | 240 | 480 |
| Symbol duration (time sample) | 8.33 us (16384 sample) | 4.17 us (8192 sample) | 2.08 us (4096 sample) | 8.33 us (16384 sample) | 4.17 us (8192 sample) | 2.08 us (4096 sample) |
| CP length (time sample) | 595 ns (1170 sample) | 297.5 ns (585 sample) | 149 ns (292.5 sample) | 2.085 us (4096 sample) | 1.043 us (2048 sample) | 521 ns (1024 sample) |
| CP length with 16 samples every 0.5 ms | +8.1 ns (16 sample) | +8.1 ns (16 sample) | +8.1 ns (16 sample) | | | |

Option 3-2-1. Method of Allocating Maximum Time Samples to Each OFDM Symbol and then Allocating Remaining Time Samples to First OFDM Symbol at Every 0.5 ms A new SCS may be the minimum SCS supportable in FR4. For example, the new SCS may be 120 kHz.

In addition, the CP length for each OFDM symbol and the number of time samples for the symbol length may be defined based on 0.5 ms (e.g., based on four slots for the 120 kHz SCS).

As a result, the symbol length and the CP length may be determined as shown in Equation 13.

In other words, an additional CP length (e.g., 16 k) may be distributed to the CP of each OFDM symbol such that the CP length is evenly distributed as much as possible to 14 OFDM symbols, and the remaining time samples may be additionally distributed to the CP of the first OFDM symbol, which exists at every 0.5 ms.

As an example, when a total of 1024 samples are distributed over 0.5 ms (four slots for the 120 kHz SCS), the Referring to Table 9, there may be a problem that the number of time samples for the CP length from an SCS of 480 kHz is not an integer.

Option 3-2-2-1. Method of Allocating as Many Time Samples as Maximum Value Among Powers of 2 (or Multiples of 16) to Each OFDM Symbol and then Allocating Remaining Time Samples to First OFDM Symbol at Every 0.5 ms A new SCS may be the minimum SCS supportable in FR4. For example, the new SCS may be 120 kHz.

In addition, the CP length for each OFDM symbol and the number of time samples for the symbol length may be defined based on 0.5 ms (e.g., based on four slots for the 120 kHz SCS).

As a result, the symbol length and the CP length may be determined as shown in Equation 14.

In other words, an additional CP length (e.g., 16 k) may be distributed to the CP of each OFDM symbol such that the CP length is evenly distributed as much as possible to 14

OFDM symbols, and the remaining time samples may be additionally distributed to the CP of the first OFDM symbol, which exists at every 0.5 ms.

As an example, when a total of 1024 samples are distributed over 0.5 ms (four slots for the 120 kHz SCS), the number of samples to be added to each OFDM symbol may be 16=24, which is the largest number of powers of 2 and capable of being easily scaled when applied to a larger SCS. The remaining 1024-(16*56)=128 samples may be additionally distributed to the CP of the first OFDM symbol at every four slots.

Finally, each of the first OFDM symbols at every four slots may occupy additional 16+128=144 samples, and each of the remaining OFDM symbols may occupy additional 16 samples.

As another example, if the minimum SCS (new SCS) in FR4 is 240 kHz, each of the first OFDM symbols at every 8 slots may occupy additional 8+128=136 samples, and each of the remaining OFDM symbols may occupy additional 8 samples.

$$N_u^\mu = 2048\kappa \cdot 2^{-\mu} \quad \text{[Equation 14]}$$

$$N_{CP,l}^\mu = \begin{cases} 512\kappa \cdot 2^{-\mu} & \text{extended cyclic prefix} \\ 144\kappa \cdot 2^{-\mu} + 16 \cdot 2^{-(\mu-2)} + 128 & \text{normal cyclic prefix}, l = 0 \text{ or } l = 7 \cdot 2^{\mu-1} \\ 144\kappa \cdot 2^{-\mu} + 16 \cdot 2^{-(\mu-2)} & \text{normal cyclic prefix}, l \neq 0 \text{ and } l \neq 7 \cdot 2^{\mu-1} \end{cases}$$

Table 10 shows the NCP length, the ECP length, and the number of time samples derived according to Option 3-2-2-1 when the new SCS is 120 kHz.

defined based on 0.125 ms (e.g., based on one slot for the 120 kHz SCS).

As a result, the symbol length and the CP length may be determined as shown in Equation 15.

In other words, an additional CP length (e.g., 16 k) may be distributed to the CP of each OFDM symbol such that the CP length is evenly distributed as much as possible to 14 OFDM symbols, and the remaining time samples may be additionally distributed to the CPs of the first OFDM symbol and every $7 \cdot 2^{\mu-\mu ref}$-th OFDM symbol.

As an example, when a total of 1024 samples are distributed over 0.5 ms (four slots for the 120 kHz SCS), the number of samples to be added to each OFDM symbol may be an integer less than 1024/56=18.2857. The number of samples to be added to each OFDM symbol may be $16=2^4$, which is the largest number of powers of 2 and capable of being easily scaled when applied to a larger SCS. The remaining 1024-(16*56)=128 samples may be additionally distributed to the CPs of OFDM symbols #0 and #7 of each slot. Since there are a total of four slots in 0.5 ms, 128/8=16 samples may be further distributed to each symbol.

Finally, each of OFDM symbols #0 and #7 in each slot may occupy additional 16+16=32 samples, and each of the remaining OFDM symbols may occupy additional 16 samples.

As another example, if the minimum SCS (new SCS) in FR4 is 240 kHz, OFDM symbol #0 in each slot may occupy additional 8+16=24 samples, and each of the remaining OFDM symbols may occupy additional 8 samples.

TABLE 10

| | NCP | | | ECP | | |
|---|---|---|---|---|---|---|
| SCS [kHz] | 120 | 240 | 480 | 120 | 240 | 480 |
| Symbol duration | 8.33 us | 4.17 us | 2.08 us | 8.33 us | 4.17 us | 2.08 us |
| (time sample) | (16384 sample) | (8192 sample) | (4096 sample) | 16384 sample) | (8192 sample) | (4096 sample) |
| CP length | 594 ns | 297 ns | 149 ns | 1.035 us | 1.043 us | 521 s |
| (time sample) | (1168 sample) | (584 sample) | (292 sample) | (4096 sample) | (2048 sample) | (1024 sample) |
| CP length with 128 samples every 0.5 ms | +65 ns (128 sample) | +65 ns (128 sample) | +65 ns (128 sample) | | | |

Option 3-2-2-2. Method of Allocating as Many Time Samples as Maximum Value Among Powers of 2 (or Multiples of 16) to Each OFDM Symbol and then Equally Allocating Remaining Time Samples at Every 0.0625 ms (e.g., to OFDM Symbols #0 and #7 of Each Slot for 120 kHz SCS)

A new SCS may be the minimum SCS supportable in FR4. For example, the new SCS may be 120 kHz.

In addition, the CP length for each OFDM symbol and the number of time samples for the symbol length may be $$N_u^\mu = 2048\kappa \cdot 2^{-\mu} \quad \text{[Equation 15]}$$

$$N_{CP,l}^\mu = \begin{cases} 512\kappa \cdot 2^{-\mu} & \text{extended cyclic prefix} \\ 144\kappa \cdot 2^{-\mu} + 16 \cdot 2^{-(\mu-2)} + 16 & \text{normal cyclic prefix}, l = 0 \text{ or } l = 7 \cdot 2^{\mu-2} \\ 144\kappa \cdot 2^{-\mu} + 16 \cdot 2^{-(\mu-2)} & \text{normal cyclic prefix}, l \neq 0 \text{ and } l \neq 7 \cdot 2^{\mu-2} \end{cases}$$

Table 11 shows the NCP length, the ECP length, and the number of time samples derived according to Option 3-2-2-2 when the new SCS is 120 kHz.

TABLE 11

| SCS [kHz] | NCP | | | ECP | | |
|---|---|---|---|---|---|---|
| | 120 | 240 | 480 | 120 | 240 | 480 |
| Symbol duration (time sample) | 8.33 us (16384 sample) | 4.17 us (8192 sample) | 2.08 us (4096 sample) | 8.33 us (16384 sample) | 4.17 us (8192 sample) | 2.08 us (4096 sample) |
| CP length (time sample) | 594 ns (1168 sample) | 297 ns (584 sample) | 149 ns (292 sample) | 2.085 us (4096 sample) | 1.043 us (2048 sample) | 521 ns (1024 sample) |
| CP length with 16 samples every 0.0625 ms | +8.1 ns (16 sample) | +8.1 ns (16 sample) | +8.1 ns (16 sample) | | | |

Option 3-2-2-3. Method of Allocating as Many Time Samples as Maximum Value Among Powers of 2 (or Multiples of 16) to Each OFDM Symbol and then Equally Allocating Remaining Time Samples at Every 0.125 ms (e.g., to OFDM Symbol #0 of Each Slot for 120 kHz SCS)

A new SCS may be the minimum SCS supportable in FR4. For example, the new SCS may be 120 kHz.

In addition, the CP length for each OFDM symbol and the number of time samples for the symbol length may be defined based on 0.125 ms (e.g., based on one slot for the 120 kHz SCS).

As a result, the symbol length and the CP length may be determined as shown in Equation 16.

In other words, an additional CP length (e.g., 16 k) may be distributed to the CP of each OFDM symbol such that the CP length is evenly distributed as much as possible to 14 OFDM symbols, and the remaining time samples may be additionally distributed to the CP of an OFDM symbol located at every 0.125 ms.

As an example, when a total of 1024 samples are distributed over 0.5 ms (four slots for the 120 kHz SCS), the number of samples to be added to each OFDM symbol may be an integer less than 1024/56=18.xx. The number of samples to be added to each OFDM symbol may be $16=2^4$, which is the largest number of powers of 2 and capable of being easily scaled when applied to a larger SCS. The remaining 1024-(16*56)=128 samples may be additionally distributed to the CP of OFDM symbols #0 of each slot. Since there are a total of four slots in 0.5 ms, 128/4=32 samples may be further distributed to each symbol.

Finally, each OFDM symbols #0 in each slot may occupy additional 16+32=48 samples, and each of the remaining OFDM symbols may occupy additional 16 samples.

As another example, if the minimum SCS (new SCS) in FR4 is 240 kHz, each of the first OFDM symbols may occupy additional 8+32=40 samples, and each of the remaining symbols may occupy additional 8 samples in every two slots.

$$N_u^\mu = 2048\kappa \cdot 2^{-\mu}$$ [Equation 16]

$$N_{CP,l}^\mu = \begin{cases} 512\kappa \cdot 2^{-\mu} & \text{extended cyclic prefix} \\ 144\kappa \cdot 2^{-\mu} + 16 \cdot 2^{-(\mu-2)} + 32 & \text{normal cyclic prefix}, l = 0 \text{ or } l = 7 \cdot 2^{\mu-2} \\ 144\kappa \cdot 2^{-\mu} + 16 \cdot 2^{-(\mu-2)} & \text{normal cyclic prefix}, l \neq 0 \text{ and } l \neq 7 \cdot 2^{\mu-2} \end{cases}$$

Table 12 shows the NCP length, the ECP length, and the number of time samples derived according to Option 3-2-2-3 when the new SCS is 120 kHz.

TABLE 12

| SCS [kHz] | NCP | | | ECP | | |
|---|---|---|---|---|---|---|
| | 120 | 240 | 480 | 120 | 240 | 480 |
| Symbol duration (time sample) | 8.33 us (16384 sample) | 4.17 us (8192 sample) | 2.08 us (4096 sample) | 8.33 us (16384 sample) | 4.17 us (8192 sample) | 2.08 us (4096 sample) |
| CP length (time sample) | 594 ns (1168 sample) | 297 ns (584 sample) | 149 ns (292 sample) | 2.085 us (4096 sample) | 1.043 us (2048 sample) | 521 ns (1024 sample) |
| CP length with 32 samples every 0.125 ms | +16.2 ns (32 sample) | +16.2 ns (32 sample) | +16.2 ns (32 sample) | | | |

Option 3-2-3. Method of Equally Dividing and Allocating all Remaining Time Samples at Every 0.0625 ms (e.g., to OFDM Symbols #0 and #7 of Each Slot, that is, at Half-Slot Level for 120 kHz SCS)

A new SCS may be the minimum SCS supportable in FR4. For example, the new SCS may be 120 kHz.

In addition, the CP length for each OFDM symbol and the number of time samples for the symbol length may be defined based on 0.5 ms (e.g., based on four slots for the 120 kHz SCS).

As a result, the symbol length and the CP length may be determined as shown in Equation 17.

That is, an additional CP length (e.g., 16 k) may be divided into 8 equal parts and then distributed to the CPs of the first and every $7 \cdot 2^{\mu-2}$-th OFDM symbols.

As an example, if the minimum SCS of FR4 is 120 kHz, OFDM symbols #0 and #7 in each slot may occupy additional 16*64/8=128 samples (=2 k), and the remaining OFDM symbols may occupy no additional samples.

As another example, if the minimum SCS of FR4 is 240 kHz, OFDM symbol #0 in each slot may occupy additional 16*64/8=128 samples (=2 k), and the remaining OFDM symbols may occupy no additional samples.

$$N_u^\mu = 2048\kappa \cdot 2^{-\mu} \quad \text{[Equation 17]}$$

$$N_{CP,l}^\mu = \begin{cases} 512\kappa \cdot 2^{-\mu} & \text{extended cyclic prefix} \\ 144\kappa \cdot 2^{-\mu} + 2\kappa & \text{normal cyclic prefix, } l = 0 \text{ or } l = 7 \cdot 2^{\mu-1} \\ 144\kappa \cdot 2^{-\mu} & \text{normal cyclic prefix, } l \neq 0 \text{ and } l \neq 7 \cdot 2^{\mu-1} \end{cases}$$

Table 13 shows the NCP length, the ECP length, and the number of time samples derived according to Option 3-2-3 when the new SCS is 120 kHz.

TABLE 13

| | NCP | | | ECP | | |
|---|---|---|---|---|---|---|
| SCS [kHz] | 120 | 240 | 480 | 120 | 240 | 480 |
| Symbol duration | 8.33 us | 4.17 us | 2.08 us | 8.33 us | 4.17 us | 2.08 us |
| (time sample) | (16384 sample) | (8192 sample) | (4096 sample) | (16384 sample) | (8192 sample) | (4096 sample) |
| CP length | 586 ns | 293 ns | 146 ns | 2.085 us | 1.043 us | 521 ns |
| (time sample) | (1152 sample) | (576 sample) | (288 sample) | (4096 sample) | (2048 sample) | (1024 sample) |
| CP length with 2 Ts every 0.0625 ms | +65 ns (128 sample) | +65 ns (128 sample) | +65 ns (128 sample) | | | |

Option 3-2-4. Method of Equally Dividing and Allocating all Remaining Time Samples at Every 0.125 ms (e.g., to OFDM Symbol #0 of Each Slot, that is, at Slot Level for 120 kHz SCS) without Allocation of Additional Time Samples to Each OFDM Symbol A new SCS may be the minimum SCS supportable in FR4. For example, the new SCS may be 120 kHz.

In addition, the CP length for each OFDM symbol and the number of time samples for the symbol length may be defined based on 0.5 ms (e.g., based on four slots for the 120 kHz SCS).

As a result, the symbol length and the CP length may be determined as shown in Equation 18.

That is, an additional CP length (e.g., 16 k) may be divided into 4 equal parts and then distributed to the CPs of the first and every $7 \cdot 2^{\mu-2}$-th OFDM symbols.

As an example, if the minimum SCS of FR4 is 120 kHz, OFDM symbol #0 in each slot may occupy additional 16*64/4=256 samples (=4 k), and the remaining OFDM symbols may occupy no additional samples.

As another example, if the minimum SCS of FR4 is 240 kHz, the first OFDM symbol in every two slots may occupy additional 16*64/4=256 samples (=4 k), and the remaining OFDM symbols may occupy no additional samples $$N_u^\mu = 2048\kappa \cdot 2^{-\mu} \quad \text{[Equation 18]}$$

$$N_{CP,l}^\mu = \begin{cases} 512\kappa \cdot 2^{-\mu} & \text{extended cyclic prefix} \\ 144\kappa \cdot 2^{-\mu} + 4\kappa & \text{normal cyclic prefix, } l = 0 \text{ or } l = 7 \cdot 2^{\mu-2} \\ 144\kappa \cdot 2^{-\mu} \cdot 2^{-\mu} & \text{normal cyclic prefix, } l \neq 0 \text{ and } l \neq 7 \cdot 2^{\mu-2} \end{cases}$$

Table 14 shows the NCP length, the ECP length, and the number of time samples derived according to Option 3-2-3 when the new SCS is 120 kHz.

TABLE 14

| | NCP | | | ECP | | |
|---|---|---|---|---|---|---|
| SCS [kHz] | 120 | 240 | 480 | 120 | 240 | 480 |
| Symbol duration | 8.33 us | 4.17 us | 2.08 us | 8.33 us | 4.17 us | 2.08 us |
| (time sample) | (16384 sample) | (8192 sample) | (4096 sample) | (16384 sample) | (8192 sample) | (4096 sample) |
| CP length | 586 ns | 293 ns | 146 ns | 2.085 us | 1.043 us | 521 ns |
| (time sample) | (1152 sample) | (576 sample) | (288 sample) | (4096 sample) | (2048 sample) | (1024 sample) |
| CP length with 4 Ts samples every 0.125 ms | +130 ns (256 sample) | +130 ns (256 sample) | +130 ns (256 sample) | | | |

When a specific signal/channel uses the NCP according to one of the options of Method 3-2, Method 3-1 or 3-1-1 may be additionally applied so that another signal/channel using the ECP is aligned in time at the level of 0.5 ms and/or 0.125 ms and/or at the slot and/or half-slot level.

In addition, when the SSB is configured with either the NCP or ECP, or when an initial channel (including SSB) is fixed to the NCP and a subsequent channel is configured with either the NCP or ECP, the following BS/UE operation and signaling methods may be applied.

[Method 3-3-1] As a signaling method when the BS is capable of configuring either the NCP or ECP for transmission of a control/data channel (e.g., CORESET #0) after the SSB is transmitted with the NCP, a fixed CP length (e.g., NCP) may be used up to the SSB, and the CP length of the signal/channel (e.g., CORESET #0) may be indicated by a PBCH MIB.

Proposed Method 3-3-1-1) Information on CP length types used for subsequent signals/channels may be independently signaled by the PBCH MIB. For example, the NCP or ECP may be indicated by PBCH MIB one-bit signaling. In addition, the CP lengths of signals/channels after the PBCH (e.g., from CORESET #0) may be determined by PBCH MIB signaling.

Proposed Method 3-3-1-1-1) When the CP length type is the ECP, slot level or half-slot level alignment information may also be signaled in addition to CP length type information. For example, one of the following slot level alignment types: types 0 to 2 may be indicated by PBCH MIB two-bit signaling.

Type 0: without timing alignment
Type 1: with slot level alignment
Type 2: with half-slot level alignment Proposed Method 3-3-1-1-2) CP length type information and slot level alignment information may be jointly signaled. For example, one of {NCP, ECP+type 0, ECP+type 1, ECP+type 2} may be indicated by PBCH MIB two-bit signaling.

Proposed Method 3-3-1-2) The CP length type may be signaled together with the SCS, which is originally signaled. As an example, one of all possible SCS and CP combinations may be indicated by the PBCH MIB. That is, one of the following combinations: SCSs of {120, 240, 480 kHz} and CP lengths of {NCP, ECP} may be signaled by three bits. As another example, one of two specific cases may be indicated by PBCH MIB one-bit signaling (in consideration of signaling overhead). The two specific cases may be, for example, 240 kHz SCS with the NCP or 480 kHz SCS with the ECP.

[Method 3-3-2] A fixed CP length (e.g., NCP) may be used up to the SSB and CORESET #0, and the CP length of a subsequent signal/channel may be indicated by DCI scheduling an SIB1 PDSCH. For example, if the methods proposed in [Method 3-3-1] are applied, elements transmitted over the PBCH MIB in [Method 3-1-1] may be transmitted by the DCI scheduling the SIB1 PDSCH.

[Method 3-3-3] A fixed CP length (e.g., NCP) may be used up to the SSB, CORESET #0, and SIB1, and the CP length of a subsequent signal/channel may be indicated by SIB1. For example, whether the NCP or ECP is used may be indicated by a serving cell configuration. If the methods proposed in [Method 3-3-1] are applied, elements transmitted over the PBCH MIB in [Method 3-1-1] may be transmitted by SIB1.

[Method 3-3-4] A fixed CP length (e.g., NCP) may be used up to the SSB, CORESET #0, and SIBx (where x is any integer), and the CP length of a subsequent signal/channel may be indicated in the RACH procedure. For example, whether the NCP or ECP is used may be indicated by message 2 (Msg 2) scheduling a PDCCH, an RAR (or success RAR) in a Msg 2 PDSCH, or a message 4 (Msg 4) PDCCH/PDSCH. If the methods proposed in [Method 3-3-1] are applied, elements transmitted over the PBCH MIB in [Method 3-1-1] may be transmitted in a specific signal in the RACH procedure.

Additionally, when the SCS or CP length type differs between initial and subsequent signals/channels (e.g., when the SCS or CP length type differs between an SSB and a control/data channel), the following BS/UE operation and signaling methods may be applied.

[Method 3-4-1] Even if different SCS or CP lengths are defined between initial and subsequent signals/channels, the SCS or CP used for one signal/channel may be applied under specific conditions (i.e., specific time slot, etc.). For example, when SCS0 and CP0 (e.g., 240 kHz SCS and NCP) are used for SSB transmission, and when SCS1 and CP1 (e.g., 480 kHz SCS and ECP) are used for control/data channel transmission, the following operations may be applied. For control/data channel transmission frequency division multiplexed (FDMed) with SSB transmission at a specific time point (e.g., symbol or slot), even if the BS instructs the UE to use SCS1 and CP1 (e.g., 480 kHz SCS and ECP), the UE may ignore the instruction and then receive the control/data channel by applying SCS0 and CP0 (e.g., 240 kHz and NCP) used for the SSB transmission. Since the BS informs the UE that the SSB and the control/data channel are FDMed and transmitted, it is desirable that the UE ignores the separately indicated SCS or CP value for the control/data channel.

Accordingly, the UE may receive the control/data channel by applying SCS0 and CP0 (e.g., 240 kHz and NCP) of the corresponding SSB to symbols or slots overlapping in the time domain with SSB symbols (i.e., FDMed symbols or slots) at the time when the UE needs to receive the SSB (for measurement).

[Method 3-4-2] Alternatively, when different SCSs or CPs are defined between initial and subsequent signals/channels, the two signals/channels may be FDMed by configuring a frequency gap between two signal/channel transmission bands. In this case, the BS may need to provide information on the frequency gap to the UE through an MIB or SIB.

4. ECP Based SSB Structure (for 120 kHz SCS and 240 kHz SCS)

In the following description, 'transmission of SSB index A' may mean 'transmission of an SSB with index A'. In addition, 'transmission of CORESET #0 index A' may mean 'transmission of CORESET #0 with index A'. Similarly, transmission of 'SSB index' may mean transmission of an SSB with a corresponding index. In addition, transmission of 'CORESET #0 index' may mean transmission of CORESET #0 with a corresponding index.

Further, 'transmission of A in symbol set B', 'transmission of A via symbol set B', and 'symbol transmission of A in set B' may mean 'transmission of A in symbols included in set B and/or on symbols included in set B'.

Additionally, CORESET #0 may mean a CORESET for transmitting a PDCCH for scheduling SIB1.

[Proposed Method 4-1-1] For the 120 kHz SCS, two SSB indices may be transmitted continuously, and for the 240 kHz SCS, four SSB indices may be transmitted continuously. The SSB density may be configured such that 64 SSBs are transmitted per 5 ms. When the SSB and CORESET #0 are configured with the same SCS, CORESET #0 consisting of (up to) two symbols may be configured to be time division multiplexed (TDMed) before the SSB.

Figure 20:
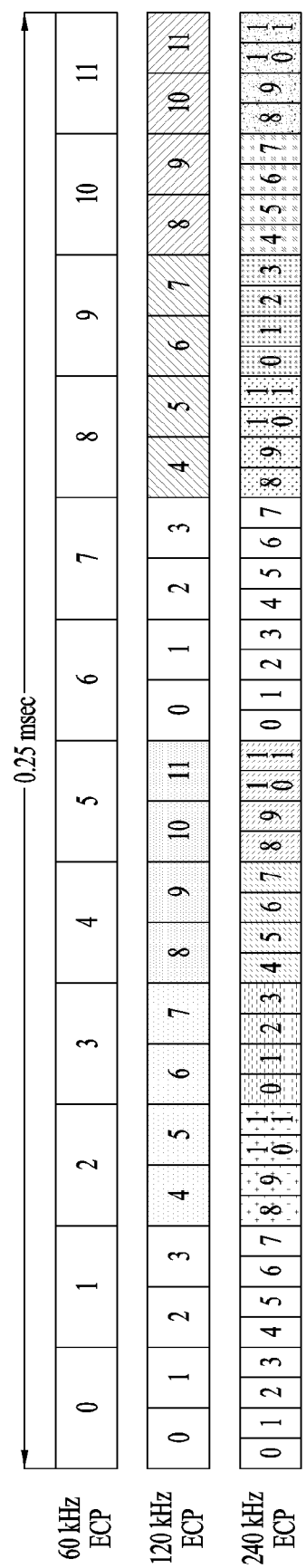

Referring to FIG. 20, for the 120 kHz SCS, two SSBs may be transmitted continuously within 0.25 ms after emptying the first four OFDM symbols in each slot. For the 240 kHz SCS, one SSB may be transmitted in OFDM symbols #8 to #11 in slots #0 and #2, and three SSBs may be transmitted in all OFDM symbols in slots #1 and #3.

Figure 21:
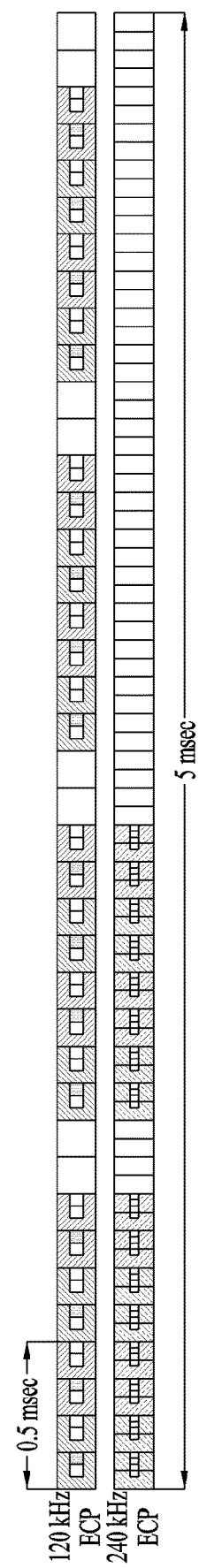

Referring to FIG. 21, a total of 64 SSBs may be transmitted within 5 ms. For the 120 kHz SCS, the 0.25 ms of SSB transmission (SSB transmission described with reference to FIG. 20) may be repeated four times for 1 ms, and then a gap of 0.25 ms may be configured. In addition, the 1.25 ms set (i.e., 16 SSBs+0.25 ms (two-slot) gap) may be repeated four times in total. For the 240 kHz SCS, the 0.25 ms of SSB transmission (SSB transmission described with reference to FIG. 20) may be repeated four times for 1 ms, and then a gap of 0.25 ms may be configured. In addition, the 1.25 ms set (i.e., 32 SSBs+0.25 ms (four-slot) gap) may be repeated twice in total. In the remaining 2.5 ms, no SSB is transmitted.

[Proposed Method 4-1-1-1] When the SSB and CORESET #0 are configured with the same SCS based on Proposed Method 4-1-1, CORESET #0 consisting of up to one symbol may be configured to be TDMed before the SSB. In particular, for the 120 kHz SCS, a gap of the last two symbol may be configured after consecutive SSBs. The last two-symbol gap may be used for UL transmission of the UE. The SSB density may be configured such that 64 SSBs are transmitted per 5 ms. The last two-symbol gap may be used for UL transmission of the UE. The SSB density may be configured such that 64 SSBs are transmitted per 5 ms.

Figure 22:
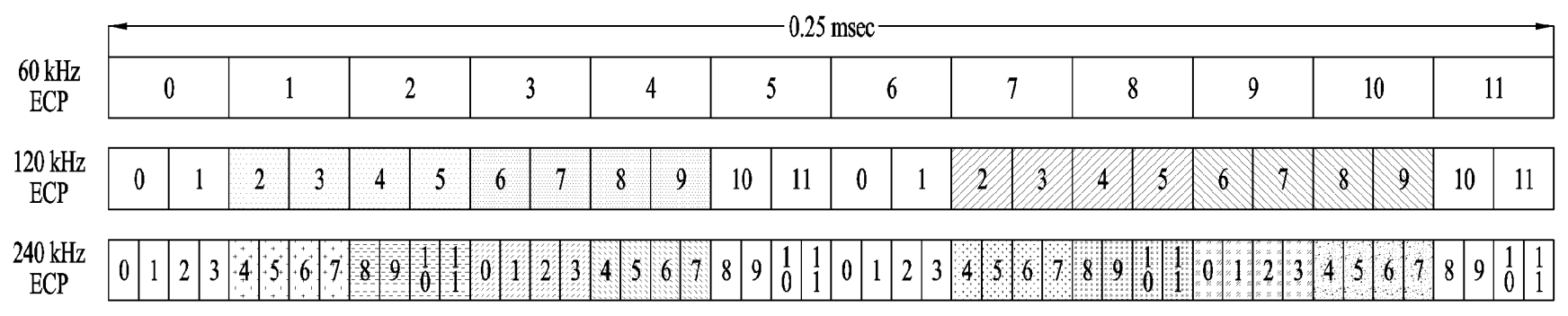

Referring to FIG. 22, for the 120 kHz SCS, the first two OFDM symbols (symbols #0 and #1) in each slot within 0.25 ms may be empty symbols where no SSB is transmitted. Two SSBs may be transmitted continuously after the two empty symbols (in symbols #2 to #9). The last two OFDM symbols (symbols #10 and #11) after the two SSBs may be empty symbols where no SSB is transmitted. For the 240 kHz SCS, two SSBs may be continuously transmitted in OFDM symbols #4 to #11 in slots #0 and #2, and two SSBs may be continuously transmitted in OFDM symbols #0 to #7 in slots #1 and #3.

Figure 23:
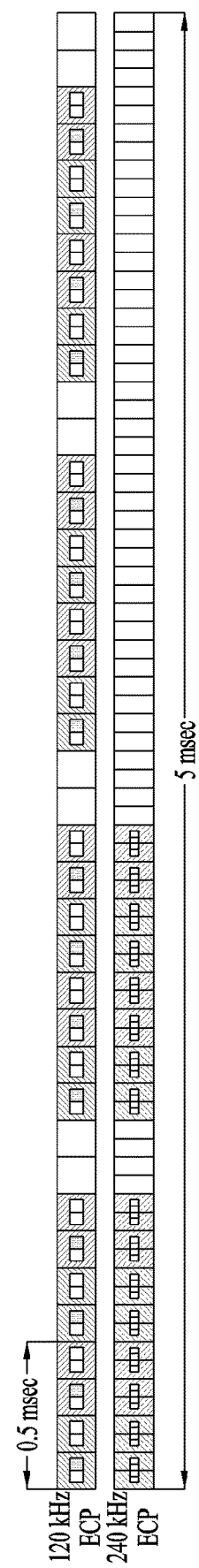

Referring to FIG. 23, a total of 64 SSBs may be transmitted within 5 ms. For the 120 kHz SCS, the 0.25 ms of SSB transmission (SSB transmission described with reference to FIG. 22) may be repeated four times for 1 ms, and then a gap of 0.25 ms may be configured. In addition, the 1.25 ms set (i.e., 16 SSBs+0.25 ms (two-slot) gap) may be repeated four times in total. For the 240 kHz SCS, the 0.25 ms of SSB transmission (SSB transmission described with reference to FIG. 22) may be repeated four times for 1 ms, and then a gap of 0.25 ms may be configured. In addition, the 1.25 ms set (i.e., 32 SSBs+0.25 ms (four-slot) gap) may be repeated twice in total. In the remaining 2.5 ms, no SSB is transmitted.

[Proposed Method 4-1-2] Proposed Method 4-1-2 may be considered when the SSB is transmitted with the 240 kHz SCS in FR4. For the 240 kHz SCS, two SSB indices may be transmitted continuously, and for the 120 kHz SCS, each SSB index may be transmitted discontinuously. The SSB density may be configured such that 64 SSBs are transmitted per 5 ms. When the SSB and CORESET #0 are configured with the same SCS, CORESET #0 consisting of (up to) two symbols may be configured to be TDMed before the SSB.

Figure 24:
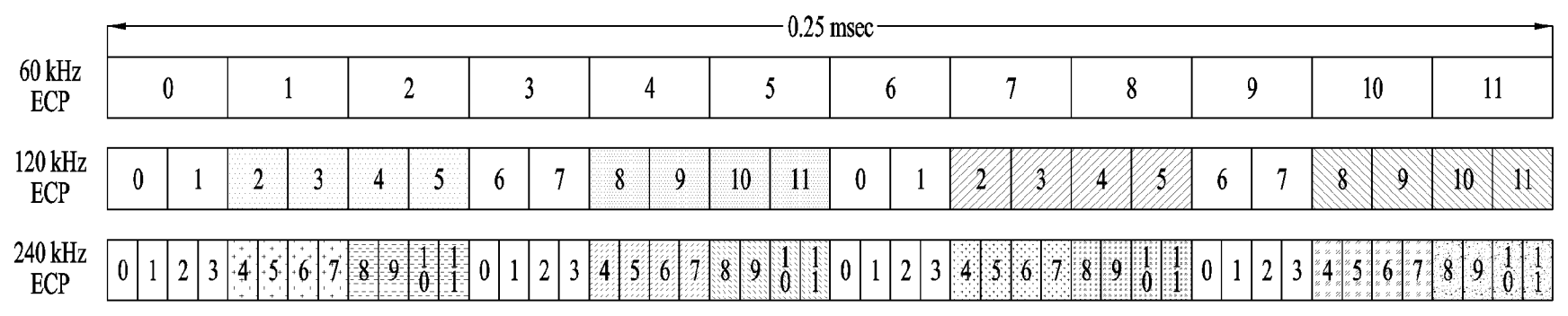

Referring to FIG. 24, for the 120 kHz SCS, the first two OFDM symbols (symbols #0 and #1) in each slot within 0.25 ms may be empty symbols where no SSB is transmitted, and one SSB may be transmitted in symbols #2 to #5. The next two OFDM symbols (symbols #6 and #7) may be empty symbols, and one SSB may be transmitted in symbols #8 to #11. For the 240 kHz SCS, two SSBs may be continuously transmitted in OFDM symbols #4 to #11 in each slot.

Figure 25:
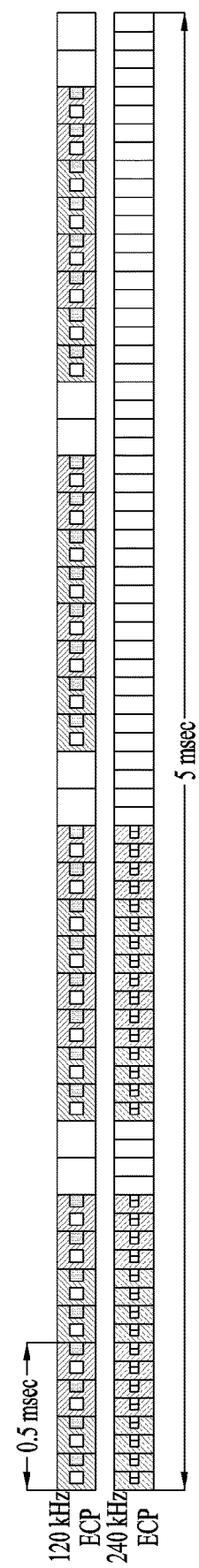

Referring to FIG. 25, a total of 64 SSBs may be transmitted within 5 ms. For the 120 kHz SCS, the 0.25 ms of SSB transmission (SSB transmission described with reference to FIG. 24) may be repeated four times for 1 ms, and then a gap of 0.25 ms may be configured. In addition, the 1.25 ms set (i.e., 16 SSBs+0.25 ms (two-slot) gap) may be repeated four times in total. For the 240 kHz SCS, the 0.25 ms of SSB transmission (SSB transmission described with reference to FIG. 24) may be repeated four times for 1 ms, and then a gap of 0.25 ms may be configured. In addition, the 1.25 ms set (i.e., 32 SSBs+0.25 ms (four-slot) gap) may be repeated twice in total. In the remaining 2.5 ms, no SSB is transmitted.

[Proposed Method 4-1-2-1] When the SSB and CORESET #0 are configured with the same SCS based on Proposed Method 2, CORESET #0 consisting of up to one symbol may be configured to be TDMed before the SSB. For the 240 kHz SCS, the last two symbol may be configured as a gap. In other words, the last two symbols (symbols #10 and #11) in the slot may be empty symbols where no SSB is transmitted. The last two-symbol gap may be used for UL transmission of the UE. The SSB density may be configured such that 64 SSBs are transmitted per 5 ms.

Figure 26:
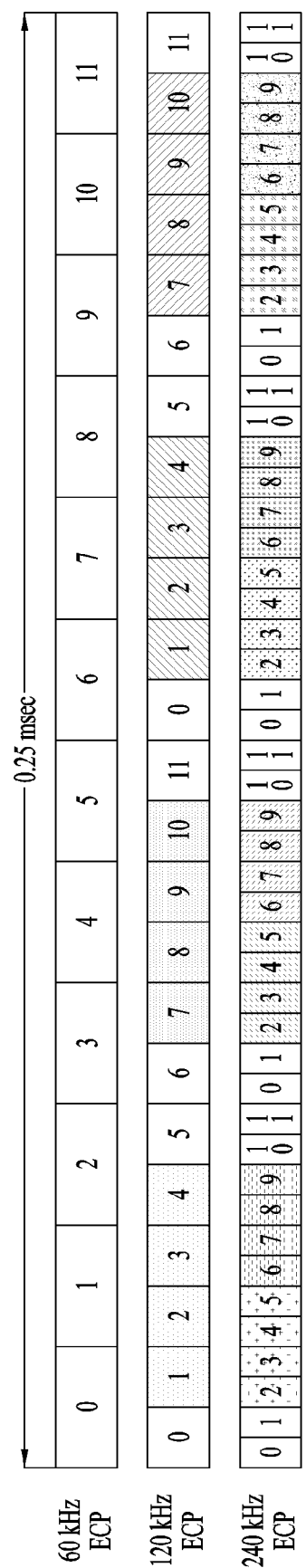

Referring to FIG. 26, for the 120 kHz SCS, the first one OFDM symbol (symbol #0) in each slot within 0.25 ms may be a symbol in which no SSB is transmitted, and one SSB may be transmitted in symbols #1 to #4. No SSB may be transmitted in the next two OFDM symbols (symbols #5 and #6), and one SSB may be transmitted in symbols #7 to #10. In the last one OFDM symbol (symbol #11), no SSB may be transmitted. For the 240 kHz SCS, two SSBs may be continuously transmitted in OFDM symbols #2 to #9 in each slot. No SSB may be transmitted in the first two OFDM symbols and last first two OFDM symbols (symbols #0 and #1 and symbols #10 and #11) in each slot.

Figure 27:
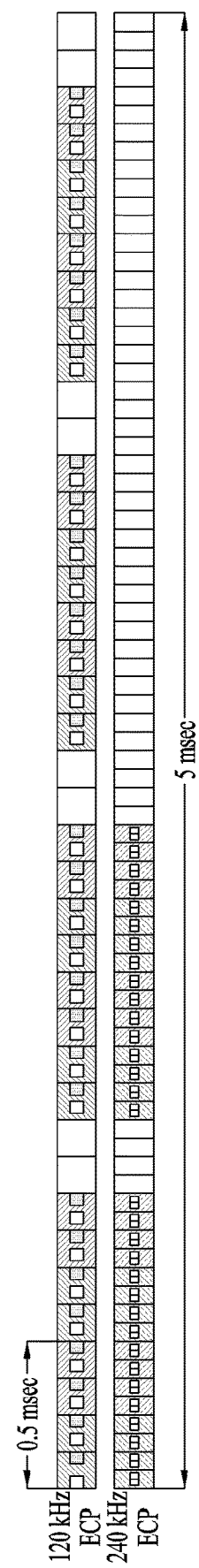

Referring to FIG. 27, a total of 64 SSBs may be transmitted within 5 ms. For the 120 kHz SCS, the 0.25 ms of SSB transmission (SSB transmission described with reference to FIG. 26) may be repeated four times for 1 ms, and then a gap of 0.25 ms may be configured. In addition, the 1.25 ms set (i.e., 16 SSBs+0.25 ms (two-slot) gap) may be repeated four times in total. For the 240 kHz SCS, the 0.25 ms of SSB transmission (SSB transmission described with reference to FIG. 26) may be repeated four times for 1 ms, and then a gap of 0.25 ms may be configured. In addition, the 1.25 ms set (i.e., 32 SSBs+0.25 ms (four-slot) gap) may be repeated twice in total. In the remaining 2.5 ms, no SSB is transmitted.

[Proposed Method 4-1-2-2] The SSB positions for the 240-kHz ECP may be configured by pulling the SSB positions based on Proposed Method 2 by one symbol. For the 240 kHz SCS, two SSB indices may be transmitted continuously, and for the 120 kHz SCS, each SSB index may be transmitted discontinuously. The SSB density may be configured such that 64 SSBs are transmitted per 5 ms. When the 240 kHz SCS is used for the SSB, if CORESET #0 is configured based on the 480 kHz SCS, CORESET #0 consisting of three symbols may be configured so that CORESET #0 may be TDMed before the SSB. In addition, for the 240 kHz SCS, the last symbol of each slot may be configured as a gap (empty symbol where no SSB is transmitted). The last one-symbol gap may be used for UL transmission of the UE.

Figure 28:
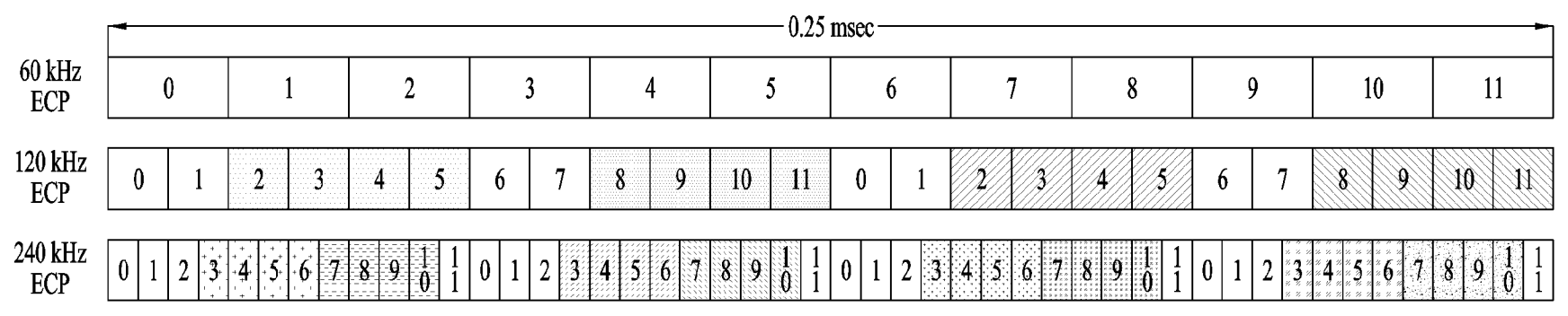

Referring to FIG. 28, for the 120 kHz SCS, no SSB may be transmitted in the first two OFDM symbols (symbols #0 and #1) in each slot within 0.25 ms, and one SSB may be transmitted in symbols #2 to #5. No SSB may be transmitted in the next two OFDM symbols (symbols #6 and #7), and one SSB may be transmitted in symbols #8 to #11. For the 240 kHz SCS, two SSBs may be continuously transmitted in OFDM symbols #3 to #10 in each slot. No SSB may be transmitted in the first three OFDM symbols and the last one OFDM symbols of each slot.

Figure 29:
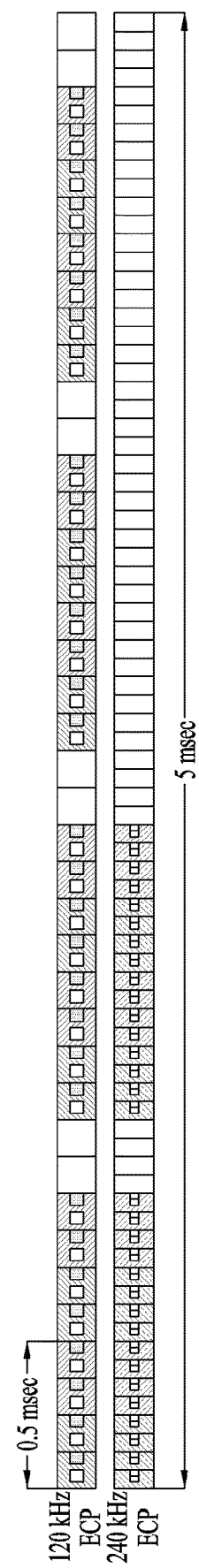

Referring to FIG. 29, a total of 64 SSBs may be transmitted within 5 ms. For the 120 kHz SCS, the 0.25 ms of SSB transmission (SSB transmission described with reference to FIG. 28) may be repeated four times for 1 ms, and then a gap of 0.25 ms may be configured. In addition, the 1.25 ms set (i.e., 16 SSBs+0.25 ms (two-slot) gap) may be repeated four times in total. For the 240 kHz SCS, the 0.25 ms of SSB transmission (SSB transmission described with reference to FIG. 28) may be repeated four times for 1 ms, and then a gap of 0.25 ms may be configured. In addition, the 1.25 ms set (i.e., 32 SSBs+0.25 ms (four-slot) gap) may be repeated twice in total. In the remaining 2.5 ms, no SSB is transmitted.

Figure 30:
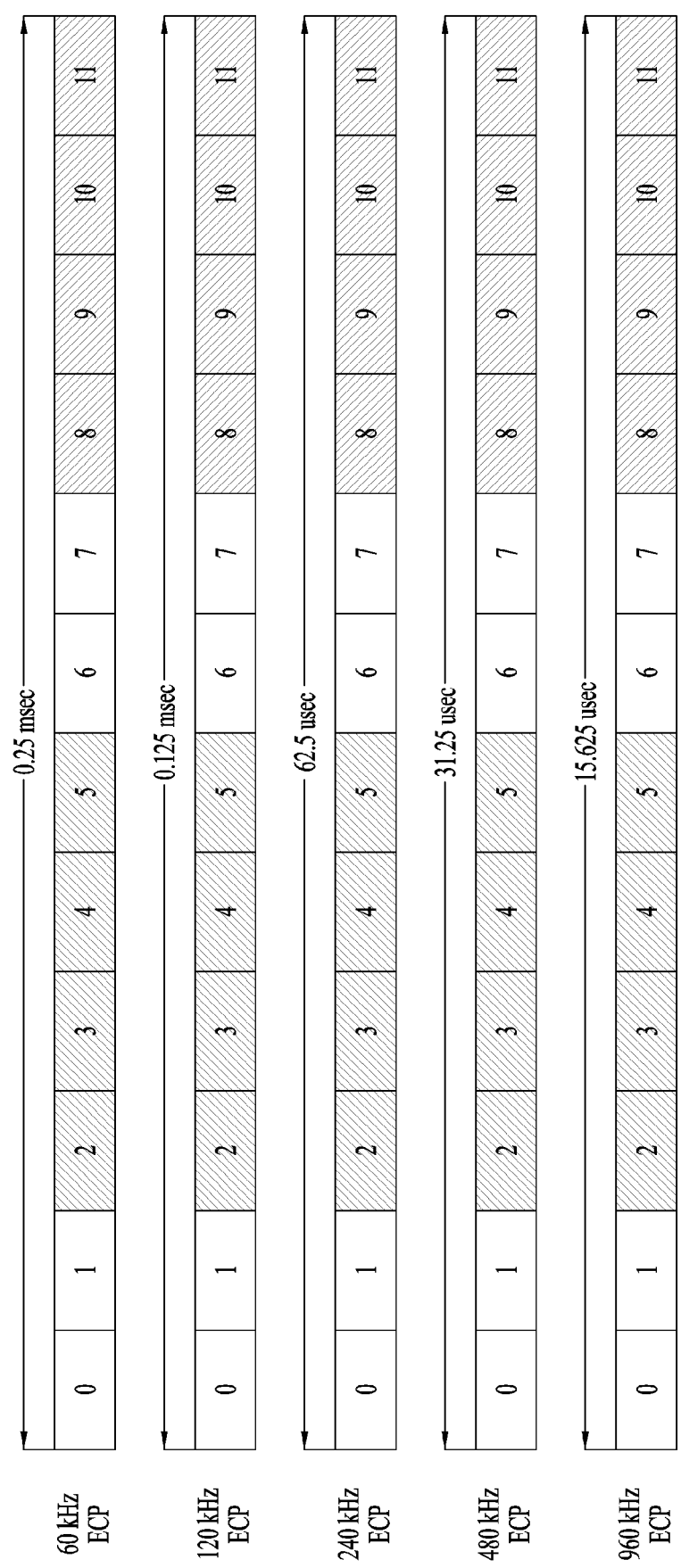

In addition, the SSB pattern for the 60 kHz SCS described in Proposed Methods 4-1-1, 4-1-1-1, 4-1-2, 4-1-2-1, and 4-1-2-2 may be extended and applied to other numerologies. For example, the SSB pattern for the 60 kHz SCS shown in FIG. 20 may be extended and applied to the following numerologies: 120 kHz, 240 kHz, 480 kHz, and 960 kHz other than the 60 kHz SCS, as shown in FIG. 30. That is, one SSB may be transmitted in OFDM symbols #2 to #5 of a specific slot in each numerology, regardless of numerologies, and another SSB may be transmitted in OFDM symbols #8 to #11 of the specific slot.

Additionally, the SSB pattern may be extended and applied based on a larger SCS than the above-described SCS (i.e., 120 kHz or 240 kHz). For example, for the 480 kHz SCS and/or 960 kHz SCS, the SSB pattern may be configured as follows by symbol level scaling down.

[Proposed Method 4-2-1] For the 480 kHz SCS, two SSB indices may be transmitted continuously, and for the 960 kHz SCS, four SSB indices may be transmitted continuously. The SSB density may be configured such that 64 SSBs are transmitted per 5 ms. When the SSB and CORESET #0 are configured with the same SCS, CORESET #0 consisting of (up to) two symbols may be TDMed before the SSB.

Figure 31:
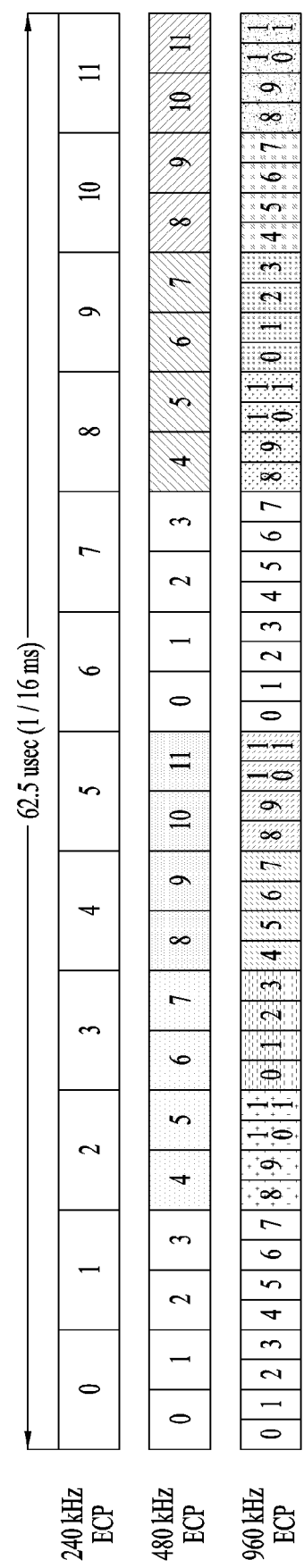

Referring to FIG. 31, for the 480 kHz SCS, no SSB may be transmitted in the first four OFDM symbols (symbols #0 to #3) in each slot within 62.5 usec, and two SSBs may be continuously transmitted in symbols #4 to #11. For the 960 kHz SCS, one SSB may transmitted in OFDM symbols #8 to #11 in slots #0 and #2, and three SSBs may be transmitted on all OFDM symbols in slots #1 and #3.

Figure 32:
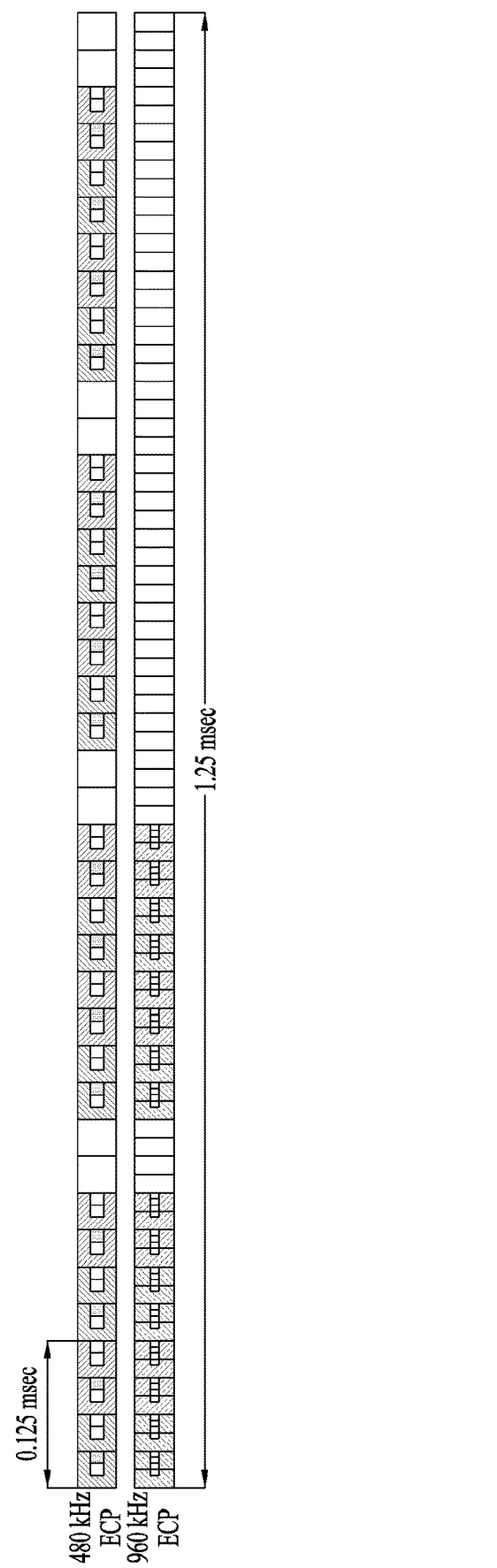

Referring to FIG. 32, a total of 64 SSBs may be transmitted within 5 ms. The slot positions of SSBs shown in FIG. 32 may be applied to the 480 kHz SCS and 960 kHz SCS, regardless of the use of the NCP or ECP and/or the symbol level positions of SSBs within a slot. For the 480 kHz SCS, within 1.25 ms of 5 ms, the 62.5 usec of SSB transmission (SSB transmission described with reference to FIG. 31) may be repeated four times for 0.25 ms, and then a gap of 0.0625 ms may be configured. In addition, the 0.3125 ms set (i.e., 16 SSBs+0.0625 ms (two-slot) gap) may be repeated four times in total. No SSB may be transmitted in the remaining 3.75 ms. For the 960 kHz SCS, within 0.625 ms of 5 ms, the 62.5 usec of SSB transmission (SSB transmission described with reference to FIG. 31) may be repeated four times for 0.25 ms, and then a gap of 0.0625 ms may be configured. In addition, the 0.3125 ms set (i.e., 32 SSBs+0.0625 ms (four-slot) gap) may be repeated twice in total. No SSB may be transmitted in the remaining 4.375 ms.

[Proposed Method 4-2-1-1] When the SSB and CORESET #0 are configured with the same SCS based on Proposed Method 4-2-1-1, CORESET #0 consisting of up to one symbol may be configured to be TDMed before the SSB. In particular, for 480 kHz SCS, the last two symbols in the slot may be configured as a gap. In other words, the last two symbols in the slot (symbols #10 and #11) may be empty symbols where no SSB is transmitted. The last two-symbol gap may be used for UL transmission of the UE. The SSB density may be configured such that 64 SSBs are transmitted per 5 ms.

Figure 33:
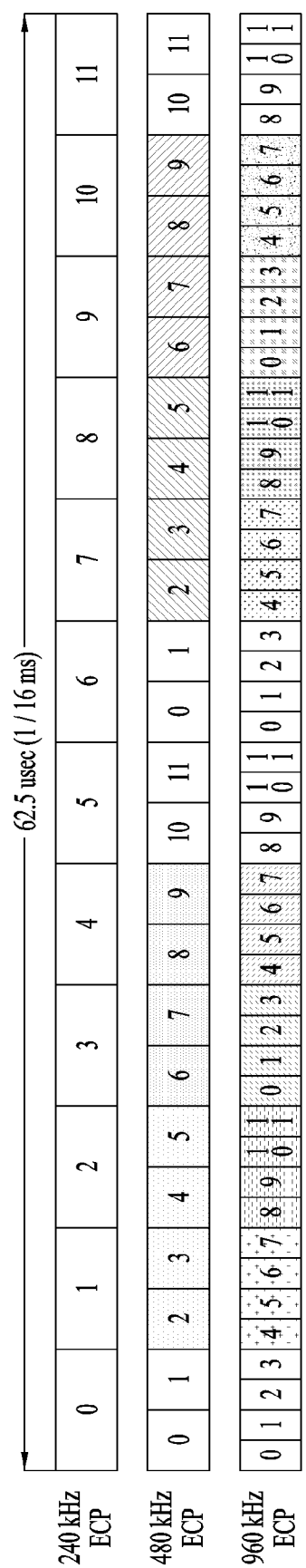

Referring to FIG. 33, for the 480 kHz SCS, no SSB may be transmitted in the first two OFDM symbols (symbols #0 and #1) in each slot within 62.5 usec, and two SSBs may be continuously transmitted in symbols #2 to #9. No SSB may be transmitted in the last two OFDM symbols (symbols #10 and #11) in the slot. For the 960 kHz SCS, two SSBs may be continuously transmitted in OFDM symbols #4 to #11 in slots #0 and #2, and two SSBs may be continuously transmitted in OFDM symbols #0 to #7 in slots #1 and #3.

Figure 34:
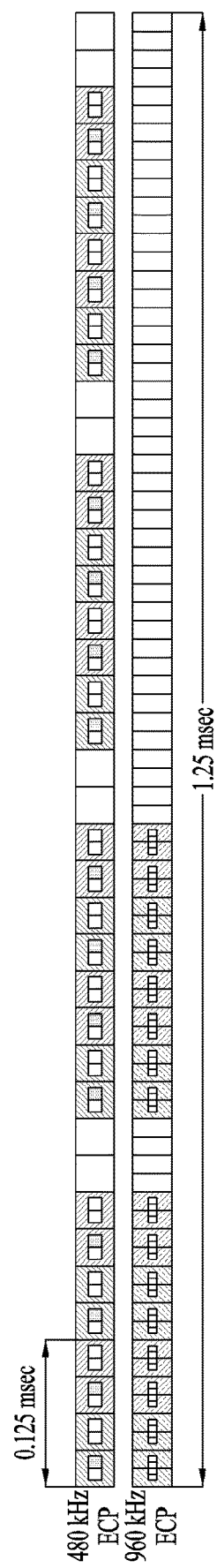

Referring to FIG. 34, a total of 64 SSBs may be transmitted within 5 ms. For the 480 kHz SCS, within 1.25 ms of 5 ms, the 62.5 usec of SSB transmission (SSB transmission described with reference to FIG. 33) may be repeated four times for 0.25 ms, and then a gap of 0.0625 ms may be configured. In addition, the 0.3125 ms set (i.e., 16 SSBs+0.0625 ms (two-slot) gap) may be repeated four times in total. No SSB may be transmitted in the remaining 3.75 ms. For the 960 kHz SCS, within 0.625 ms of 5 ms, the 62.5 usec of SSB transmission (SSB transmission described with reference to FIG. 33) may be repeated four times for 0.25 ms, and then a gap of 0.0625 ms may be configured. In addition, the 0.3125 ms set (i.e., 32 SSBs+0.0625 ms (four-slot) gap) may be repeated twice in total. No SSB may be transmitted in the remaining 4.375 ms.

[Proposed Method 4-2-2] Proposed Method 4-2-2 may be considered when the SSB is transmitted with the 960 kHz SCS in FR4. More particularly, two SSB indices may be continuously transmitted for the 960 kHz SCS, and each SSB index may be transmitted discontinuously for the 480 kHz SCS. The SSB density may be configured such that 64 SSBs are transmitted per 5 ms. When the SSB and CORESET #0 are configured with the same SCS, CORESET #0 consisting of (up to) two symbols may be configured to be TDMed before the SSB.

Figure 35:
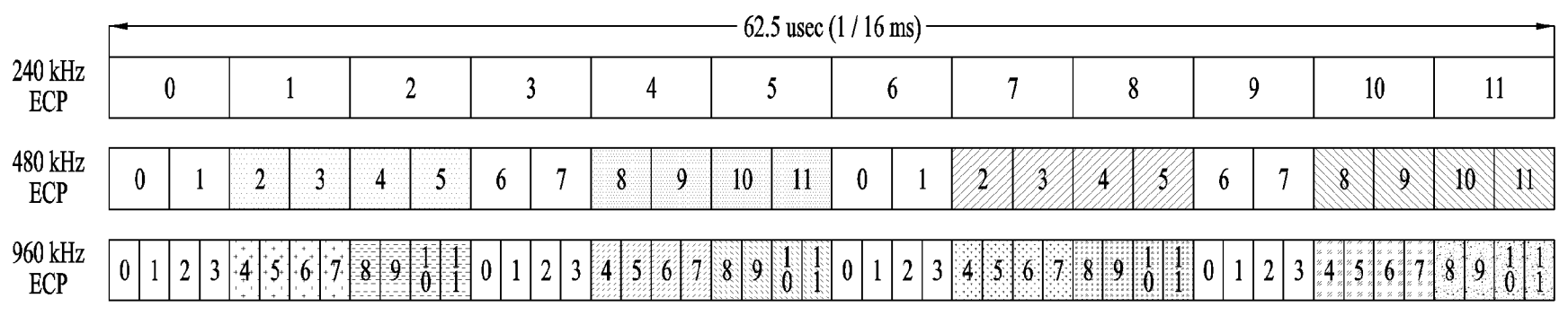

Referring to FIG. 35, for the 480 kHz SCS, no SSB may be transmitted in the first two OFDM symbols (symbols #0 and #1) in each slot within 62.5 usec, and one SSB may be transmitted in symbols #2 to #5. Then, no SSB may be transmitted in the next two OFDM symbols (symbols #6 and #7), and one SSB may be transmitted in symbols #8 to #11. For the 960 kHz SCS, two SSBs may be continuously transmitted in OFDM symbols #4 to #11 in each slot.

Figure 36:
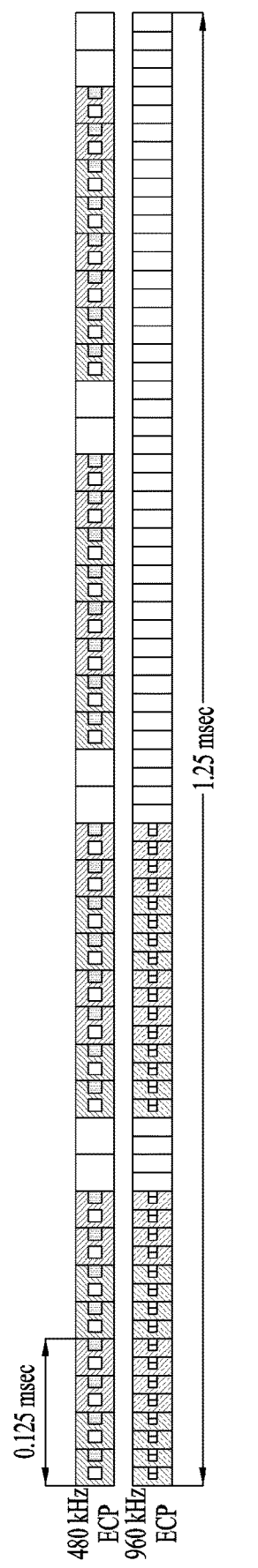

Referring to FIG. 36, a total of 64 SSBs may be transmitted within 5 ms. For the 480 kHz SCS, within 1.25 ms of 5 ms, the 62.5 usec of SSB transmission (SSB transmission described with reference to FIG. 35) may be repeated four times for 0.25 ms, and then a gap of 0.0625 ms may be configured. In addition, the 0.3125 ms set (i.e., 16 SSBs+0.0625 ms (two-slot) gap) may be repeated four times in total. No SSB may be transmitted in the remaining 3.75 ms. For the 960 kHz SCS, within 0.625 ms of 5 ms, the 62.5 usec of SSB transmission (SSB transmission described with reference to FIG. 35) may be repeated four times for 0.25 ms, and then a gap of 0.0625 ms may be configured. In addition, the 0.3125 ms set (i.e., 32 SSBs+0.0625 ms (four-slot) gap) may be repeated twice in total. No SSB may be transmitted in the remaining 4.375 ms.

[Proposed Method 4-2-2-1] When the SSB and CORESET #0 are configured with the same SCS based on Proposed Method 4-2-2, CORESET #0 consisting of up to one symbol may be configured to be TDMed before the SSB. For 960 kHz SCS, the last two symbols may be configured as a gap. In other words, no SSB may be transmitted in the last two symbols in the slot. The last two-symbol gap may be used for UL transmission of the UE. The SSB density may be configured such that 64 SSBs are transmitted per 5 ms.

Figure 37:
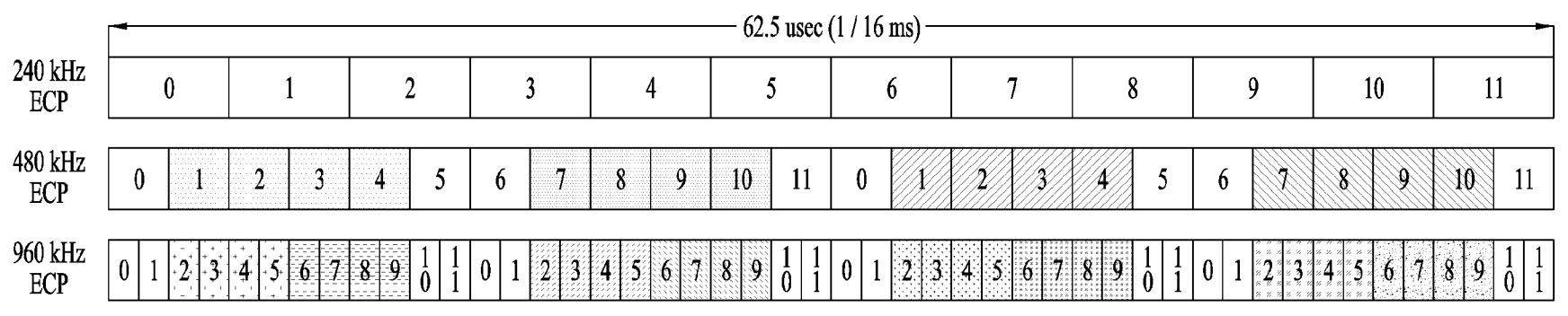

Referring to FIG. 37, for the 480 kHz SCS, no SSB may be transmitted in the first one OFDM symbol (symbol #0) in each slot within 62.5 usec, and one SSB may be transmitted in symbols #1 to #4. No SSB may be transmitted in the next two OFDM symbols (symbols #5 and #6), and one SSB may be transmitted in symbols #7 to #10. No SSB may be transmitted in the last one OFDM symbol (symbol #11) in the slot. For the 960 kHz SCS, two SSBs may be continuously transmitted in OFDM symbols #2 to #9 in each slot. No SSB may be transmitted in the first two OFDM symbols and the last two OFDM symbols (symbols #0 and #1 and symbols #10 and #11) in each slot.

Figure 38:
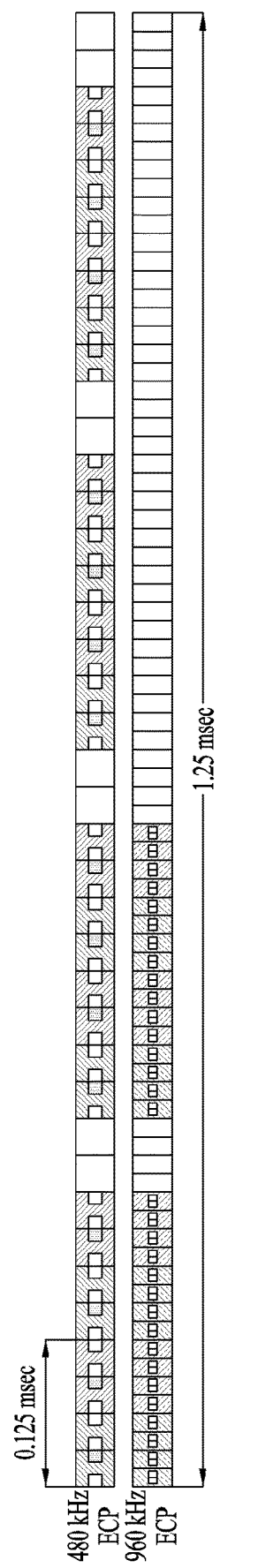

Referring to FIG. 38, a total of 64 SSBs may be transmitted within 5 ms. For the 480 kHz SCS, within 1.25 ms of 5 ms, the 62.5 usec of SSB transmission (SSB transmission described with reference to FIG. 37) may be repeated four times for 0.25 ms, and then a gap of 0.0625 ms may be configured. In addition, the 0.3125 ms set (i.e., 16 SSBs+0.0625 ms (two-slot) gap) may be repeated four times in total. No SSB may be transmitted in the remaining 3.75 ms. For the 960 kHz SCS, within 0.625 ms of 5 ms, the 62.5 usec of SSB transmission (SSB transmission described with reference to FIG. 37) may be repeated four times for 0.25 ms, and then a gap of 0.0625 ms may be configured. In addition, the 0.3125 ms set (i.e., 32 SSBs+0.0625 ms (four-slot) gap) may be repeated twice in total. No SSB may be transmitted in the remaining 4.375 ms.

[Proposed Method 4-2-2-2] The SSB positions for the 960 kHz ECP may be configured by pulling the SSB positions based on Proposed Method 4-2-2 by one symbol. For 960 kHz SCS, two SSB indices may be transmitted continuously, and for the 480 kHz SCS, each SSB index may be transmitted discontinuously. The SSB density may be configured such that 64 SSBs are transmitted per 5 ms. For the 960 kHz SCS, the last symbol of each slot may be configured as a gap. In other words, no SSB may be transmitted in the last symbol of each slot. The last one-symbol gap may be used for UL transmission of the UE or DL/UL switching.

Figure 39:
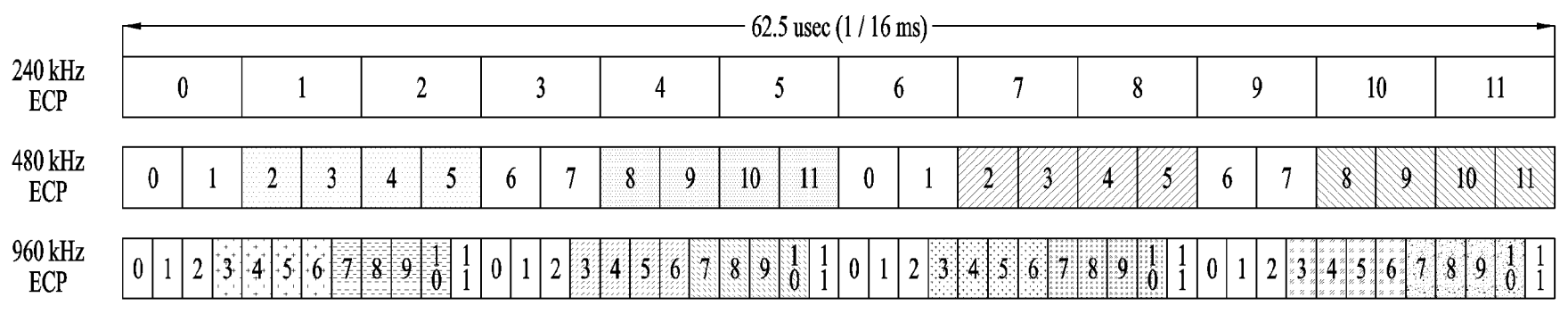

Referring to FIG. 39, for the 480 kHz SCS, no SSB may be transmitted in the first two OFDM symbols (symbols #0 and #1) in each slot within 62.5 usec, and one SSB may be transmitted in symbols #2 to #5. No SSB may be transmitted in the next two OFDM symbols (symbols #6 and #7), and one SSB may be transmitted in symbols #8 to #11. For the 960 kHz SCS, two SSBs may be continuously transmitted in OFDM symbols #3 to #10 in each slot. No SSB may be transmitted in the first three OFDM symbols (symbols #0 to #2) and the last one OFDM symbol (symbol #11) in each slot.

Figure 40:
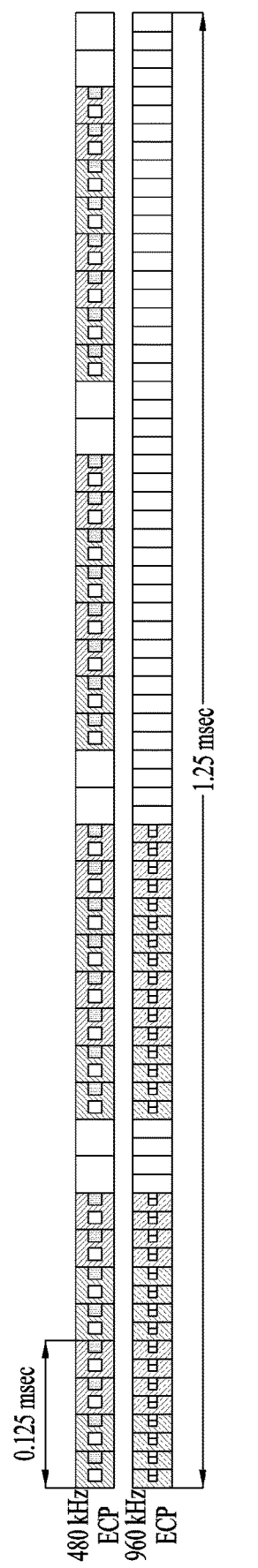

Referring to FIG. 40, a total of 64 SSBs may be transmitted within 5 ms. For the 480 kHz SCS, within 1.25 ms of 5 ms, the 62.5 usec of SSB transmission (SSB transmission described with reference to FIG. 39) may be repeated four times for 0.25 ms, and then a gap of 0.0625 ms may be configured. In addition, the 0.3125 ms set (i.e., 16 SSBs+0.0625 ms (two-slot) gap) may be repeated four times in total. No SSB may be transmitted in the remaining 3.75 ms. For the 960 kHz SCS, within 0.625 ms of 5 ms, the 62.5 usec of SSB transmission (SSB transmission described with reference to FIG. 39) may be repeated four times for 0.25 ms, and then a gap of 0.0625 ms may be configured. In addition, the 0.3125 ms set (i.e., 32 SSBs+0.0625 ms (four-slot) gap) may be repeated twice in total. No SSB may be transmitted in the remaining 4.375 ms.

A structure for aligning the timing of an SSB transmission position (e.g., 960 kHz SCS & ECP) may be configured based on the SSB transmission positions described above in Section 4. Specifically, the position of an SSB with a larger SCS (e.g., 480 kHz or 960 kHz) may be defined so that the position may be aligned in timing with the transmission position of an SSB with the 120 and/or 240 kHz described in the proposed methods.

[Proposed Method 4-3-1] When SSBs with the 480 or 960 kHz SCS are configured such that the SSBs are aligned with the positions of OFDM symbols in which SSBs with the 120 and/or 240 kHz SCS are transmitted based on Proposed Method 4-1-1, 16 SSB indices may be transmitted continuously for the 960 kHz SCS, and 8 SSB indices may be transmitted continuously for the 480 kHz SCS. The SSB density may be configured such that 64 SSBs are transmitted per 5 ms. When the SSB and CORESET #0 are configured with the same SCS, CORESET #0 consisting of (up to) two symbols may be TDMed before the SSB.

Referring to FIG. 31, for the 480 kHz SCS, no SSB may be transmitted on slot #0 within 0.125 ms. In slot #1, two SSBs may be transmitted in OFDM symbols #4 to #11. In slots #2 and #3, three SSBs may be transmitted over all OFDM symbols of each slot so that a total of 6 SSBs may be transmitted. For the 960 kHz SCS, no SSB may be transmitted in slots #0 and #1. In slot #2, one SSB may be transmitted in OFDM symbols #8 to #11. In slots #3, #4, #5, #6, and #7, three SSBs may be transmitted in all OFDM symbols of each slot so that a total of 15 SSBs may be transmitted.

Figure 41:
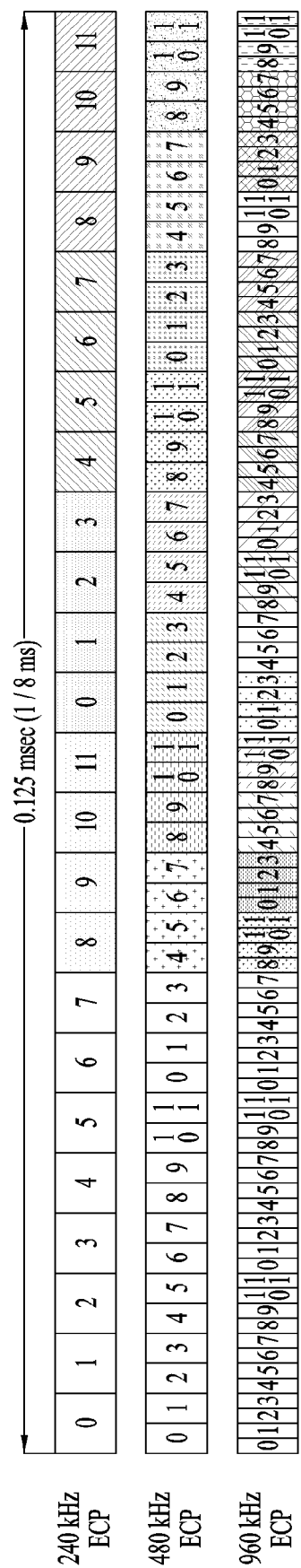
Figure 42:
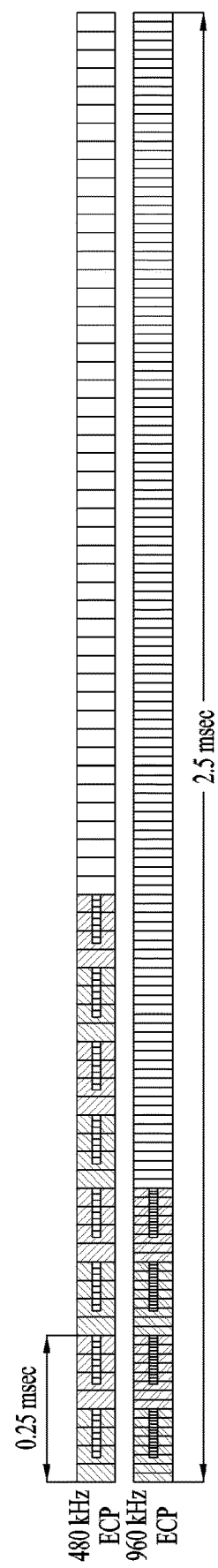

Referring to FIG. 42, a total of 64 SSBs may be transmitted within 5 ms. For the 480 kHz SCS, within 1 ms of 5 ms, the 0.125 ms of SSB transmission (SSB transmission described with reference to FIG. 41) may be repeated 8 times for 1 ms, and no SSB may be transmitted in the remaining 4 ms. For the 960 kHz SCS, within 0.5 ms of 5 ms, the 0.125 ms of SSB transmission (SSB transmission described with reference to FIG. 41) may be repeated four times for 0.5 ms, and no SSB may be transmitted in the remaining 4.5 ms.

[Proposed Method 4-3-1-1] When the SSB and CORESET #0 are configured with the same SCS based on Proposed Method 4-3-1, CORESET #0 consisting of up to one symbol may be configured to be TDMed before the SSB. The SSB density may be configured such that 64 SSBs are transmitted per 5 ms.

Figure 43:
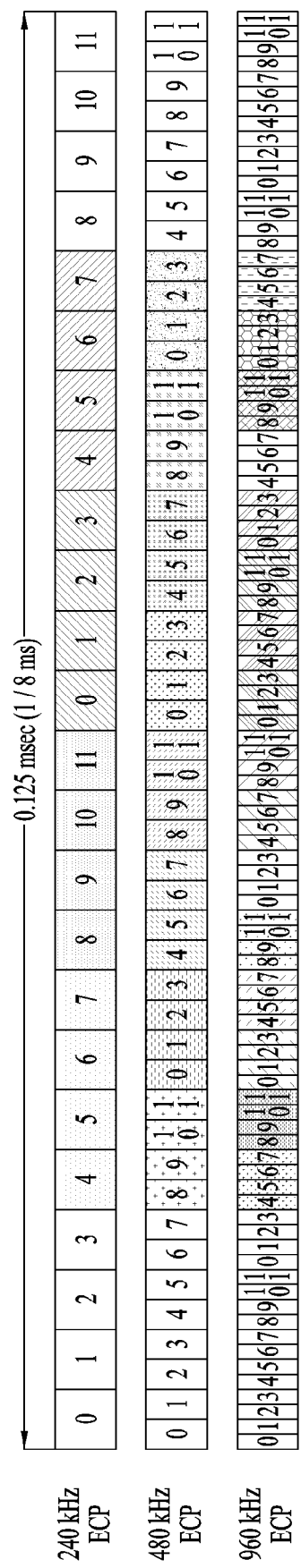

Referring to FIG. 43, for the 480 kHz SCS, an SSB may be transmitted in OFDM symbols #8 to #11 of slot #0 within 0.125 ms. In slot #3, an SSB may be transmitted in OFDM symbols #0 to #3. In slots #1 and #2, three SSBs may be transmitted in all OFDM symbols of each slot so that a total of 6 SSBs may be transmitted. For the 960 kHz SCS, no SSB may be transmitted in slots #0 and #7. In slot #1, two SSBs may be transmitted in OFDM symbols #4 to #11. In slot #6, two SSBs may be transmitted in OFDM symbols #0 to #7. In slots #2, #3, #4, and #5, three SSBs may be transmitted in all OFDM symbols of each slot so that a total of 12 SSBs may be transmitted.

Figure 44:
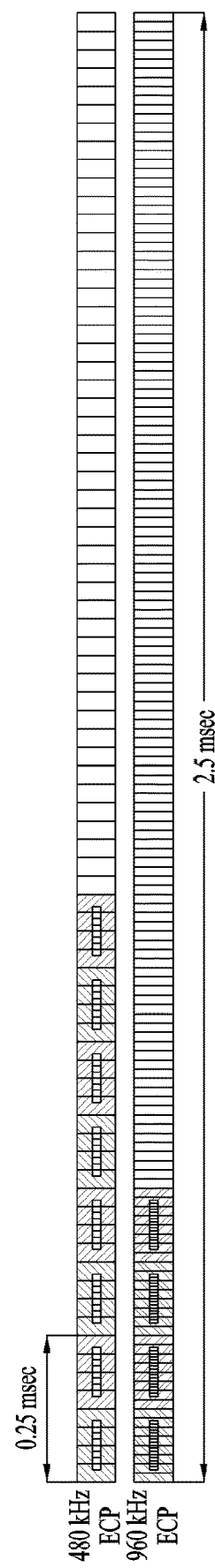

Referring to FIG. 44, a total of 64 SSBs may be transmitted within 5 ms. For the 480 kHz SCS, within 1 ms of 5 ms, the 0.125 ms of SSB transmission (SSB transmission described with reference to FIG. 43) may be repeated 8 times for 1 ms, and no SSB may be transmitted in the remaining 4 ms. For the 960 kHz SCS, within 0.5 ms of 5 ms, the 0.125 ms of SSB transmission (SSB transmission described with reference to FIG. 43) may be repeated four times for 0.5 ms, and no SSB may be transmitted in the remaining 4.5 ms.

[Proposed Method 4-3-2] When SSBs with the 480 or 960 kHz SCS are configured such that the SSBs are aligned with the positions of OFDM symbols in which SSBs with the 120 and/or 240 kHz SCS are transmitted based on Proposed Method 4-1-2, 8 SSB indices may be transmitted continuously for the 960 kHz SCS, and four SSB indices may be transmitted continuously for the 480 kHz SCS. The SSB density may be configured such that 64 SSBs are transmitted per 5 ms. When the SSB and CORESET #0 are configured with the same SCS, CORESET #0 consisting of (up to) two symbols may be TDMed before the SSB.

Figure 45:
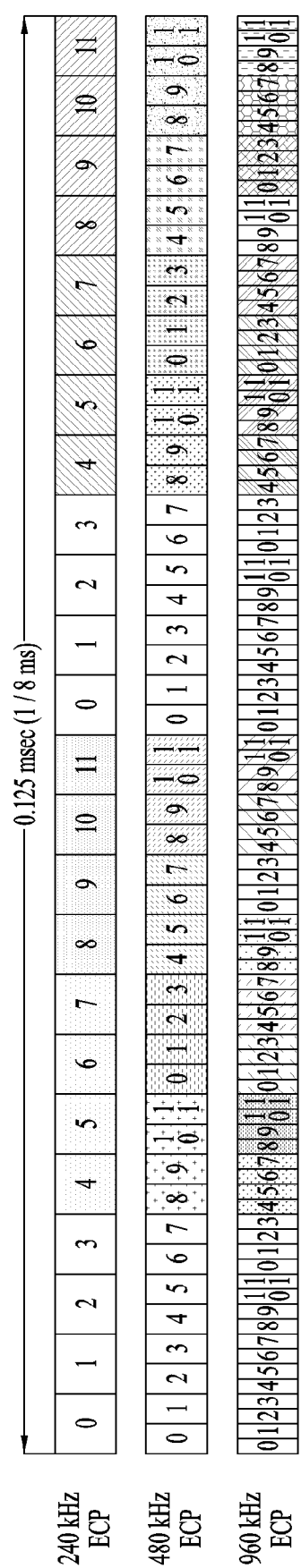

Referring to FIG. 45, for the 480 kHz SCS, an SSB may be transmitted in OFDM symbols #8 to #11 of slots #0 and #2 within 0.125 ms. In slots #1 and #3, three SSBs may be transmitted in all OFDM symbols of each slot so that a total of 6 SSBs may be transmitted. For the 960 kHz SCS, no SSB may be transmitted in slots #0 and #4. In slots #1 and #5, two SSBs may be transmitted in OFDM symbols #4 to #11 of each slot so that a total of four SSBs may be transmitted. In slots #2, #3, #6, and #7, three SSBs may be transmitted in all OFDM symbols of each slot so that a total of 12 SSBs may be transmitted.

Figure 46:
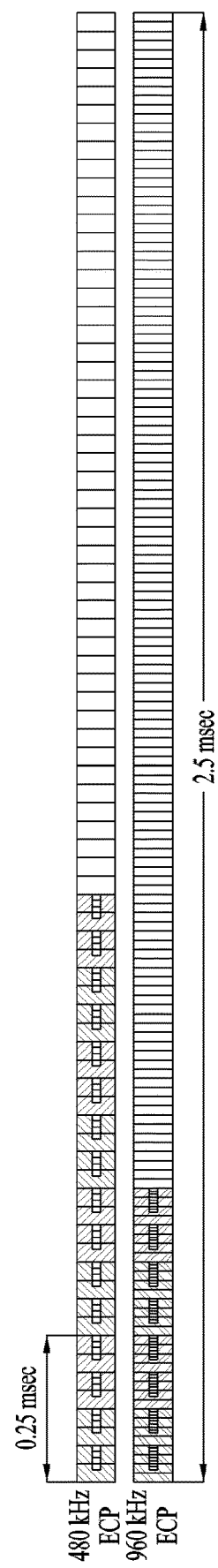

Referring to FIG. 46, a total of 64 SSBs may be transmitted within 5 ms. For the 480 kHz SCS, within 1 ms of 5 ms, the 0.125 ms of SSB transmission (SSB transmission described with reference to FIG. 45) may be repeated 8 times for 1 ms, and no SSB may be transmitted in the remaining 4 ms. For the 960 kHz SCS, within 0.5 ms of 5 ms, the 0.125 ms of SSB transmission (SSB transmission described with reference to FIG. 45) may be repeated four times for 0.5 ms, and no SSB may be transmitted in the remaining 4.5 ms.

[Proposed Method 4-3-2-1] When the SSB and CORESET #0 are configured with the same SCS based on Proposed Method 4-3-2, CORESET #0 consisting of up to one symbol may be configured to be TDMed before the SSB. The SSB density may be configured such that 64 SSBs are transmitted per 5 ms.

Figure 47:
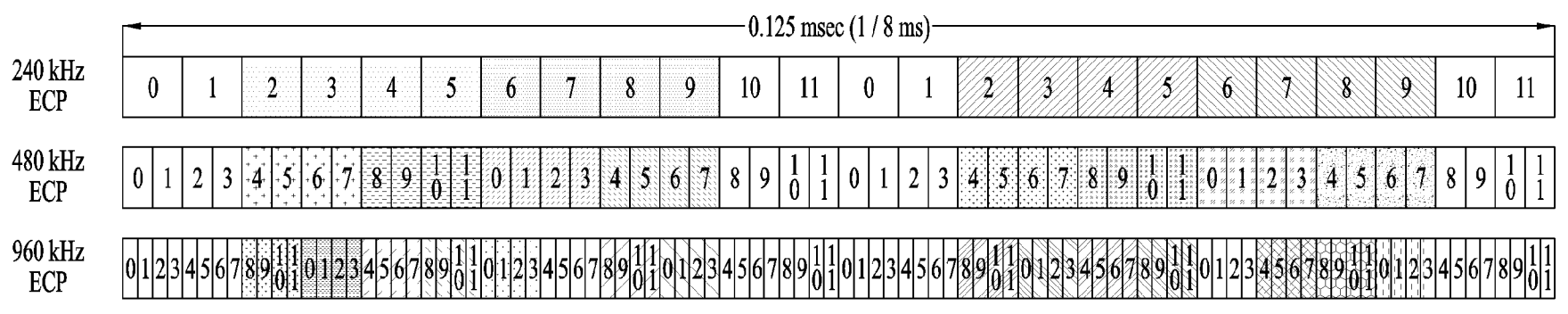

Referring to FIG. 47, for the 480 kHz SCS, within 0.125 ms, two SSBs may be transmitted in each slot so that a total of four SSBs may be transmitted in OFDM symbols #4 to #11 of slots #0 and #2. In addition, two SSBs may be transmitted in each slot so that a total of four SSBs are transmitted in OFDM symbols #0 to #7 of slots #1 and #3. For the 960 kHz SCS, one SSB may be transmitted in each slot so that a total of two SSBs may be transmitted in OFDM symbols #8 to #11 of slots #0 and #4. In addition, one SSB may be transmitted in each slot so that a total of two SSBs may be transmitted in OFDM symbols #0 and #3 of slots #3 and #7. In slots #1, #2, #5, and #6, three SSBs may be transmitted in all OFDM symbols of each slot so that a total of 12 SSBs may be transmitted.

Figure 48:
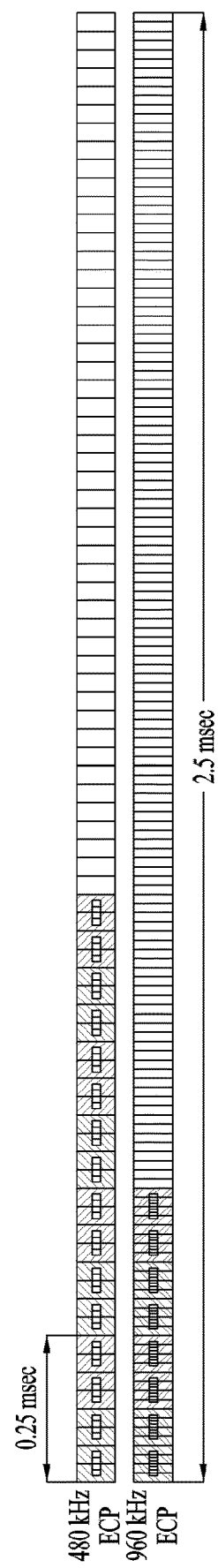

Referring to FIG. 48, a total of 64 SSBs may be transmitted within 5 ms. For the 480 kHz SCS, within 1 ms of 5 ms, the 0.125 ms of SSB transmission of 0.125 ms (SSB transmission described with reference to FIG. 47) may be repeated 8 times for 1 ms, and no SSB may be transmitted in the remaining 4 ms. For the 960 kHz SCS, within 0.5 ms of 5 ms, the 0.125 ms of SSB transmission (SSB transmission described with reference to FIG. 47) may be repeated four times for 0.5 ms, and no SSB may be transmitted in the remaining 4.5 ms.

[Proposed Method 4-3-2-2] The SSB positions for the 480 kHz ECP may be configured by pulling the SSB positions based on Proposed Method 4-3-2 by two symbols. The SSB positions for the 960 kHz ECP may be configured by pulling the SSB positions based on Proposed Method 4-3-2 by four symbols. According to Proposed Method 4-3-2-2, 8 SSB indices may be continuously transmitted for the 960 kHz SCS, and four SSB indices may be continuously transmitted for the 480 kHz SCS. The SSB density may be configured such that 64 SSBs are transmitted per 5 ms.

Figure 49:
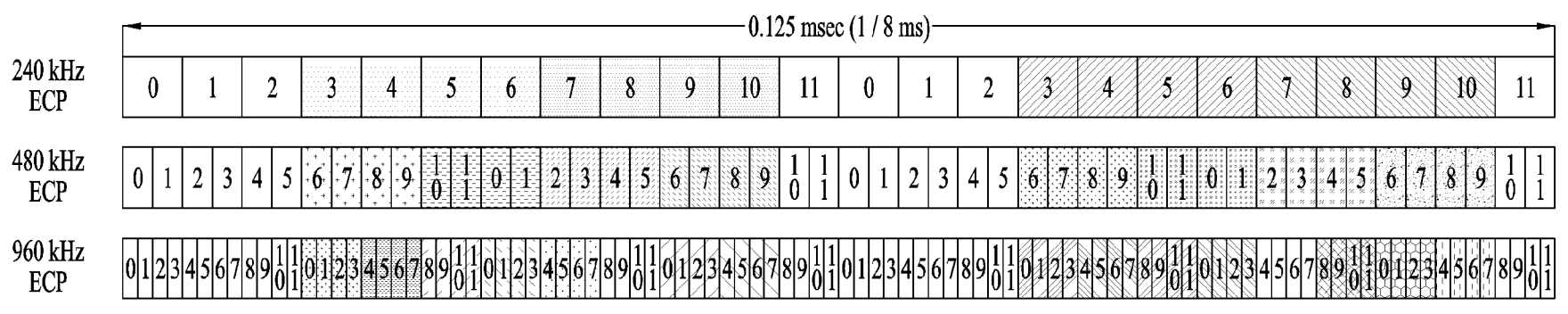

Referring to FIG. 49, for the 480 kHz SCS, four SSBs may be transmitted in a total of 16 OFDM symbols from OFDM symbol #6 of slot #0 to OFDM symbol #9 of slot #1 within 0.125 ms. In addition, four SSBs may be transmitted in a total of 16 OFDM symbols from OFDM symbol #6 of slot #2 to OFDM symbol #9 of slot #3. For the 960 kHz SCS, no SSB may be transmitted in slots #0 and #4. In slots #3 and #7, two SSBs may be transmitted in OFDM symbols #0 to #7 of each slot so that a total of four SSBs may be transmitted. In slots #1, #2, #5, and #6, three SSBs may be transmitted over all OFDM symbols of each slot so that a total of 12 SSBs may be transmitted.

Figure 50:
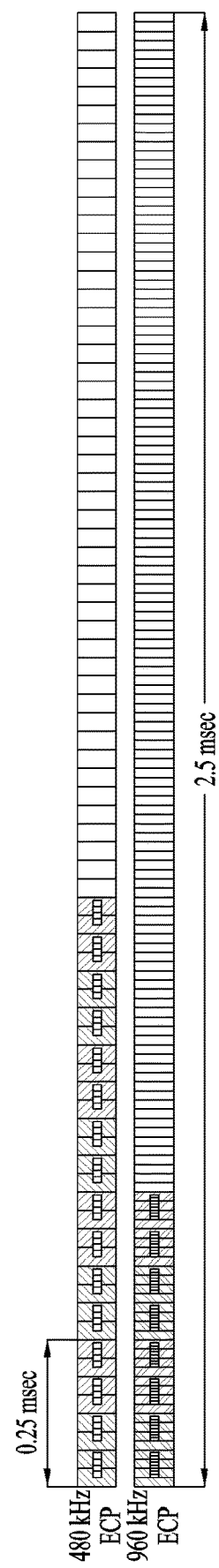

Referring to FIG. 50, a total of 64 SSBs may be transmitted within 5 ms. For the 480 kHz SCS, within 1 ms of 5 ms, the 0.125 ms of SSB transmission (SSB transmission described with reference to FIG. 49) may be repeated 8 times for 1 ms, and no SSB may be transmitted in the remaining 4 ms. For the 960 kHz SCS, within 0.5 ms of 5 ms, the 0.125 ms of SSB transmission (SSB transmission described with reference to FIG. 49) may be repeated four times for 0.5 ms, and no SSB may be transmitted in the remaining 4.5 ms.

5. ECP Based SSB Structure and CORESET #0 Design

The ECP configuration methods described in Section 3 may be used for SSBs and CORESET #0 in FR4. In the current NR system, since the SSB is configured based on the NCP, the number of symbols in each slot differs for the NCP and ECP. For the NCP, 14 OFDM symbols are included in each slot are included, whereas for the ECP, 12 OFDM symbols are included in each slot. Therefore, it is necessary to implement a new SSB structure and a new region for CORESET #0 for a case where the ECP is applied. Although it is assumed in the methods proposed below in Section 5 that a specific SCS is used based on FR4, the proposed methods may also be applied to other bands and SCSs if the ratio of the SCS of CORESET #0 to the SCS of the SSB is the same.

In the expression of {SCS0, SCS1} of the following proposed methods, SCS0 denotes an SCS applied to the SSB in units of kHz, and SCS1 denotes an SCS applied to CORESET #0 in units of kHz. The following three TDM/FDM patterns may be used between the SSB and CORESET #0.

Pattern 1: TDM between SSB and CORESET #0
Pattern 2: FDM between SSB and CORESET #0 with different numerologies
Pattern 3: FDM between SSB and CORESET #0 with same numerology The following methods are proposed for specific cases according to each pattern. In each case, the ECP based SSB structure configuration methods proposed in Section 4 may be used together.

[Proposed Method 5-1-1] Case 1: {240, 240} and Pattern 1

According to Proposed Method 5-1-1, while (maximum) 8 beams are transmitted over four slots, TDM may be performed between the SSB and CORESET #0. Two beams for CORESET #0 and two beams for the SSB may be transmitted in each slot.

Figure 51:
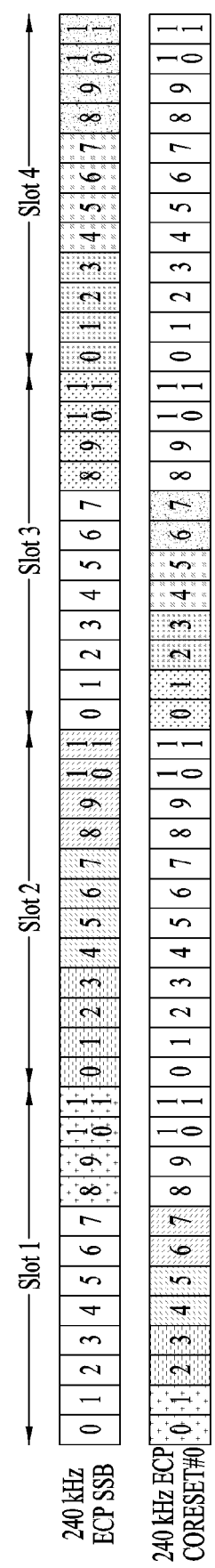

Referring to FIG. 51, when Proposed Method 4-1-1 is applied, SSB #0 may be transmitted in symbols #8 to #11 of slot #1, SSB #1 may be transmitted in symbols #0 to #3 of slot #2, SSB #2 may be transmitted in symbols #4 to #7 of slot #2, SSB #3 may be transmitted in symbols #8 to #11 of slot #2, SSB #4 may be transmitted in symbols #8 to #11 of slot #3, SSB #5 may be transmitted in symbols #0 to #3 of slot #4, SSB #3 may be transmitted in symbols #4 to #7 of slot #4, and SSB #8 may be transmitted in symbols #8 to #11 of slot #4.

Referring to FIG. 51, CORESET #0 #0 may be transmitted in symbols #0 and #1 of slot #1. CORESET #0 #1 may be transmitted in symbols #2 and #3 of slot #1. CORESET #0 #2 may be transmitted in symbols #4 and #5 of slot #1. CORESET #0 #3 may be transmitted in symbols #6 and #7 of slot #1. CORESET #0 #4 may be transmitted in symbols #0 and #1 of slot #3. CORESET #0 #5 may be transmitted in symbols #2 and #3 of slot #3. CORESET #0 #6 may be transmitted in symbols #4 and #5 of slot #3. CORESET #0 #7 may be transmitted in symbols #6 and #7 of slot #1.

Figure 52:
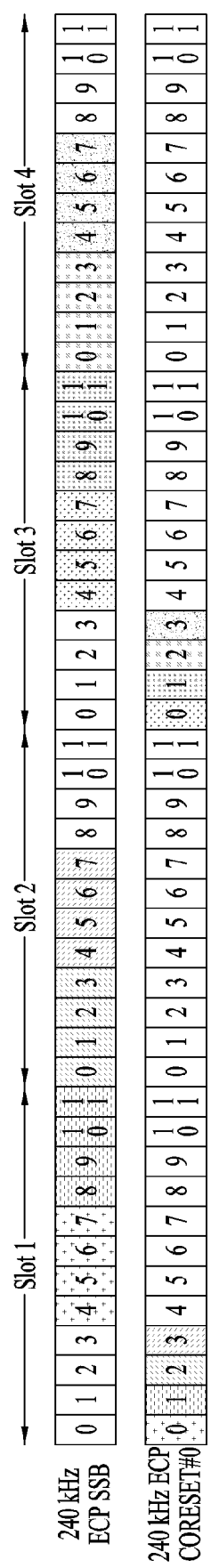

Referring to FIG. 52, when Proposed Method 4-1-1-1 is applied, SSB #0 may be transmitted in symbols #4 to #7 of slot #1, SSB #1 may be transmitted in symbols #8 to #11 of slot #1, SSB #2 may be transmitted in symbols #0 to #3 of slot #2, SSB #3 may be transmitted in symbols #4 to #7 of slot #2, SSB #4 may be transmitted in symbols #4 to #7 of slot #3, SSB #5 may be transmitted in symbols #8 to #11 of slot #3, SSB #6 may be transmitted in symbols #0 to #3 of slot #4, and SSB #7 may be transmitted in symbols #4 to #7 of slot #4.

Referring to FIG. 52, CORESET #0 #0 may be transmitted in symbol #0 of slot #1. CORESET #0 #1 may be transmitted in symbol #1 of slot #1. CORESET #0 #2 may be transmitted in symbol #2 of slot #1.CORESET #0 #3 may be transmitted in symbol #3 of slot #1. CORESET #0 #4 may be transmitted in symbol #0 of slot #3. CORESET #0 #5 may be transmitted in symbol #1 of slot #3. CORESET #0 #6 may be transmitted in symbol #2 of slot #3. CORESET #0 #7 may be transmitted in symbol #3 of slot #3.

When Proposed Method 4-1-1-1 is applied, resources used for CORESET #0 may be relatively small.

Figure 53:
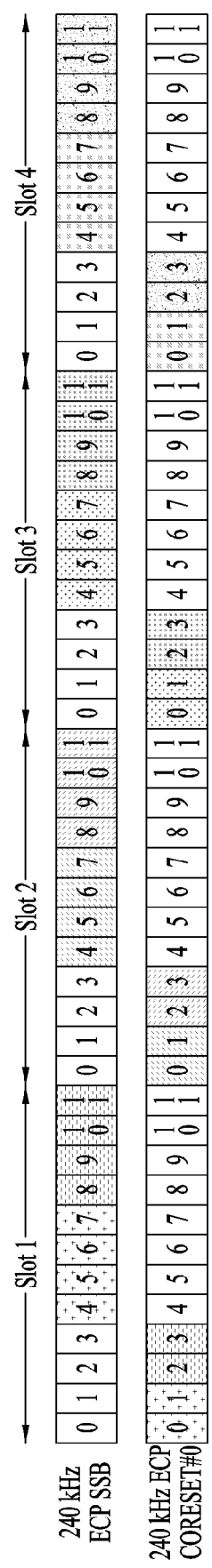

Referring to FIG. 53, when Proposed Method 4-1-2 is applied, SSB #0 may be transmitted in symbols #4 to #7 of slot #1, SSB #1 may be transmitted in symbols #8 to #11 of slot #1, SSB #2 may be transmitted in symbols #4 to #7 of slot #2, SSB #3 may be transmitted in symbols #8 to #11 of slot #2, SSB #4 may be transmitted in symbols #4 to #7 of slot #3, SSB #5 may be transmitted in symbols #8 to #11 of slot #3, SSB #6 may be transmitted in symbols #4 to #7 of slot #4, and SSB #7 may be transmitted in symbols #8 to #11 of slot #4.

Referring to FIG. 53, CORESET #0 #0 may be transmitted in symbols #0 and #1 of slot #1. CORESET #0 #1 may be transmitted in symbols #2 and #3 of slot #1. CORESET #0 #2 may be transmitted in symbols #0 and #1 of slot #2. CORESET #0 #3 may be transmitted in symbols #2 and #3 of slot #2. CORESET #0 #4 may be transmitted in symbols #0 and #1 of slot #3. CORESET #0 #5 may be transmitted in symbols #2 and #3 of slot #3. CORESET #0 #6 may be transmitted in symbols #0 and #1 of slot #4. CORESET #0 #7 may be transmitted in symbols #2 and #3 of slot #4.

Figure 54:
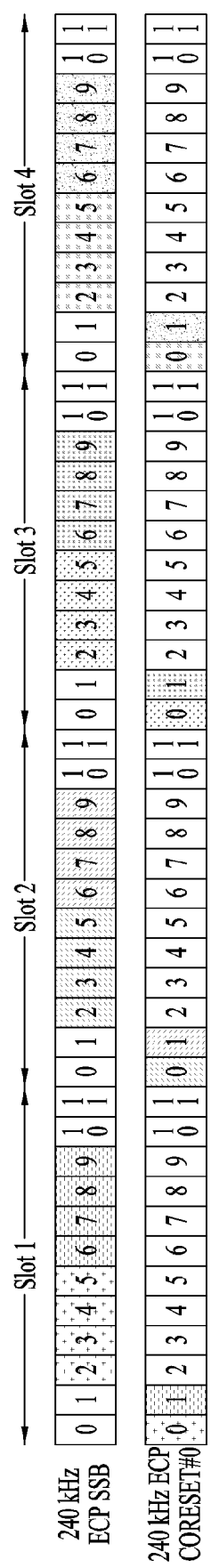

Referring to FIG. 54, when Proposed Method 4-1-2-1 is applied, SSB #0 may be transmitted in symbols #2 to #5 of slot #1, SSB #1 may be transmitted in symbols #6 to #9 of slot #1, SSB #2 may be transmitted in symbols #2 to #5 of slot #2, SSB #3 may be transmitted in symbols #6 to #9 of slot #2, SSB #4 may be transmitted in symbols #2 to #5 of slot #3, SSB #5 may be transmitted in symbols #6 to #9 of slot #3, SSB #6 may be transmitted in symbols #2 to #5 of slot #4, and SSB #7 may be transmitted in symbols #6 to #9 of slot #4.

Referring to FIG. 54, CORESET #0 #0 may be transmitted in symbol #0 of slot #1. CORESET #0 #1 may be transmitted in symbol #1 of slot #1. CORESET #0 #2 may be transmitted in symbol #0 of slot #2. CORESET #0 #3 may be transmitted in symbol #1 of slot #2. CORESET #0 #4 may be transmitted in symbol #0 of slot #3. CORESET #0 #5 may be transmitted in symbol #1 of slot #3. CORESET #0 #6 may be transmitted in symbol #0 of slot #4. CORESET #0 #7 may be transmitted in symbol #1 of slot #4.

When Proposed Method 4-1-2-1 is applied, resources used for CORESET #0 may be relatively small.

Figure 55:
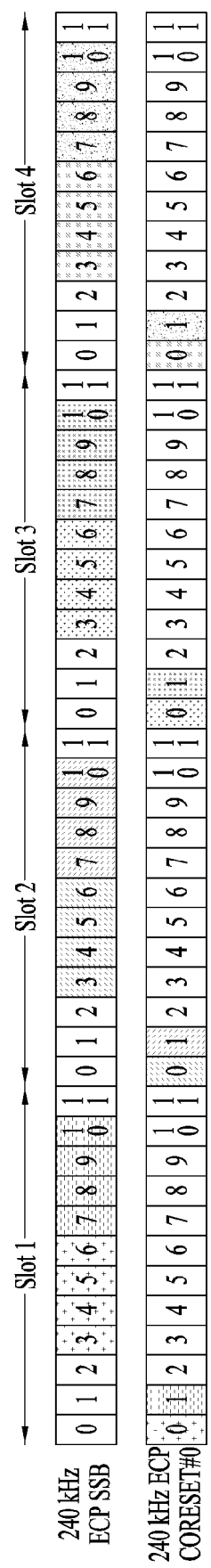

Referring to FIG. 55, when Proposed Method 4-2-2-2 is applied, SSB #0 may be transmitted in symbols #3 to #6 of slot #1, SSB #1 may be transmitted in symbols #7 to #10 of slot #1, SSB #2 may be transmitted in symbols #3 to #6 of slot #2, SSB #3 may be transmitted in symbols #7 to #10 of slot #2, SSB #4 may be transmitted in symbols #3 to #6 of slot #3, SSB #5 may be transmitted in symbols #7 to #10 of slot #3, SSB #6 may be transmitted in symbols #3 to #6 of slot #4, and SSB #7 may be transmitted in symbols #7 to #10 of slot #4.

Referring to FIG. 55, CORESET #0 #0 may be transmitted in symbol #0 of slot #1. CORESET #0 #1 may be transmitted in symbol #1 of slot #1. CORESET #0 #2 may be transmitted in symbol #0 of slot #2. CORESET #0 #3 may be transmitted in symbol #1 of slot #2. CORESET #0 #4 may be transmitted in symbol #0 of slot #3. CORESET #0 #5 may be transmitted in symbol #1 of slot #3. CORESET #0 #6 may be transmitted in symbol #0 of slot #4. CORESET #0 #7 may be transmitted in symbol #1 of slot #4.

When Proposed Method 4-1-2-2 is applied, resources used for CORESET #0 may be relatively small.

[Proposed Method 5-1-2] Case 2: {240, 480} and Pattern 2

According to Proposed Method 5-1-2, while (maximum) 8 beams are transmitted over four slots, FDM may be performed between the SSB and CORESET #0 to which different numerologies are applied.

Figure 56:
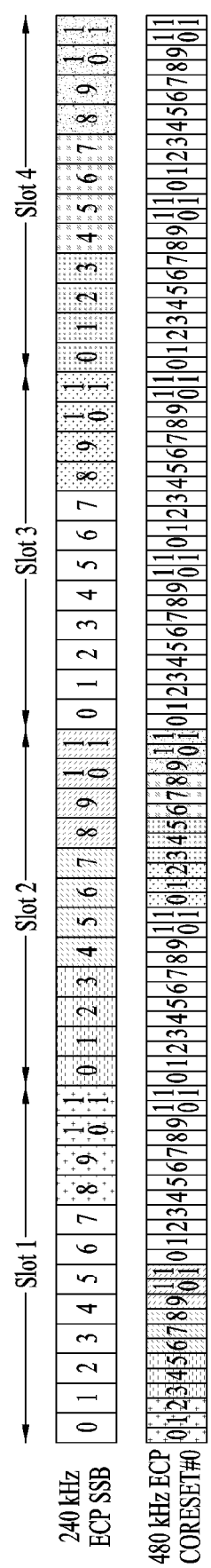

Referring to FIG. 56, when Proposed Method 4-1-1 is applied, SSB #0 may be transmitted in symbols #8 to #11 of slot #1, SSB #1 may be transmitted in symbols #0 to #3 of slot #2, SSB #2 may be transmitted in symbols #4 to #7 of slot #2, SSB #3 may be transmitted in symbols #7 to #10 of slot #2, SSB #4 may be transmitted in symbols #3 to #6 of slot #3, SSB #5 may be transmitted in symbols #7 to #10 of slot #3, SSB #6 may be transmitted in symbols #3 to #6 of slot #4, and SSB #7 may be transmitted in symbols #7 to #10 of slot #4.

Referring to FIG. 56, CORESET #0 #0 may be transmitted in symbols #0 to #2 of slot #1. CORESET #0 #1 may be transmitted in symbols #3 to #5 of slot #1. CORESET #0 #2 may be transmitted in symbols #6 to #8 of slot #1. CORESET #0 #3 may be transmitted in symbols #9 to #11 of slot #1. CORESET #0 #4 may be transmitted in symbols #0 to #2 of slot #5 (aligned with slot #3 with respect to the 240 kHz SCS). CORESET #0 #1 may be transmitted in symbols #3 to #5 of slot #5. CORESET #0 #2 may be transmitted in symbols #6 to #8 of slot #5. CORESET #0 #3 may be transmitted in symbols #9 to #11 of slot #1.

In FIG. 56, the number of REs may be insufficient because the SCS of CORESET #0 is 480 kHz, and thus, CORESET #0 consisting of three symbols may be configured.

When CORESET #0 consisting of four symbols is considered, CORESET #0 #0 may be transmitted in symbols #0 to #3 of slot. #1, CORESET #0 #1 may be transmitted in symbols #4 to #7 of slot #1, CORESET #0 #2 may be transmitted in symbols #8 to #11 of slot #1, CORESET #0 #3 may be transmitted in symbols #0 to #3 of slot #2, CORESET #0 #4 may be transmitted in symbols #0 to #3 of slot #5 (aligned with slot #3 with respect to the 240 kHz SCS), CORESET #0 #5 may be transmitted in symbols #4 to #7 of slot #5, CORESET #0 #6 may be transmitted in symbols #8 to #11 of slot #5, and CORESET #0 #7 may be transmitted in symbols #0 to #3 of slot #6.

Figure 57:
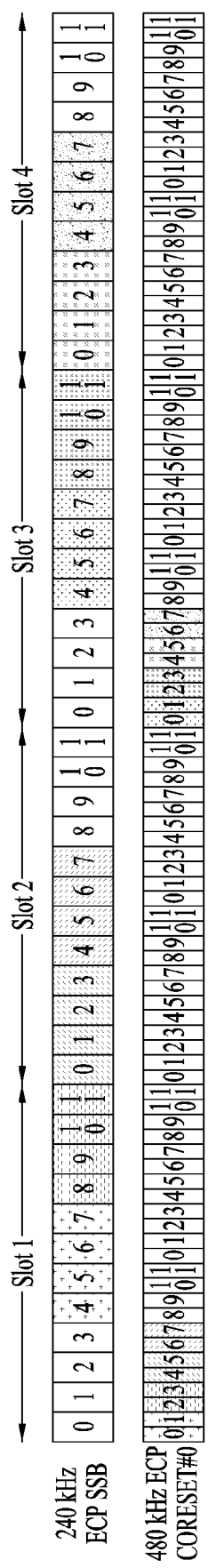

Referring to FIG. 57, when Proposed Method 4-1-1-1 is applied, SSB #0 may be transmitted in symbols #4 to #7 of slot #1, SSB #1 may be transmitted in symbols #8 to #11 of slot #1, SSB #2 may be transmitted in symbols #0 to #3 of slot #2, SSB #3 may be transmitted in symbols #4 to #7 of slot #2, SSB #4 may be transmitted in symbols #4 to #7 of slot #2, SSB #5 may be transmitted in symbols #8 to #11 of slot #3, SSB #6 may be transmitted in symbols #4 to #7 of slot #4, and SSB #7 may be transmitted in symbols #8 to #11 of slot #4.

Referring to FIG. 57, CORESET #0 #0 may be transmitted in symbols #0 and #1 of slot #1. CORESET #0 #1 may be transmitted in symbols #2 and #3 of slot #1. CORESET #0 #2 may be transmitted in symbols #4 and #5 of slot #1. CORESET #0 #3 may be transmitted in symbols #6 and #7 of slot #1. CORESET #0 #4 may be transmitted in symbols #0 and #1 of slot #5 (aligned with slot #3 with respect to the 240 kHz SCS). CORESET #0 #1 may be transmitted in symbols #2 and #3 of slot #5. CORESET #0 #6 may be transmitted in symbols #4 and #5 of slot #5. CORESET #0 #7 may be transmitted in symbols #6 and #7 of slot #5.

Figure 58:
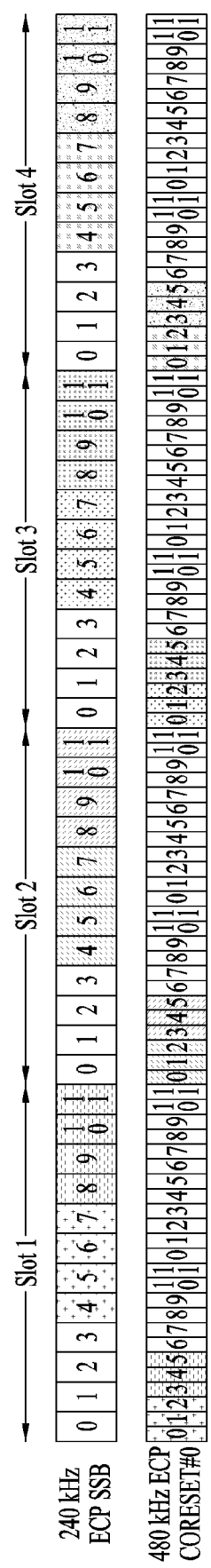

Referring to FIG. 58, when Proposed Method 4-1-2 is applied, SSB #0 may be transmitted in symbols #4 to #7 of slot #1, SSB #1 may be transmitted in symbols #8 to #11 of slot #1, SSB #2 may be transmitted in symbols #4 to #7 of slot #2, SSB #3 may be transmitted in symbols #8 to #11 of slot #2, SSB #4 may be transmitted in symbols #4 to #7 of slot #3, SSB #5 may be transmitted in symbols #8 to #11 of slot #3, SSB #6 may be transmitted in symbols #4 to #7 of slot #4, and SSB #7 may be transmitted in symbols #8 to #11 of slot #4.

Referring to FIG. 58, CORESET #0 #0 may be transmitted in symbols #0 to #2 of slot #1. CORESET #0 #1 may be transmitted in symbols #3 to #5 of slot #1. CORESET #0 #2 may be transmitted in symbols #0 to #2 of slot #3 (aligned with slot #2 with respect to the 240 kHz SCS). CORESET #0 #3 may be transmitted in symbols #3 to #5 of slot #3. CORESET #0 #4 may be transmitted in symbols #0 to #2 of slot #5 (aligned with slot #3 with respect to the 240 kHz SCS). CORESET #0 #5 may be transmitted in symbols #3 to #5 of slot #5. CORESET #0 #6 may be transmitted in symbols #0 to #2 of slot #7 (aligned with slot #4 with respect to the 240 kHz SCS). CORESET #0 #7 may be transmitted in symbols #3 to #5 of slot #7.

In FIG. 58, the number of REs may be insufficient because the SCS of CORESET #0 is 480 kHz, and thus, CORESET #0 consisting of three symbols may be configured.

When CORESET #0 consisting of four symbols is considered, CORESET #0 #0 may be transmitted in symbols #0 to #3 of slot #1, CORESET #0 #1 may be transmitted in symbols #4 to #7 of slot #1, CORESET #0 #2 may be transmitted in symbols #0 to #3 of slot #3 (aligned with slot #2 with respect to the 240 kHz SCS), CORESET #0 #3 may be transmitted in symbols #4 to #7 of slot #3, CORESET #0 #4 may be transmitted in symbols #0 to #3 of slot #5 (aligned with slot #3 with respect to the 240 kHz SCS), CORESET #0 #5 may be transmitted in symbols #4 to #7 of slot #5, CORESET #0 #6 may be transmitted in symbols #0 to #3 of slot #7 (aligned with slot #4 with respect to the 240 kHz SCS), and CORESET #0 #7 may be transmitted in symbols #4 to #7 of slot #7.

Figure 59:
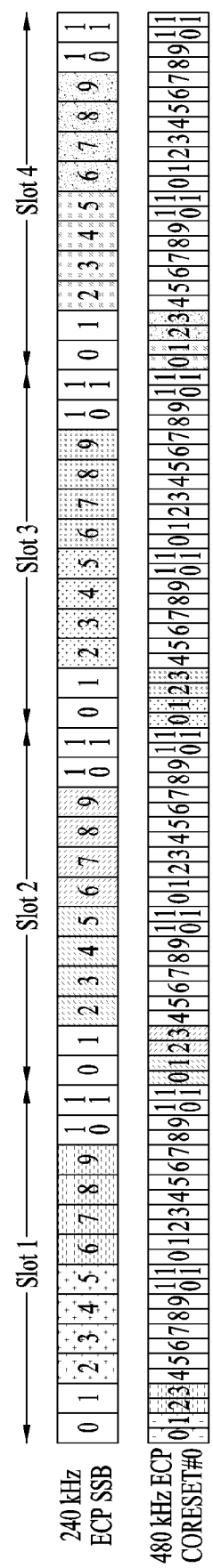

Referring to FIG. 59, when Proposed Method 4-1-2-1 is applied, SSB #0 may be transmitted in symbols #2 to #5 of slot #1, SSB #1 may be transmitted in symbols #6 to #9 of slot #1, SSB #2 may be transmitted in symbols #2 to #5 of slot #2, SSB #3 may be transmitted in symbols #6 to #9 of slot #2, SSB #4 may be transmitted in symbols #2 to #5 of slot #3, SSB #5 may be transmitted in symbols #6 to #9 of slot #3, SSB #6 may be transmitted in symbols #2 to #5 of slot #4, and SSB #7 may be transmitted in symbols #6 to #9 of slot #4.

Referring to FIG. 59, CORESET #0 #0 may be transmitted in symbols #0 and #1 of slot #1. CORESET #0 #1 may be transmitted in symbols #2 and #3 of slot #1. CORESET #0 #2 may be transmitted in symbols #0 and #1 of slot #3 (aligned with slot #2 with respect to the 240 kHz SCS). CORESET #0 #3 may be transmitted in symbols #2 and #3 of slot #3. CORESET #0 #4 may be transmitted in symbols #0 and #1 of slot #5 (aligned with slot #3 with respect to the 240 kHz SCS). CORESET #0 #5 may be transmitted in symbols #2 and #3 of slot #5. CORESET #0 #6 may be transmitted in symbols #0 and #1 of slot #7 (aligned with slot #4 with respect to the 240 kHz SCS). CORESET #0 #7 may be transmitted in symbols #2 and #3 of slot #7.

Figure 60:
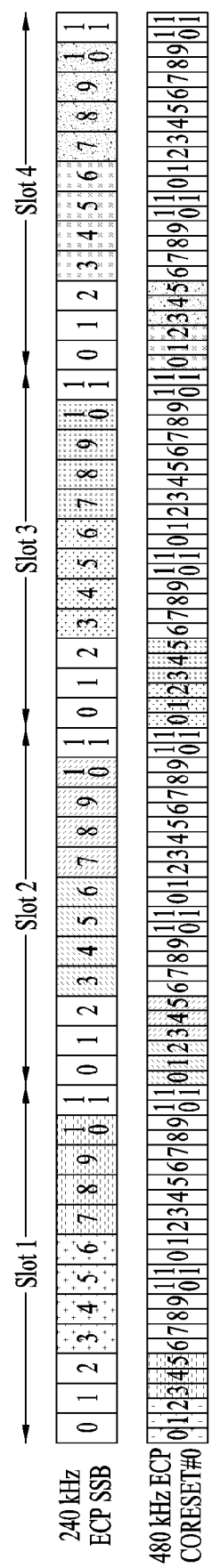

Referring to FIG. 60, when Proposed Method 4-1-2-2 is applied, SSB #0 may be transmitted in symbols #3 to #6 of slot #1, SSB #1 may be transmitted in symbols #7 to #10 of slot #1, SSB #2 may be transmitted in symbols #3 to #6 of slot #2, SSB #3 may be transmitted in symbols #7 to #10 of slot #2, SSB #4 may be transmitted in symbols #3 to #6 of slot #3, SSB #5 may be transmitted in symbols #7 to #10 of slot #3, SSB #6 may be transmitted in symbols #3 to #6 of slot #4, and SSB #7 may be transmitted in symbols #7 to #10 of slot #4.

Referring to FIG. 60, CORESET #0 #0 may be transmitted in symbols #0 to #12 of slot #1. CORESET #0 #1 may be transmitted in symbols #3 to #5 of slot #1. CORESET #0 #2 may be transmitted in symbols #0 to #2 of slot #3 (aligned with slot #2 with respect to the 240 kHz SCS). CORESET #0 #3 may be transmitted in symbols #3 to #5 of slot #3. CORESET #0 #4 may be transmitted in symbols #0 to #2 of slot #5 (aligned with slot #3 with respect to the 240 kHz SCS). CORESET #0 #5 may be transmitted in symbols #3 to #5 of slot #5. CORESET #0 #6 may be transmitted in symbols #0 to #2 of slot #7 (aligned with slot #4 with respect to the 240 kHz SCS). CORESET #0 #7 may be transmitted in symbols #3 to #5 of slot #7.

In FIG. 60, the number of REs may be insufficient because the SCS of CORESET #0 is 480 kHz, and thus, CORESET #0 consisting of three symbols may be configured.

[Proposed Method 5-1-3] Case 3: {240, 240} and Pattern 3

According to Proposed Method 5-1-3, while (maximum) 8 beams are transmitted over four slots, FDM may be performed between the SSB and CORESET #0 to which the same numerology is applied.

Figure 61:
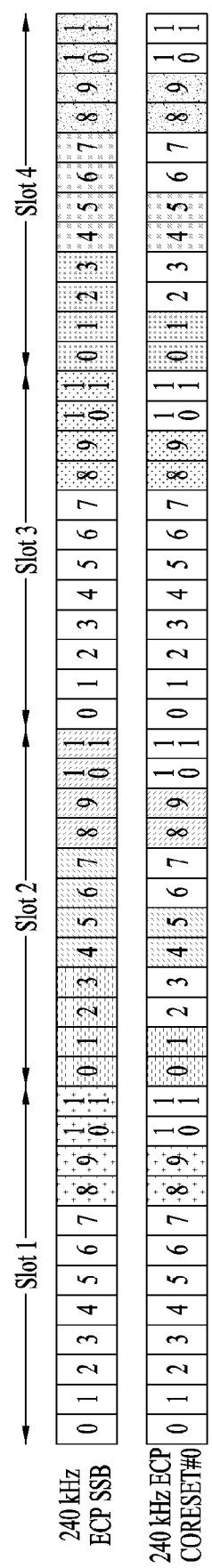

Referring to FIG. 61, when Proposed Method 4-1-1 is applied, SSB #0 may be transmitted in symbols #8 to #11 of slot #1, SSB #1 may be transmitted in symbols #0 to #3 of slot #2, SSB #2 may be transmitted in symbols #4 to #7 of slot #2, SSB #3 may be transmitted in symbols #8 to #11 of slot #2, SSB #4 may be transmitted in symbols #8 to #11 of slot #3, SSB #5 may be transmitted in symbols #0 to #3 of slot #4, SSB #6 may be transmitted in symbols #4 to #7 of slot #4, and SSB #7 may be transmitted in symbols #8 to #11 of slot #4.

Referring to FIG. 61, CORESET #0 #0 may be transmitted in symbols #8 and #9 of slot #1, CORESET #0 #1 may be transmitted in symbols #0 and #1 of slot #2, CORESET #0 #2 may be transmitted in symbols #4 and #5 of slot #2, CORESET #0 #3 may be transmitted in symbols #8 and #9 of slot #2, CORESET #0 #4 may be transmitted in symbols #8 and #9 of slot #3, CORESET #0 #5 may be transmitted in symbols #0 and #1 of slot #4, CORESET #0 #6 may be transmitted in symbols #4 and #5 of slot #4, and CORESET #0 #7 may be transmitted in symbols #8 and #9 of slot #4.

Figure 62:
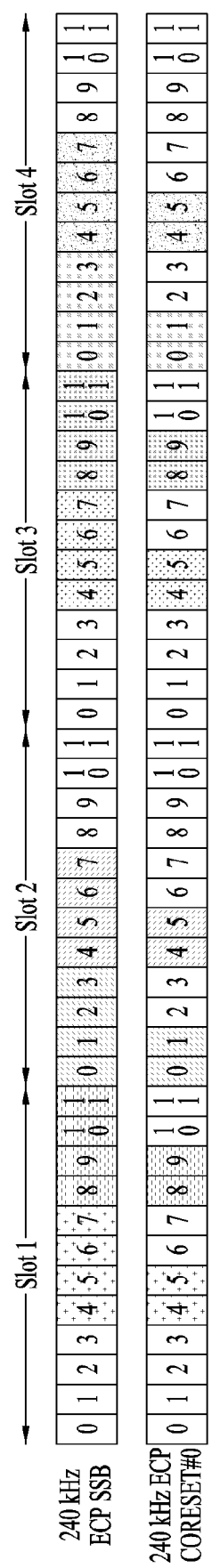

Referring to FIG. 62, when Proposed Method 4-1-1-1 is applied, SSB #0 may be transmitted in symbols #4 to #7 of slot #1, SSB #1 may be transmitted in symbols #8 to #11 of slot #1, SSB #2 may be transmitted in symbols #0 to #3 of slot #2, SSB #3 may be transmitted in symbols #4 to #7 of slot #2, SSB #4 may be transmitted in symbols #4 to #7 of slot #2, SSB #5 may be transmitted in symbols #8 to #11 of slot #3, SSB #6 may be transmitted in symbols #0 to #3 of slot #3, and SSB #7 may be transmitted in symbols #4 to #7 of slot #4.

Referring to FIG. 62, CORESET #0 #0 may be transmitted in symbols #4 and #5 of slot #1. CORESET #0 #1 may be transmitted in symbols #8 and #9 of slot #1. CORESET #0 #2 may be transmitted in symbols #0 and #1 of slot #2. CORESET #0 #3 may be transmitted in symbols #4 and #5 of slot #2. CORESET #0 #4 may be transmitted in symbols #4 and #5 of slot #3. CORESET #0 #5 may be transmitted in symbols #8 and #9 of slot #4. CORESET #0 #6 may be transmitted in symbols #0 and #1 of slot #4. CORESET #0 #7 may be transmitted in symbols #4 and #5 of slot #4.

Figure 63:
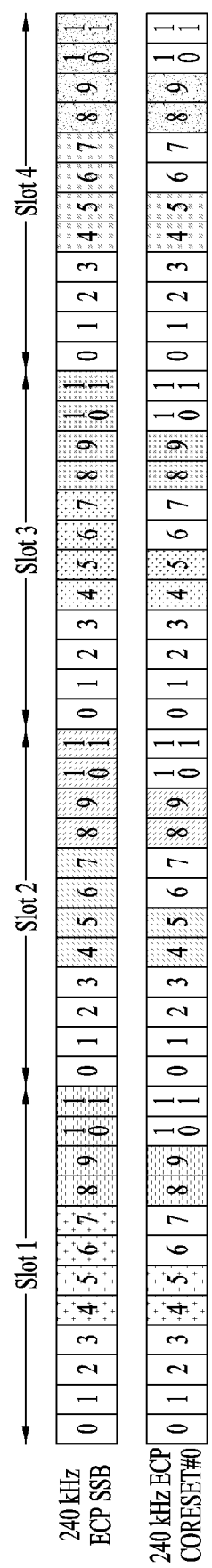

Referring to FIG. 63, when Proposed Method 4-1-2 is applied, SSB #0 may be transmitted in symbols #4 to #7 of slot #1, SSB #1 may be transmitted in symbols #8 to #11 of slot #1, SSB #2 may be transmitted in symbols #4 to #7 of slot #2, SSB #3 may be transmitted in symbols #8 to #11 of slot #2, SSB #4 may be transmitted in symbols #4 to #7 of slot #3, SSB #5 may be transmitted in symbols #8 to #11 of slot #3, SSB #6 may be transmitted in symbols #4 to #7 of slot #3, and SSB #7 may be transmitted in symbols #8 to #11 of slot #4.

Referring to FIG. 63, CORESET #0 #0 may be transmitted in symbols #4 and #5 of slot #1. CORESET #0 #1 may be transmitted in symbols #8 and #9 of slot #1. CORESET #0 #2 may be transmitted in symbols #4 and #5 of slot #2. CORESET #0 #3 may be transmitted in symbols #8 and #9 of slot #2. CORESET #0 #4 may be transmitted in symbols #4 and #5 of slot #3. CORESET #0 #5 may be transmitted in symbols #8 and #9 of slot #3. CORESET #0 #6 may be transmitted in symbols #4 and #5 of slot #4. CORESET #0 #7 may be transmitted in symbols #8 and #9 of slot #4.

Figure 64:
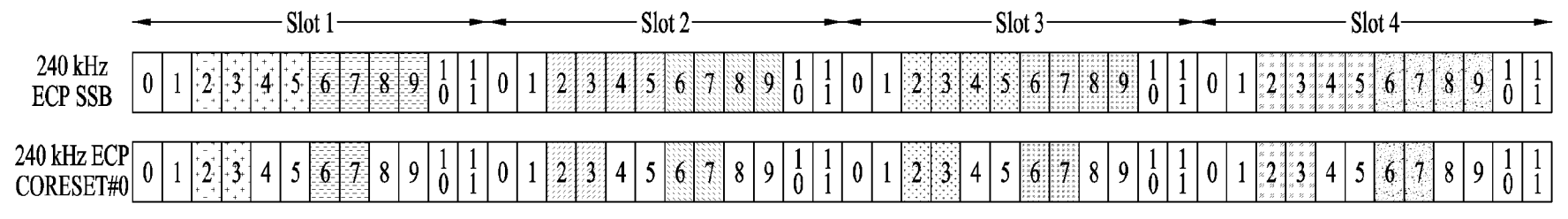

Referring to FIG. 64, when Proposed Method 4-1-2-1 is applied, SSB #0 may be transmitted in symbols #2 to #5 of slot #1, SSB #1 may be transmitted in symbols #6 to #9 of slot #1, SSB #2 may be transmitted in symbols #2 to #5 of slot #2, SSB #3 may be transmitted in symbols #6 to #9 of slot #2, SSB #4 may be transmitted in symbols #2 to #5 of slot #3, SSB #5 may be transmitted in symbols #6 to #9 of slot #3, SSB #6 may be transmitted in symbols #2 to #5 of slot #4, and SSB #7 may be transmitted in symbols #6 to #9 of slot #4.

Referring to FIG. 64, CORESET #0 #0 may be transmitted in symbols #2 and #3 of slot #1. CORESET #0 #1 may be transmitted in symbols #6 and #7 of slot #1. CORESET #0 #2 may be transmitted in symbols #2 and #3 of slot #2. CORESET #0 #3 may be transmitted in symbols #6 and #7 of slot #2. CORESET #0 #4 may be transmitted in symbols #2 and #3 of slot #3. CORESET #0 #5 may be transmitted in symbols #6 and #7 of slot #3. CORESET #0 #6 may be transmitted in symbols #2 and #3 of slot #4. CORESET #0 #7 may be transmitted in symbols #6 and #7 of slot #4.

Figure 65:
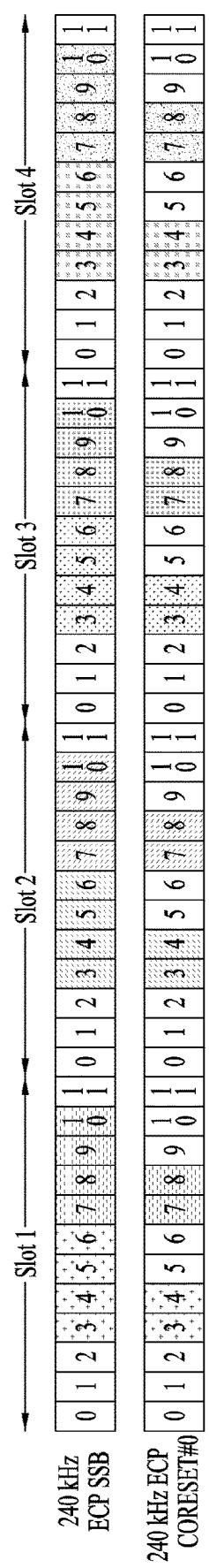

Referring to FIG. 65, when Proposed Method 4-1-2-2 is applied, SSB #0 may be transmitted in symbols #3 to #6 of slot #1, SSB #1 may be transmitted in symbols #7 to #10 of slot #1, SSB #2 may be transmitted in symbols #3 to #6 of slot #2, SSB #3 may be transmitted in symbols #7 to #10 of slot #2, SSB #4 may be transmitted in symbols #3 to #6 of slot #3, SSB #5 may be transmitted in symbols #7 to #10 of slot #3, SSB #6 may be transmitted in symbols #3 to #6 of slot #4, and SSB #7 may be transmitted in symbols #7 to #10 of slot #4.

Referring to FIG. 65, CORESET #0 #0 may be transmitted in symbols #3 and #4 of slot #1. CORESET #0 #1 may be transmitted in symbols #7 and #8 of slot #1. CORESET #0 #2 may be transmitted in symbols #3 and #4 of slot #2. CORESET #0 #3 may be transmitted in symbols #7 and #8 of slot #2. CORESET #0 #4 may be transmitted in symbols #3 and #4 of slot #3. CORESET #0 #5 may be transmitted in symbols #7 and #8 of slot #3. CORESET #0 #6 may be transmitted in symbols #3 and #4 of slot #4. CORESET #0 #7 may be transmitted in symbols #7 and #8 of slot #4.

[Proposed Method 5-1-4] Case 4: {960, 960} and Pattern 1

According to Proposed Method 5-1-4, while (maximum) 8 beams are transmitted over four slots, TDM may be performed between the SSB and CORESET #0. Two beams for CORESET #0 and two beams for the SSB may be transmitted in each slot.

Figure 66:
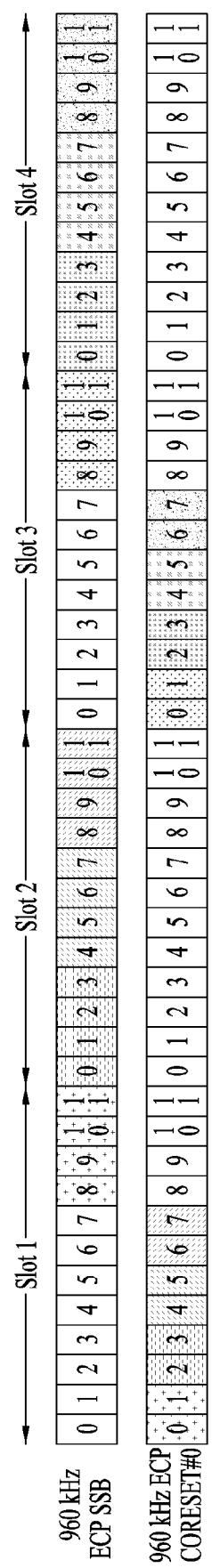

Referring to FIG. 66, when Proposed Method 4-2-1 is applied, SSB #0 may be transmitted in symbols #8 to #11 of slot #1, SSB #1 may be transmitted in symbols #0 to #3 of slot #2, SSB #2 may be transmitted in symbols #4 to #7 of slot #2, SSB #3 may be transmitted in symbols #8 to #11 of slot #2, SSB #4 may be transmitted in symbols #8 to #11 of slot #2, SSB #5 may be transmitted in symbols #0 to #3 of slot #3, SSB #6 may be transmitted in symbols #4 to #7 of slot #4, and SSB #7 may be transmitted in symbols #8 to #11 of slot #4.

Referring to FIG. 66, CORESET #0 #0 may be transmitted in symbols #0 and #1 of slot #1. CORESET #0 #1 may be transmitted in symbols #2 and #3 of slot #1. CORESET #0 #2 may be transmitted in symbols #4 and #5 of slot #1. CORESET #0 #3 may be transmitted in symbols #6 and #7 of slot #1. CORESET #0 #4 may be transmitted in symbols #0 and #1 of slot #3. CORESET #0 #5 may be transmitted in symbols #2 and #3 of slot #3. CORESET #0 #6 may be transmitted in symbols #4 and #5 of slot #3. CORESET #0 #7 may be transmitted in symbols #6 and #7 of slot #4.

Figure 67:
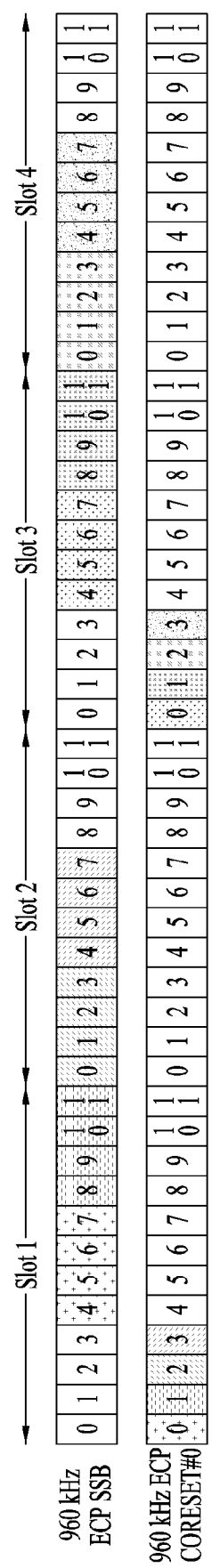

Referring to FIG. 67, when Proposed Method 4-2-1-1 is applied, SSB #0 may be transmitted in symbols #4 to #7 of slot #1, SSB #1 may be transmitted in symbols #8 to #11 of slot #1, SSB #2 may be transmitted in symbols #0 to #3 of slot #2, SSB #3 may be transmitted in symbols #4 to #7 of slot #2, SSB #4 may be transmitted in symbols #4 to #7 of slot #3, SSB #5 may be transmitted in symbols #8 to #11 of slot #3, SSB #6 may be transmitted in symbols #0 to #3 of slot #4, and SSB #7 may be transmitted in symbols #4 to #7 of slot #4.

Referring to FIG. 67, CORESET #0 #0 may be transmitted in symbol #0 of slot #1. CORESET #0 #1 may be transmitted in symbol #1 of slot #1. CORESET #0 #2 may be transmitted in symbol #2 of slot #1. CORESET #0 #3 may be transmitted in symbol #3 of slot #1. CORESET #0 #4 may be transmitted in symbol #0 of slot #3. CORESET #0 #5 may be transmitted in symbol #1 of slot #3. CORESET #0 #6 may be transmitted in symbol #2 of slot #3. CORESET #0 #7 may be transmitted in symbol #3 of slot #3.

In particular, in FIG. 67, small resources are used for CORESET #0.

Figure 68:
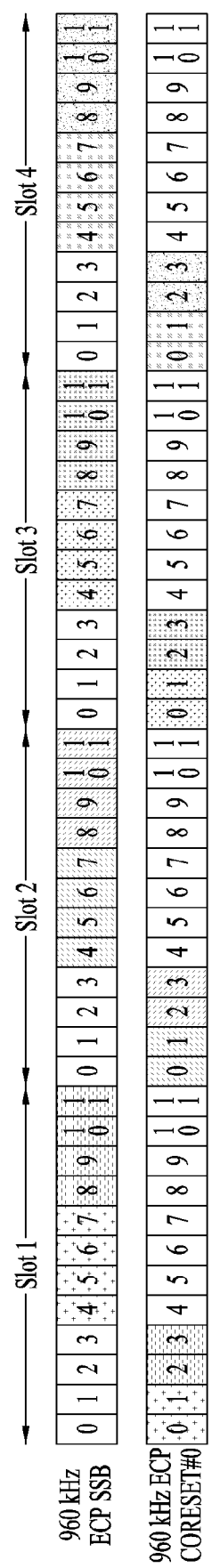

Referring to FIG. 68, when Proposed Method 4-2-2 is applied, SSB #0 may be transmitted in symbols #4 to #7 of slot #1, SSB #1 may be transmitted in symbols #8 to #11 of slot #1, SSB #2 may be transmitted in symbols #4 to #7 of slot #2, SSB #3 may be transmitted in symbols #8 to #11 of slot #2, SSB #4 may be transmitted in symbols #4 to #7 of slot #3, SSB #5 may be transmitted in symbols #8 to #11 of slot #3, SSB #6 may be transmitted in symbols #4 to #7 of slot #4, and SSB #7 may be transmitted in symbols #8 to #11 of slot #4.

Referring to FIG. 68, CORESET #0 #0 may be transmitted in symbols #0 and #1 of slot #1. CORESET #0 #1 may be transmitted in symbols #2 and #3 of slot #1. CORESET #0 #2 may be transmitted in symbols #0 and #1 of slot #2. CORESET #0 #3 may be transmitted in symbols #2 and #3 of slot #2. CORESET #0 #4 may be transmitted in symbols #0 and #1 of slot #3. CORESET #0 #5 may be transmitted in symbols #2 and #3 of slot #3. CORESET #0 #6 may be transmitted in symbols #0 and #1 of slot #4. CORESET #0 #7 may be transmitted in symbols #2 and #3 of slot #4.

Figure 69:
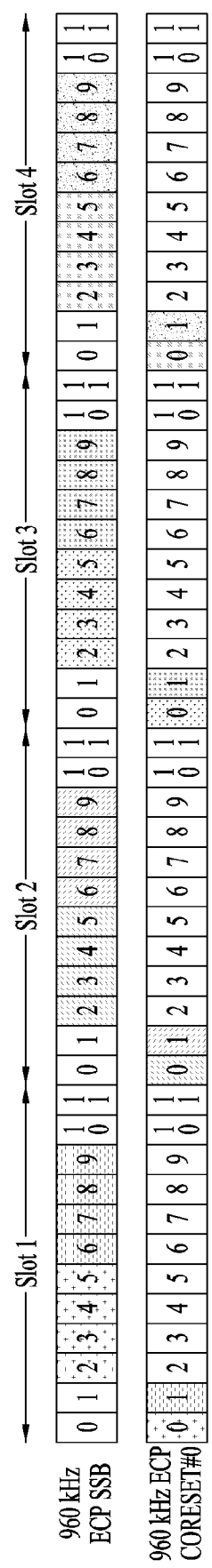

Referring to FIG. 69, when Proposed Method 4-2-2-1 is applied, SSB #0 may be transmitted in symbols #2 to #5 of slot #1, SSB #1 may be transmitted in symbols #6 to #9 of slot #1, SSB #2 may be transmitted in symbols #2 to #5 of slot #2, SSB #3 may be transmitted in symbols #6 to #9 of slot #2, SSB #4 may be transmitted in symbols #2 to #5 of slot #3, SSB #5 may be transmitted in symbols #6 to #9 of slot #3, SSB #6 may be transmitted in symbols #2 to #5 of slot #4, and SSB #7 may be transmitted in symbols #6 to #9 of slot #4.

Referring to FIG. 69, CORESET #0 #0 may be transmitted in symbol #0 of slot #1. CORESET #0 #1 may be transmitted in symbol #1 of slot #1. CORESET #0 #2 may be transmitted in symbol #0 of slot #2. CORESET #0 #3 may be transmitted in symbol #1 of slot #2. CORESET #0 #4 may be transmitted in symbol #0 of slot #3. CORESET #0 #5 may be transmitted in symbol #1 of slot #3. CORESET #0 #6 may be transmitted in symbol #0 of slot #4. CORESET #0 #7 may be transmitted in symbol #1 of slot #4.

In particular, in FIG. 69, small resources are used for CORESET #0.

Figure 70:
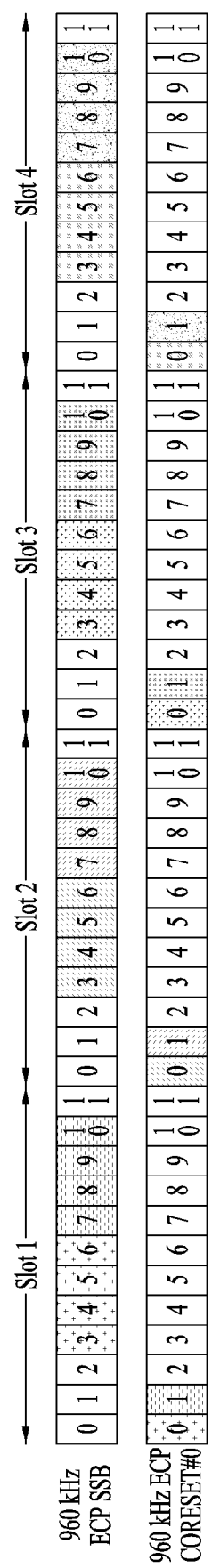

Referring to FIG. 70, when Proposed Method 4-2-2-2-2 is applied, SSB #0 may be transmitted in symbols #3 to #6 of slot #1, SSB #1 may be transmitted in symbols #7 to #10 of slot #1, SSB #2 may be transmitted in symbols #3 to #6 of slot #2, SSB #3 may be transmitted in symbols #7 to #10 of slot #2, SSB #4 may be transmitted in symbols #3 to #6 of slot #3, SSB #5 may be transmitted in symbols #7 to #10 of slot #3, SSB #6 may be transmitted in symbols #3 to #6 of slot #4, and SSB #7 may be transmitted in symbols #7 to #10 of slot #4.

Referring to FIG. 70, CORESET #0 #0 may be transmitted in symbol #0 of slot #1. CORESET #0 #1 may be transmitted in symbol #1 of slot #1. CORESET #0 #2 may be transmitted in symbol #0 of slot #2. CORESET #0 #3 may be transmitted in symbol #1 of slot #2. CORESET #0 #4 may be transmitted in symbol #0 of slot #3. CORESET #0 #5 may be transmitted in symbol #1 of slot #3. CORESET #0 #6 may be transmitted in symbol #0 of slot #4. CORESET #0 #7 may be transmitted in symbol #1 of slot #4.

In particular, in FIG. 70, small resources are used for CORESET #0.

Figure 71:
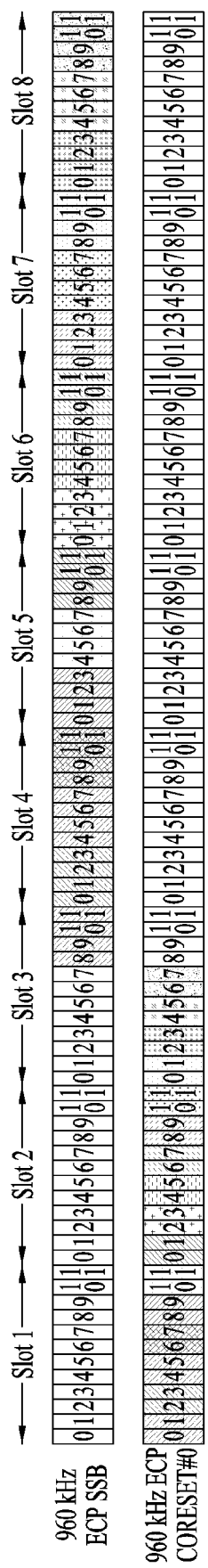

Referring to FIG. 71, when Proposed Method 4-3-1 is applied, SSBs from SSB #0 to SSB #15 may be continuously transmitted in OFDM symbols from OFDM symbol #8 of slot #3 to OFDM symbol #11 of slot #8.

Referring to FIG. 71, CORESET #0s from CORESET #0 #0 to CORESET #0 #15 may be continuously transmitted in OFDM symbols from OFDM symbol #0 of slot #1 to OFDM symbol #7 of slot #3. Two OFDM symbols may be allocated to one CORESET #0.

Figure 72:
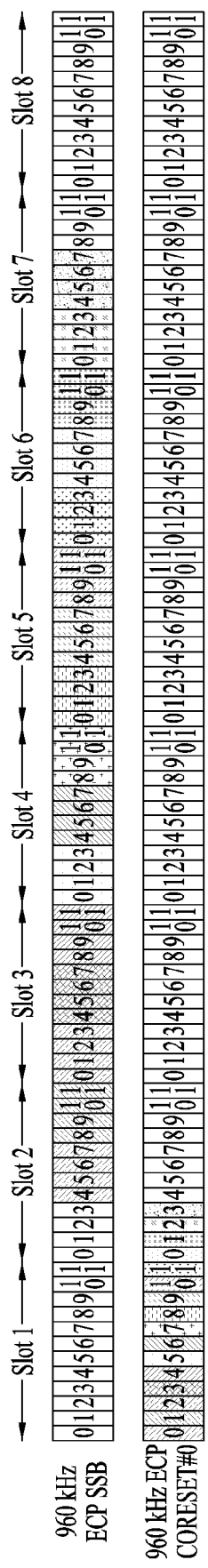

Referring to FIG. 72, when Proposed Method 4-3-1-1 is applied, SSBs from SSB #0 to SSB #15 may be continuously transmitted in OFDM symbols from OFDM symbol #4 of slot #2 to OFDM symbol #7 of slot #7.

Referring to FIG. 72, CORESET #0s from CORESET #0 #0 to CORESET #0 #15 may be continuously transmitted in OFDM symbols from OFDM symbol #0 of slot #1 to OFDM symbol #3 of slot #2. One OFDM symbol may be allocated to one CORESET #0.

Figure 73:
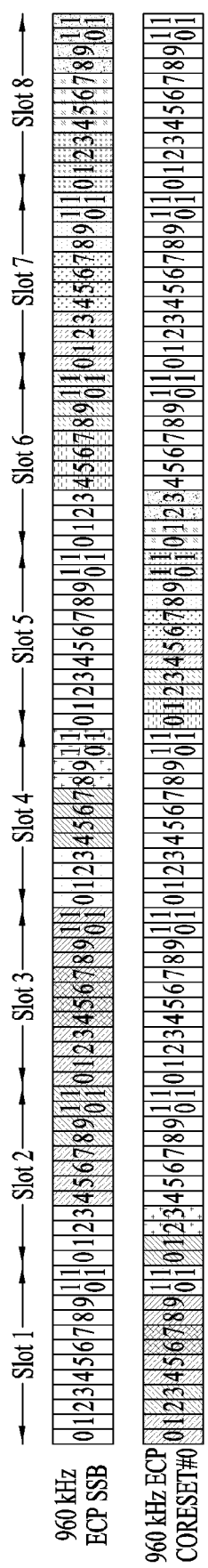

Referring to FIG. 73, when Proposed Method 4-3-2 is applied, SSBs from SSB #0 to SSB #7 may be continuously transmitted in OFDM symbols from OFDM symbol #4 of slot #2 to OFDM symbol #11 of slot #4, and SSBs from SSB #8 to SSB #15 may be continuously transmitted in OFDM symbols from OFDM symbol #4 of slot #6 to OFDM symbol #11 of slot #8.

Referring to FIG. 73, CORESET #0s from CORESET #0 #0 to CORESET #0 #7 may be continuously transmitted in OFDM symbols from OFDM symbol #0 of slot #1 to OFDM symbol #3 of slot #2. CORESET #0s from CORESET #0 #8 to CORESET #0 #15 may be continuously transmitted in OFDM symbols from OFDM symbol #0 of slot #5 to OFDM symbol #3 of slot #6. Two OFDM symbols may be allocated to one CORESET #0.

[Proposed Method 5-1-5] Case 5: {960, 960} and Pattern 3

According to Proposed Method 5-1-5, while (maximum) 8 beams are transmitted over four slots, FDM may be performed between the SSB and CORESET #0 to which the same numerology is applied.

Figure 74:
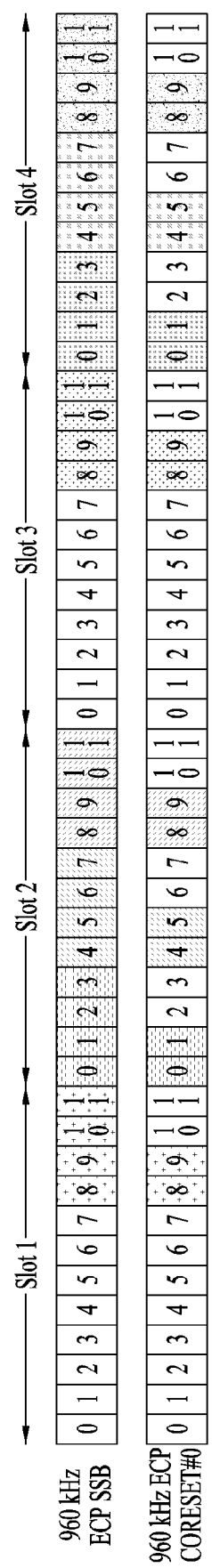

Referring to FIG. 74, when Proposed Method 4-2-1 is applied, SSB #0 may be transmitted in symbols #8 to #11 of slot #1, SSB #1 may be transmitted in symbols #0 to #3 of slot #2, SSB #2 may be transmitted in symbols #4 to #7 of slot #2, SSB #3 may be transmitted in symbols #8 to #11 of slot #2, SSB #4 may be transmitted in symbols #8 to #11 of slot #3, SSB #5 may be transmitted in symbols #0 to #3 of slot #4, SSB #6 may be transmitted in symbols #4 to #7 of slot #4, and SSB #7 may be transmitted in symbols #8 to #11 of slot #4.

Referring to FIG. 74, CORESET #0 #0 may be transmitted in symbols #8 and #9 of slot #1. CORESET #0 #1 may be transmitted in symbols #0 and #1 of slot #2. CORESET #0 #2 may be transmitted in symbols #4 and #5 of slot #2. CORESET #0 #3 may be transmitted in symbols #8 and #9 of slot #2. CORESET #0 #4 may be transmitted in symbols #8 and #9 of slot #3. CORESET #0 #5 may be transmitted in symbols #0 and #1 of slot #4. CORESET #0 #6 may be transmitted in symbols #4 and #5 of slot #4. CORESET #0 #7 may be transmitted in symbols #8 and #9 of slot #4.

Figure 75:
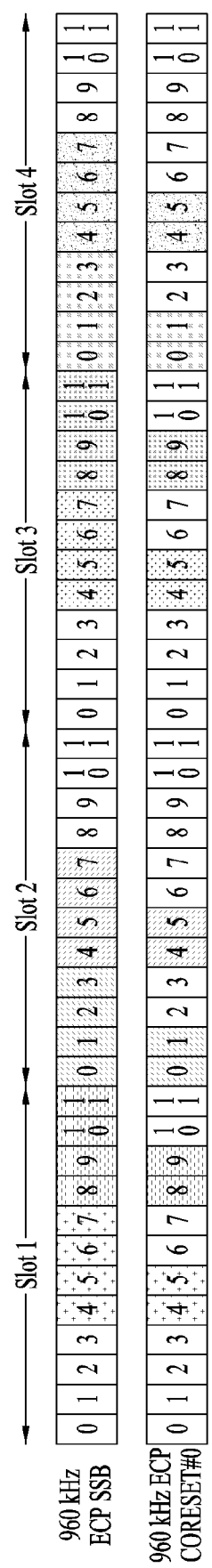

Referring to FIG. 75, when Proposed Method 4-2-1-1 is applied, SSB #0 may be transmitted in symbols #4 to #7 of slot #1, SSB #1 may be transmitted in symbols #8 to #11 of slot #1, SSB #2 may be transmitted in symbols #0 to #3 of slot #2, SSB #3 may be transmitted in symbols #4 to #7 of slot #2, SSB #4 may be transmitted in symbols #4 to #7 of slot #3, SSB #5 may be transmitted in symbols #8 to #11 of slot #3, SSB #6 may be transmitted in symbols #0 to #3 of slot #4, and SSB #7 may be transmitted in symbols #4 to #7 of slot #4.

Referring to FIG. 75, CORESET #0 #0 may be transmitted in symbols #4 and #5 of slot #1. CORESET #0 #1 may be transmitted in symbols #8 and #9 of slot #1. CORESET #0 #2 may be transmitted in symbols #0 and #1 of slot #2. CORESET #0 #3 may be transmitted in symbols #4 and #5 of slot #2. CORESET #0 #4 may be transmitted in symbols #4 and #5 of slot #3. CORESET #0 #5 may be transmitted in symbols #8 and #9 of slot #3. CORESET #0 #6 may be transmitted in symbols #0 and #1 of slot #4. CORESET #0 #7 may be transmitted in symbols #4 and #5 of slot #4.

Figure 76:
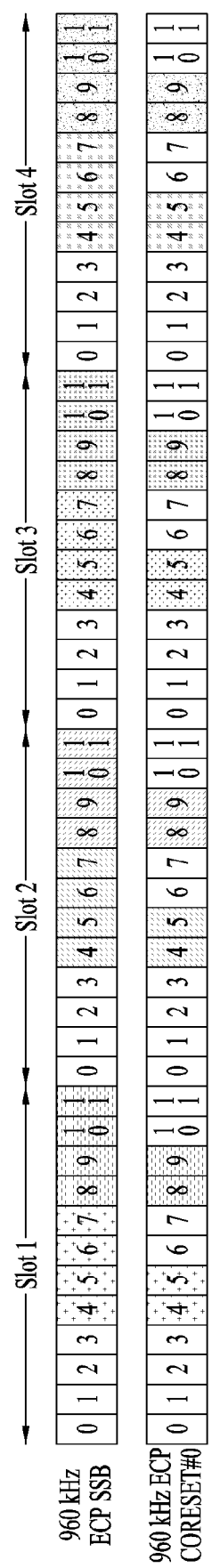

Referring to FIG. 76, when Proposed Method 4-2-2 is applied, SSB #0 may be transmitted in symbols #4 to #7 of slot #1, SSB #1 may be transmitted in symbols #8 to #11 of slot #1, SSB #2 may be transmitted in symbols #4 to #7 of slot #2, SSB #3 may be transmitted in symbols #8 to #11 of slot #2, SSB #4 may be transmitted in symbols #4 to #7 of slot #3, SSB #5 may be transmitted in symbols #8 to #11 of slot #3, SSB #6 may be transmitted in symbols #4 to #7 of slot #4, and SSB #7 may be transmitted in symbols #8 to #11 of slot #4.

Referring to FIG. 76, CORESET #0 #0 may be transmitted in symbols #4 and #5 of slot #1. CORESET #0 #1 may be transmitted in symbols #8 and #9 of slot #1. CORESET #0 #2 may be transmitted in symbols #4 and #5 of slot #2. CORESET #0 #3 may be transmitted in symbols #8 and #9 of slot #2. CORESET #0 #4 may be transmitted in symbols #4 and #5 of slot #3. CORESET #0 #5 may be transmitted in symbols #8 and #9 of slot #3. CORESET #0 #6 may be transmitted in symbols #4 and #5 of slot #4. CORESET #0 #7 may be transmitted in symbols #8 and #9 of slot #4.

Figure 77:
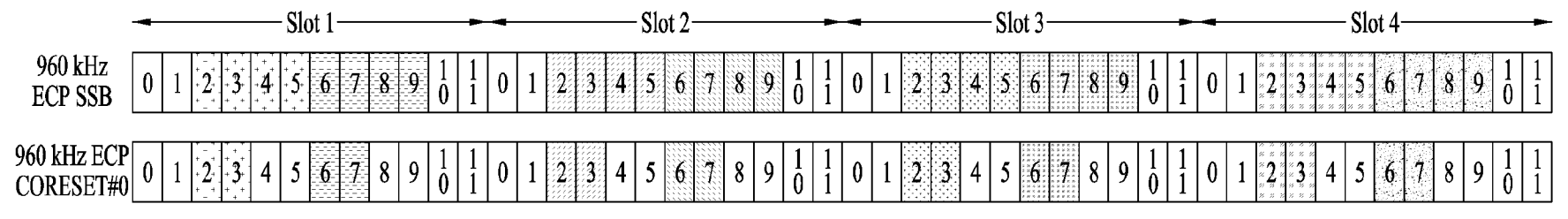

Referring to FIG. 77, when Proposed Method 4-2-2-1 is applied, SSB #0 may be transmitted in symbols #2 to #5 of slot #1, SSB #1 may be transmitted in symbols #6 to #9 of slot #1, SSB #2 may be transmitted in symbols #2 to #5 of slot #2, SSB #3 may be transmitted in symbols #6 to #9 of slot #2, SSB #4 may be transmitted in symbols #2 to #5 of slot #3, SSB #5 may be transmitted in symbols #6 to #9 of slot #3, SSB #6 may be transmitted in symbols #2 to #5 of slot #4, and SSB #7 may be transmitted in symbols #6 to #9 of slot #4.

Referring to FIG. 77, CORESET #0 #0 may be transmitted in symbols #2 and #3 of slot #1. CORESET #0 #1 may be transmitted in symbols #6 and #7 of slot #1. CORESET #0 #2 may be transmitted in symbols #2 and #3 of slot #2. CORESET #0 #3 may be transmitted in symbols #6 and #7 of slot #2. CORESET #0 #4 may be transmitted in symbols #2 and #3 of slot #3. CORESET #0 #5 may be transmitted in symbols #6 and #7 of slot #3. CORESET #0 #6 may be transmitted in symbols #2 and #3 of slot #4. CORESET #0 #7 may be transmitted in symbols #6 and #7 of slot #4.

Figure 78:
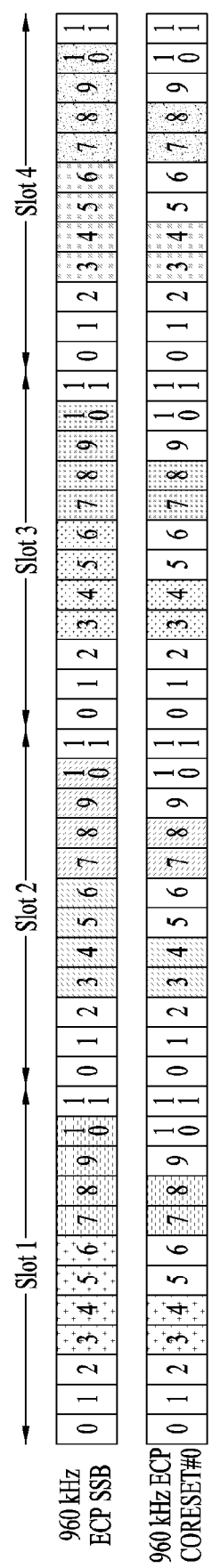

Referring to FIG. 78, when Proposed Method 4-2-2-2 is applied, SSB #0 may be transmitted in symbols #3 to #6 of slot #1, SSB #1 may be transmitted in symbols #7 to #10 of slot #1, SSB #2 may be transmitted in symbols #3 to #6 of slot #2, SSB #3 may be transmitted in symbols #7 to #10 of slot #2, SSB #4 may be transmitted in symbols #3 to #6 of slot #3, SSB #5 may be transmitted in symbols #7 to #10 of slot #3, SSB #6 may be transmitted in symbols #3 to #6 of slot #4, and SSB #7 may be transmitted in symbols #7 to #10 of slot #4.

Referring to FIG. 78, CORESET #0 #0 may be transmitted in symbols #3 and #4 of slot #1. CORESET #0 #1 may be transmitted in symbols #7 and #8 of slot #1. CORESET #0 #2 may be transmitted in symbols #3 and #4 of slot #2. CORESET #0 #3 may be transmitted in symbols #7 and #8 of slot #2. CORESET #0 #4 may be transmitted in symbols #3 and #4 of slot #3. CORESET #0 #5 may be transmitted in symbols #7 and #8 of slot #3. CORESET #0 #6 may be transmitted in symbols #3 and #4 of slot #4. CORESET #0 #7 may be transmitted in symbols #7 and #8 of slot #4.

Figure 79:
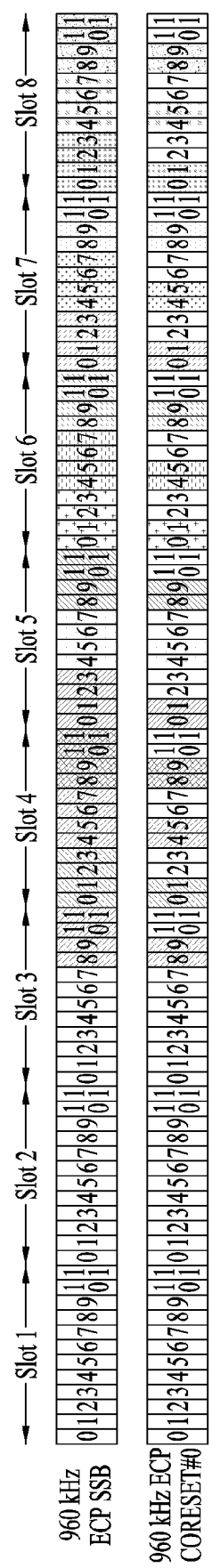

Referring to FIG. 79, when Proposed Method 4-3-1 is applied, SSBs from SSB #0 to SSB #15 may be continuously transmitted in OFDM symbols from OFDM symbol #8 of slot #3 to OFDM symbol #11 of slot #8.

Referring to FIG. 79, CORESET #0s from CORESET #0 #0 to CORESET #0 #15 may be continuously transmitted in OFDM symbols from OFDM symbol #8 of slot #3 to OFDM symbol #9 of slot #8. Two OFDM symbols may be allocated to one CORESET #0, and a gap of two OFDM symbols may be configured between CORESET #0s.

Figure 80:
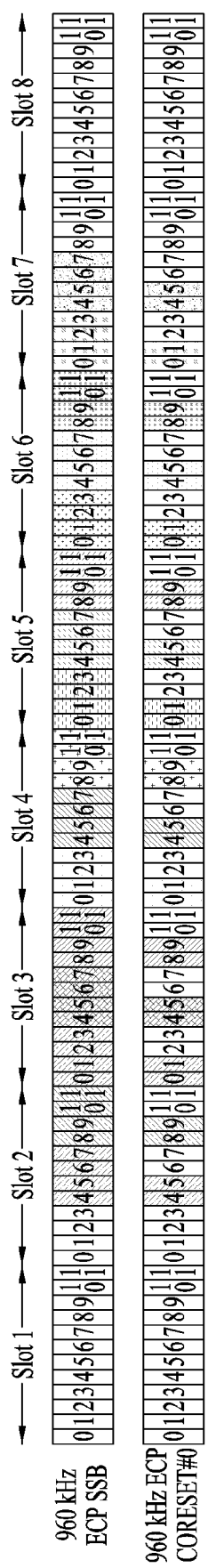

Referring to FIG. 80, when Proposed Method 4-3-1-1 is applied, SSBs from SSB #0 to SSB #15 may be continuously transmitted in OFDM symbols from OFDM symbol #4 of slot #2 to OFDM symbol #7 of slot #7.

Referring to FIG. 80, CORESET #0s from CORESET #0 #0 to CORESET #0 #15 may be continuously transmitted in OFDM symbols from OFDM symbol #4 of slot #2 to OFDM symbol #5 of slot #7. Two OFDM symbols may be allocated to one CORESET #0, and a gap of two OFDM symbols may be configured between CORESET #0s.

Figure 81:
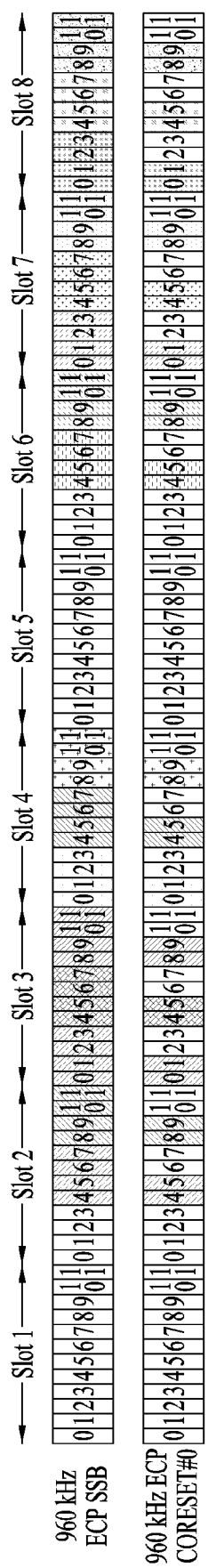

Referring to FIG. 81, when Proposed Method 4-3-2 is applied, SSBs from SSB #0 to SSB #7 may be continuously transmitted in OFDM symbols from OFDM symbol #4 of slot #2 to OFDM symbol #11 of slot #4, and SSBs from SSB #8 to SSB #15 may be continuously transmitted in OFDM symbols from OFDM symbol #4 of slot #6 to OFDM symbol #11 of slot #8.

Referring to FIG. 81, CORESET #0s from CORESET #0 #0 to CORESET #0 #7 may be continuously transmitted in OFDM symbols from OFDM symbol #4 of slot #2 to OFDM symbol #9 of slot #4. Two OFDM symbols may be allocated to one CORESET #0, and a gap of two OFDM symbols may be configured between CORESET #0s. CORESET #0s from CORESET #0 #8 to CORESET #0 #15 may be continuously transmitted in OFDM symbols from OFDM symbol #4 of slot #6 to OFDM symbol #9 of slot #8. Two OFDM symbols may be allocated to one CORESET #0, and a gap of two OFDM symbols may be configured between CORESET #0s.

Figure 82:
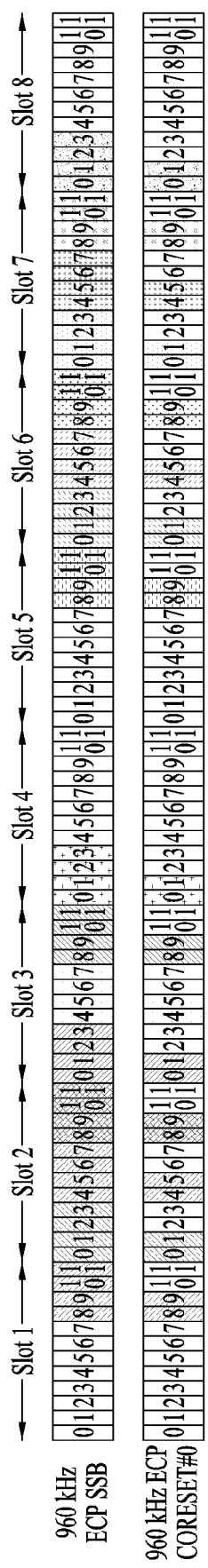

Referring to FIG. 82, when Proposed Method 4-3-2-1 is applied, SSBs from SSB #0 to SSB #7 may be continuously transmitted in OFDM symbols from OFDM symbol #8 of slot #1 to OFDM symbol #3 of slot #4, and SSBs from SSB #8 to SSB #15 may be continuously transmitted in OFDM symbols from OFDM symbol #8 of slot #5 to OFDM symbol #3 of slot #8.

Referring to FIG. 82, CORESET #0s from CORESET #0 #0 to CORESET #0 #7 may be continuously transmitted in OFDM symbols from OFDM symbol #8 of slot #1 to OFDM symbol #1 of slot #4. Two OFDM symbols may be allocated to one CORESET #0, and a gap of two OFDM symbols may be configured between CORESET #0s. CORESET #0s from CORESET #0 #8 to CORESET #0 #15 may be continuously transmitted in OFDM symbols from OFDM symbol #8 of slot #5 to OFDM symbol #1 of slot #8. Two OFDM symbols may be allocated to one CORESET #0, and a gap of two OFDM symbols may be configured between CORESET #0s.

Figure 83:
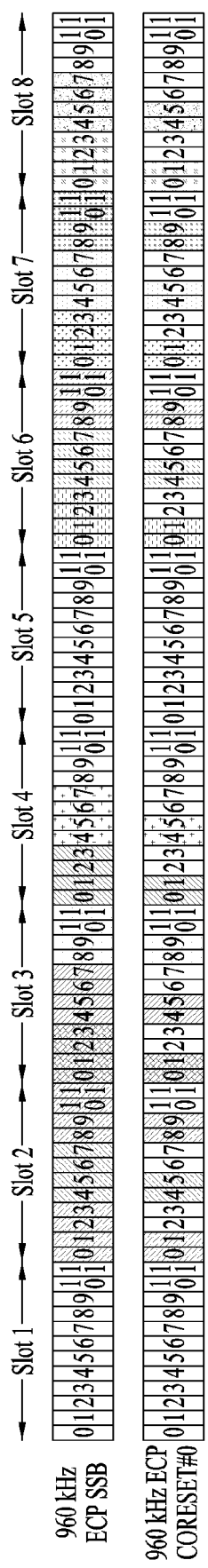

Referring to FIG. 83, when Proposed Method 4-3-2-2 is applied, SSBs from SSB #0 to SSB #7 may be continuously transmitted in OFDM symbols from OFDM symbol #0 of slot #2 to OFDM symbol #7 of slot #4, and SSBs from SSB #8 to SSB #15 may be continuously transmitted in OFDM symbols from OFDM symbol #0 of slot #6 to OFDM symbol #7 of slot #8.

Referring to FIG. 83, CORESET #0s from CORESET #0 #0 to CORESET #0 #7 may be continuously transmitted in OFDM symbols from OFDM symbol #0 of slot #2 to OFDM symbol #5 of slot #4. Two OFDM symbols may be allocated to one CORESET #0, and a gap of two OFDM symbols may be configured between CORESET #0s. CORESET #0s from CORESET #0 #8 to CORESET #0 #15 may be continuously transmitted in OFDM symbols from OFDM symbol #0 of slot #6 to OFDM symbol #5 of slot #8. Two OFDM symbols may be allocated to one CORESET #0, and a gap of two OFDM symbols may be configured between CORESET #0s.

[Proposed Method 5-1-6] Case 6: {960, 480} and Pattern 2

According to Proposed Method 5-1-6, while (maximum) 8 beams are transmitted over four slots, FDM may be performed between the SSB and CORESET #0 to which different numerologies are applied.

Figure 84:
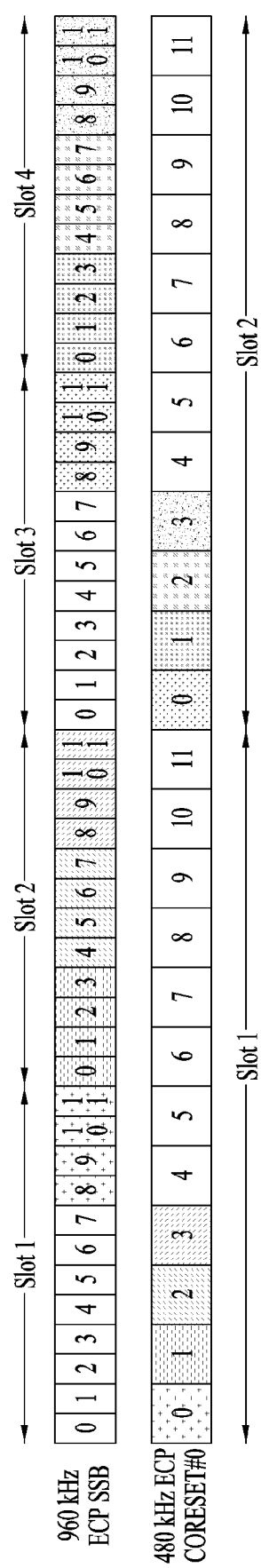

Referring to FIG. 84, when Proposed Method 4-2-1 is applied, SSB #0 may be transmitted in symbols #8 to #11 of slot #1, SSB #1 may be transmitted in symbols #0 to #3 of slot #2, SSB #2 may be transmitted in symbols #4 to #7 of slot #2, SSB #3 may be transmitted in symbols #8 to #11 of slot #2, SSB #4 may be transmitted in symbols #8 to #11 of slot #3, SSB #5 may be transmitted in symbols #0 to #3 of slot #4, SSB #6 may be transmitted in symbols #4 to #7 of slot #4, and SSB #7 may be transmitted in symbols #8 to #11 of slot #4.

Referring to FIG. 84, CORESET #0 #0 may be transmitted in symbol #0 of slot #1. CORESET #0 #1 may be transmitted in symbol #1 of slot #1. CORESET #0 #2 may be transmitted in symbol #2 of slot #1. CORESET #0 #3 may be transmitted in symbol #3 of slot #1. CORESET #0 #4 may be transmitted in symbol #0 of slot #2 (aligned with slots #3 and #4 with respect to the 960 kHz SCS). CORESET #0 #5 may be transmitted in symbol #1 of slot #2. CORESET #0 #6 may be transmitted in symbol #2 of slot #2. CORESET #0 #7 may be transmitted in symbol #3 of slot #2.

Figure 85:
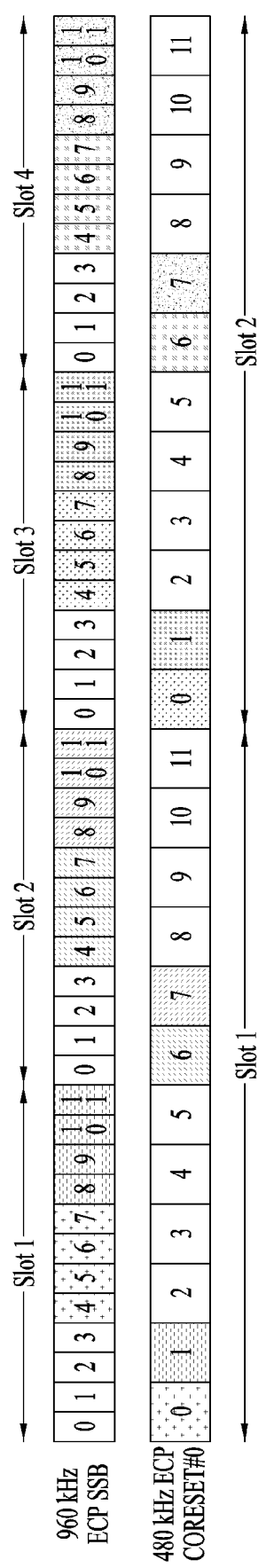

Referring to FIG. 85, when Proposed Method 4-2-2 is applied, SSB #0 may be transmitted in symbols #4 to #7 of slot #1, SSB #1 may be transmitted in symbols #8 to #11 of slot #1, SSB #2 may be transmitted in symbols #4 to #7 of slot #2, SSB #3 may be transmitted in symbols #8 to #11 of slot #2, SSB #4 may be transmitted in symbols #4 to #7 of slot #3, SSB #5 may be transmitted in symbols #8 to #11 of slot #3, SSB #6 may be transmitted in symbols #4 to #7 of slot #4, and SSB #7 may be transmitted in symbols #8 to #11 of slot #4.

Referring to FIG. 85, CORESET #0 #0 may be transmitted in symbol #0 of slot #1. CORESET #0 #1 may be transmitted in symbol #1 of slot #1. CORESET #0 #2 may be transmitted in symbol #6 of slot #1. CORESET #0 #3 may be transmitted in symbol #7 of slot #1. CORESET #0 #4 may be transmitted in symbol #0 of slot #2 (aligned with slots #3 and #4 with respect to the 960 kHz SCS). CORESET #0 #5 may be transmitted in symbol #1 of slot #2. CORESET #0 #6 may be transmitted in symbol #6 of slot #2. CORESET #0 #7 may be transmitted in symbol #7 of slot #2.

Figure 86:
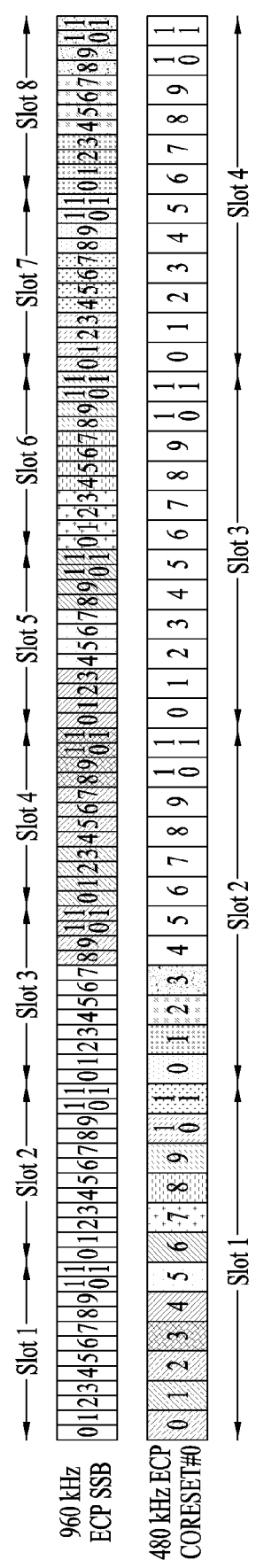

Referring to FIG. 86, when Proposed Method 4-3-1 is applied, SSBs from SSB #0 to SSB #15 may be continuously transmitted in OFDM symbols from OFDM symbol #8 of slot #3 to OFDM symbol #11 of slot #8.

Referring to FIG. 86, CORESET #0s from CORESET #0 #0 to CORESET #0 #15 may be continuously transmitted in OFDM symbols from OFDM symbol #0 of slot #1 to OFDM symbol #3 of slot #2 (aligned with slots #3 and #4 with respect to the 960 kHz SCS). One OFDM symbol may be allocated to one CORESET #0.

Figure 87:
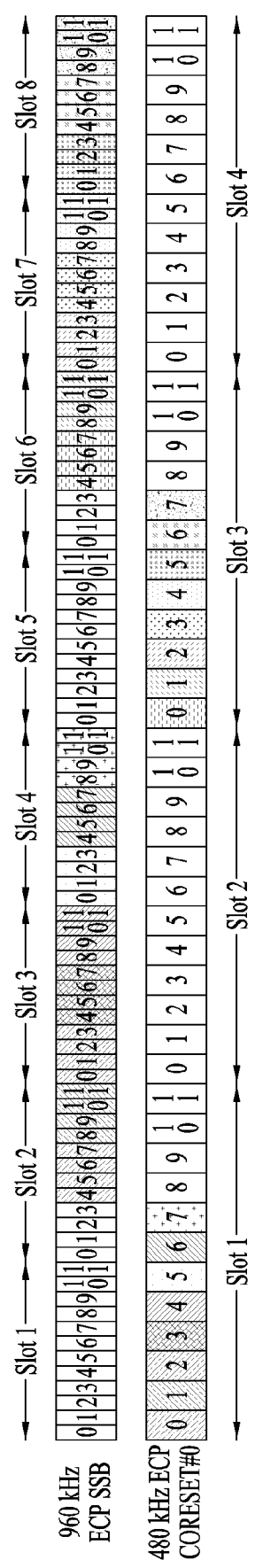

Referring to FIG. 87, when Proposed Method 4-3-2 is applied, SSBs from SSB #0 to SSB #7 may be continuously transmitted in OFDM symbols from OFDM symbol #4 of slot #2 to OFDM symbol #11 of slot #4, and SSBs from SSB #8 to SSB #15 may be continuously transmitted in OFDM symbols from OFDM symbol #4 of slot #6 to OFDM symbol #11 of slot #8.

Referring to FIG. 87, CORESET #0s from CORESET #0 #0 to CORESET #0 #7 may be continuously transmitted in OFDM symbols #0 to #7 of slot #1. CORESET #0s from CORESET #0 #8 to CORESET #0 #15 may be continuously transmitted in OFDM symbols #0 to #7 of slot #3 (aligned with slots #5 and #6 with respect to the 960 kHz SCS). One OFDM symbol may be allocated to one CORESET #0.

In Section 5, cases in which the ECP is applied to both the SSB and CORESET #0 have been described. Hereinafter, cases in which the ECP is used for the SSB in FR4 and the NCP is used for CORESET #0 will be described. The reason why the ECP is used only for the SSB while the NCP is used for CORESET #0 is that the time for automatic gain control (AGC) may be solved by the ECP and the SSB needs to be designed to be robust against delay spread caused by the carrier frequency offset (CFO) of the UE.

Additionally, even if the SSB is fixed to the ECP, the numerology of CORESET #0 may be determined according to one of the ECP and NCP, which is configured by the BS. In this case, information indicating either the ECP or NCP may be transmitted by an MIB or PSS/SSS on a PBCH.

Although the following proposals are based on a specific SCS in FR4, the proposals may also be applied to other bands if the ratio of the SCS of CORESET #0 to the SCS of the SSB is the same.

[Proposed Method 5-2-1] Different CP Case 1: {960 ECP, 960 NCP} and Pattern 1

According to Proposed Method 5-2-1, while (maximum) 8 beams are transmitted over four slots, TDM may be performed between the SSB and CORESET #0. Two beams for CORESET #0 and two beams for the SSB may be transmitted in each slot.

The locations of time-domain resources of CORESET #0 in Proposed Method 5-2-1 may be equally applied not only when TDM is performed between the SSB and CORESET #0 as in pattern 1 but also when FDM is performed between the SSB and CORESET #0.

Figure 88:
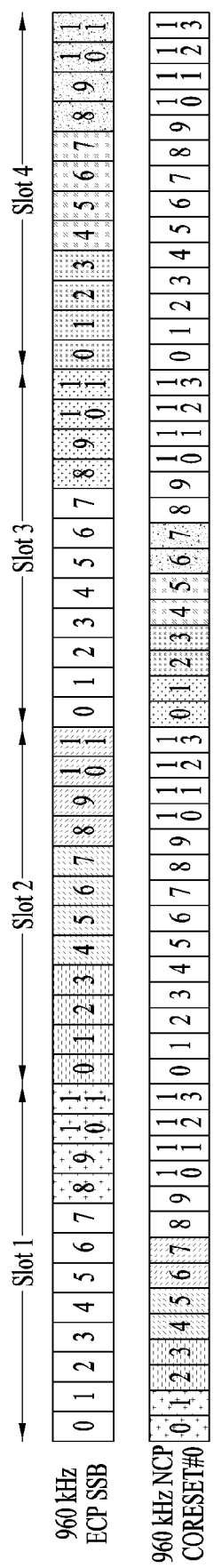

Referring to FIG. 88, when Proposed Method 4-2-1 is applied, SSB #0 may be transmitted in symbols #8 to #11 of slot #1, SSB #1 may be transmitted in symbols #0 to #3 of slot #2, SSB #2 may be transmitted in symbols #4 to #7 of slot #2, SSB #3 may be transmitted in symbols #8 to #11 of slot #2, SSB #4 may be transmitted in symbols #8 to #11 of slot #3, SSB #5 may be transmitted in symbols #0 to #3 of slot #4, SSB #6 may be transmitted in symbols #4 to #7 of slot #4, and SSB #7 may be transmitted in symbols #8 to #11 of slot #4.

Referring to FIG. 88, CORESET #0 #0 may be transmitted in symbols #0 and #1 of slot #1. CORESET #0 #1 may be transmitted in symbols #2 and #3 of slot #1. CORESET #0 #2 may be transmitted in symbols #4 and #5 of slot #1. CORESET #0 #3 may be transmitted in symbols #6 and #7 of slot #1. CORESET #0 #4 may be transmitted in symbols #0 and #1 of slot #3. CORESET #0 #5 may be transmitted in symbols #2 and #3 of slot #3. CORESET #0 #6 may be transmitted in symbols #4 and #5 of slot #3. CORESET #0 #7 may be transmitted in symbols #6 and #7 of slot #4.

Figure 89:
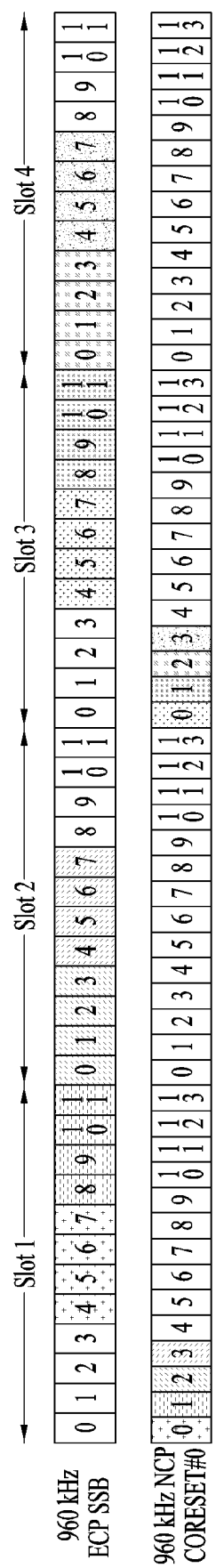

Referring to FIG. 89, when Proposed Method 4-2-1-1 is applied, SSB #0 may be transmitted in symbols #4 to #7 of slot #1, SSB #1 may be transmitted in symbols #8 to #11 of slot #1, SSB #2 may be transmitted in symbols #0 to #3 of slot #2, SSB #3 may be transmitted in symbols #4 to #7 of slot #2, SSB #4 may be transmitted in symbols #4 to #7 of slot #3, SSB #5 may be transmitted in symbols #8 to #11 of slot #3, SSB #6 may be transmitted in symbols #0 to #3 of slot #4, and SSB #7 may be transmitted in symbols #4 to #7 of slot #4.

Referring to FIG. 89, CORESET #0 #0 may be transmitted in symbol #0 of slot #1. CORESET #0 #1 may be transmitted in symbol #1 of slot #1. CORESET #0 #2 may be transmitted in symbol #2 of slot #1. CORESET #0 #3 may be transmitted in symbol #3 of slot #1. CORESET #0 #4 may be transmitted in symbol #0 of slot #3. CORESET #0 #5 may be transmitted in symbol #1 of slot #3. CORESET #0 #6 may be transmitted in symbol #2 of slot #3. CORESET #0 #7 may be transmitted in symbol #3 of slot #3.

In particular, in FIG. 89, small resources are used for CORESET #0.

Figure 90:
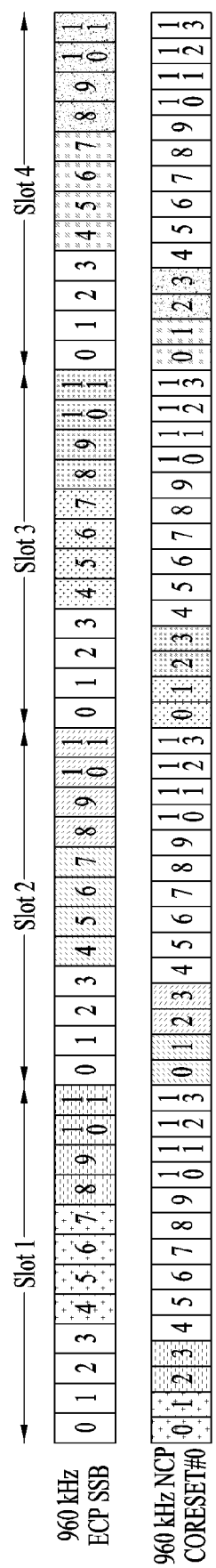

Referring to FIG. 90, when Proposed Method 4-2-2 is applied, SSB #0 may be transmitted in symbols #4 to #7 of slot #1, SSB #1 may be transmitted in symbols #8 to #11 of slot #1, SSB #2 may be transmitted in symbols #4 to #7 of slot #2, SSB #3 may be transmitted in symbols #8 to #11 of slot #2, SSB #4 may be transmitted in symbols #4 to #7 of slot #3, SSB #5 may be transmitted in symbols #8 to #11 of slot #3, SSB #6 may be transmitted in symbols #4 to #7 of slot #4, and SSB #7 may be transmitted in symbols #8 to #11 of slot #4.

Referring to FIG. 90, CORESET #0 #0 may be transmitted in symbols #0 and #1 of slot #1. CORESET #0 #1 may be transmitted in symbols #2 and #3 of slot #1. CORESET #0 #2 may be transmitted in symbols #0 and #1 of slot #2. CORESET #0 #3 may be transmitted in symbols #2 and #3 of slot #2. CORESET #0 #4 may be transmitted in symbols #0 and #1 of slot #3. CORESET #0 #5 may be transmitted in symbols #2 and #3 of slot #3. CORESET #0 #6 may be transmitted in symbols #0 and #1 of slot #4. CORESET #0 #7 may be transmitted in symbols #2 and #3 of slot #4.

Figure 91:
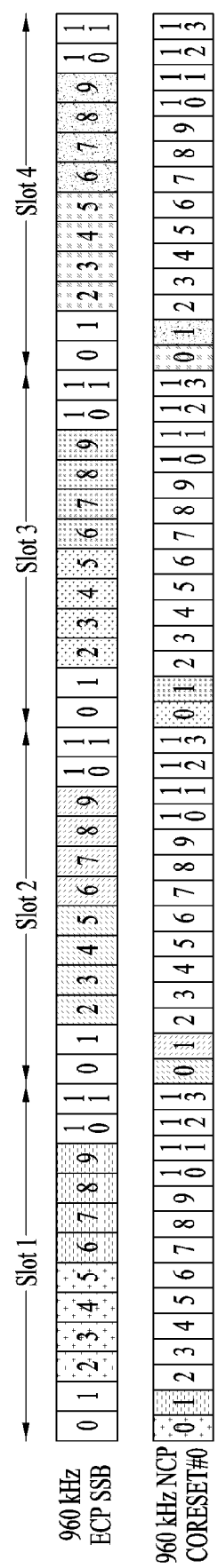

Referring to FIG. 91, when Proposed Method 4-2-2-1 is applied, SSB #0 may be transmitted in symbols #2 to #5 of slot #1, SSB #1 may be transmitted in symbols #6 to #9 of slot #1, SSB #2 may be transmitted in symbols #2 to #5 of slot #2, SSB #3 may be transmitted in symbols #6 to #9 of slot #2, SSB #4 may be transmitted in symbols #2 to #5 of slot #3, SSB #5 may be transmitted in symbols #6 to #9 of slot #3, SSB #6 may be transmitted in symbols #2 to #5 of slot #4, and SSB #7 may be transmitted in symbols #6 to #9 of slot #4.

Referring to FIG. 91, CORESET #0 #0 may be transmitted in symbol #0 of slot #1. CORESET #0 #1 may be transmitted in symbol #1 of slot #1. CORESET #0 #2 may be transmitted in symbol #0 of slot #2. CORESET #0 #3 may be transmitted in symbol #1 of slot #2. CORESET #0 #4 may be transmitted in symbol #0 of slot #3. CORESET #0 #5 may be transmitted in symbol #1 of slot #3. CORESET #0 #6 may be transmitted in symbol #0 of slot #4. CORESET #0 #7 may be transmitted in symbol #1 of slot #4.

Figure 92:
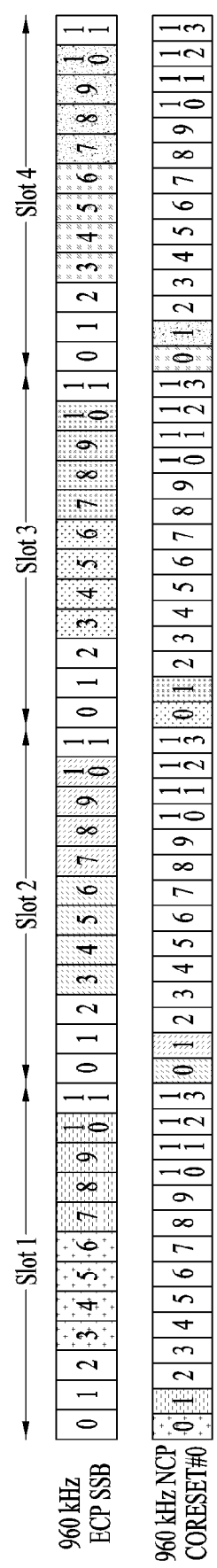

Referring to FIG. 92, when Proposed Method 4-2-2-2 is applied, SSB #0 may be transmitted in symbols #3 to #6 of slot #1, SSB #1 may be transmitted in symbols #7 to #10 of slot #1, SSB #2 may be transmitted in symbols #3 to #6 of slot #2, SSB #3 may be transmitted in symbols #7 to #10 of slot #2, SSB #4 may be transmitted in symbols #3 to #6 of slot #3, SSB #5 may be transmitted in symbols #7 to #10 of slot #3, SSB #6 may be transmitted in symbols #3 to #6 of slot #4, and SSB #7 may be transmitted in symbols #7 to #10 of slot #4.

Referring to FIG. 92, CORESET #0 #0 may be transmitted in symbol #0 of slot #1. CORESET #0 #1 may be transmitted in symbol #1 of slot #1. CORESET #0 #2 may be transmitted in symbol #0 of slot #2. CORESET #0 #3 may be transmitted in symbol #1 of slot #2. CORESET #0 #4 may be transmitted in symbol #0 of slot #3. CORESET #0 #5 may be transmitted in symbol #1 of slot #3. CORESET #0 #6 may be transmitted in symbol #0 of slot #4. CORESET #0 #7 may be transmitted in symbol #1 of slot #4.

In particular, in FIG. 92, small resources are used for CORESET #0.

Figure 93:
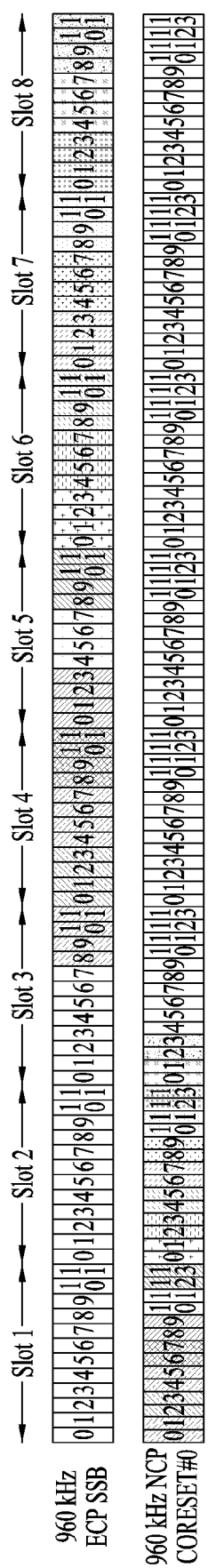

Referring to FIG. 93, when Proposed Method 4-3-1 is applied, SSBs from SSB #0 to SSB #15 may be continuously transmitted in OFDM symbols from OFDM symbol #8 of slot #3 to OFDM symbol #11 of slot #8.

Referring to FIG. 93, CORESET #0s from CORESET #0 #0 to CORESET #0 #15 may be continuously transmitted in OFDM symbols from OFDM symbol #0 of slot #1 to OFDM symbol #3 of slot #3. Two OFDM symbols may be allocated to one CORESET #0.

Figure 94:
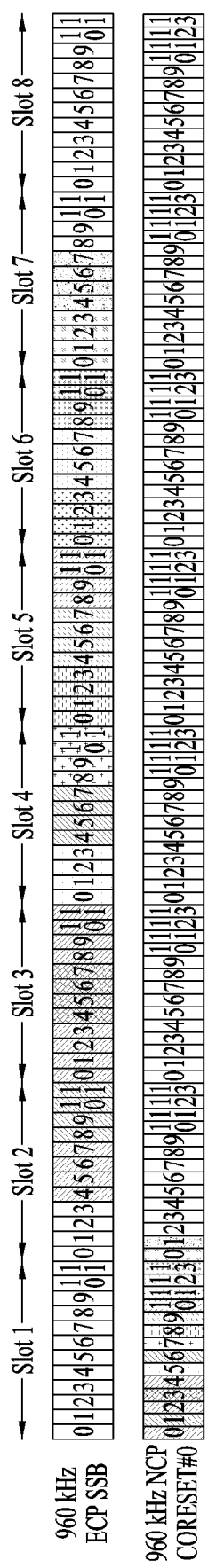

Referring to FIG. 94, when Proposed Method 4-3-1-1 is applied, SSBs from SSB #0 to SSB #15 may be continuously transmitted in OFDM symbols from OFDM symbol #4 of slot #2 to OFDM symbol #7 of slot #7.

Referring to FIG. 94, CORESET #0s from CORESET #0 #0 to CORESET #0 #15 may be continuously transmitted in OFDM symbols from OFDM symbol #0 of slot #1 to OFDM symbol #1 of slot #2. One OFDM symbol may be allocated to one CORESET #0.

Figure 95:
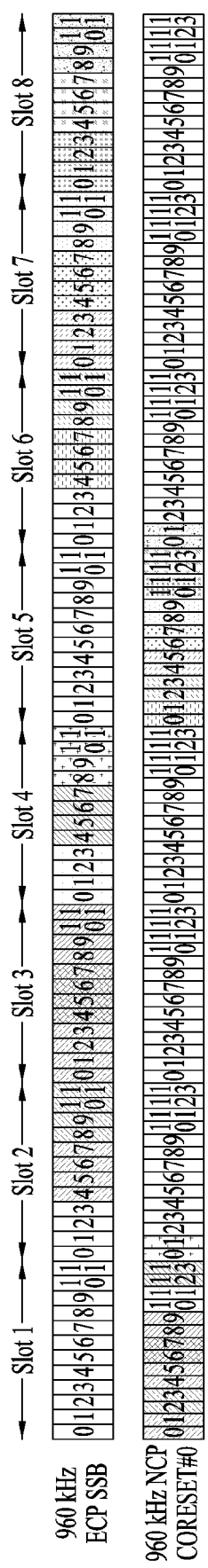

Referring to FIG. 95, when Proposed Method 4-3-2 is applied, SSBs from SSB #0 to SSB #7 may be continuously transmitted in OFDM symbols from OFDM symbol #4 of slot #2 to OFDM symbol #11 of slot #4, and SSBs from SSB #8 to SSB #15 may be continuously transmitted in OFDM symbols from OFDM symbol #4 of slot #6 to OFDM symbol #11 of slot #8.

Referring to FIG. 95, CORESET #0s from CORESET #0 #0 to CORESET #0 #7 may be continuously transmitted in OFDM symbols from OFDM symbol #0 of slot #1 to OFDM symbol #1 of slot #2. CORESET #0s from CORESET #0 #8 to CORESET #0 #15 may be continuously transmitted in OFDM symbols from OFDM symbol #0 of slot #5 to OFDM symbol #1 of slot #6. Two OFDM symbols may be allocated to one CORESET #0.

[5-2-2] Different CP Case 2: {960 ECP, 960 NCP} and Pattern 3

According to Proposed Method 5-2-2, while (maximum) 8 beams are transmitted over four slots, FDM may be performed between the SSB and CORESET #0 to which the same numerology is applied.

Figure 96:
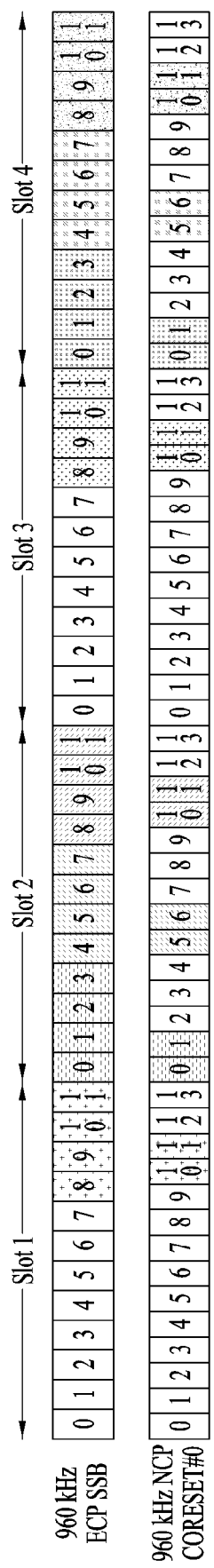

Referring to FIG. 96, when Proposed Method 4-2-1 is applied, SSB #0 may be transmitted in symbols #8 to #11 of slot #1, SSB #1 may be transmitted in symbols #0 to #3 of slot #2, SSB #2 may be transmitted in symbols #4 to #7 of slot #2, SSB #3 may be transmitted in symbols #8 to #11 of slot 1 #2, SSB #4 may be transmitted in symbols #8 to #11 of slot #3, SSB #5 may be transmitted in symbols #0 to #3 of slot #4, SSB #6 may be transmitted in symbols #4 to #7 of slot #4, and SSB #7 may be transmitted in symbols #8 to #11 of slot #4.

Referring to FIG. 96, CORESET #0 #0 may be transmitted in symbols #10 and #11 of slot #1. CORESET #0 #1 may be transmitted in symbols #0 and #1 of slot #2. CORESET #0 #2 may be transmitted in symbols #5 and #6 of slot #2. CORESET #0 #3 may be transmitted in symbols #10 and #11 of slot #2. CORESET #0 #4 may be transmitted in symbols #10 and #11 of slot #3. CORESET #0 #5 may be transmitted in symbols #0 and #1 of slot #4. CORESET #0 #6 may be transmitted in symbols #5 and #6 of slot #4. CORESET #0 #7 may be transmitted in symbols #10 and #11 of slot #4.

Figure 97:
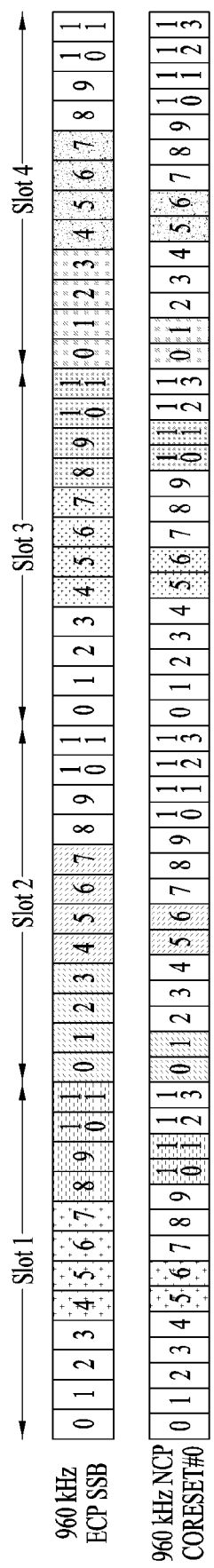

Referring to FIG. 97, when Proposed Method 4-2-1-1 is applied, SSB #0 may be transmitted in symbols #4 to #7 of slot #1, SSB #1 may be transmitted in symbols #8 to #11 of slot #1, SSB #2 may be transmitted in symbols #0 to #3 of slot #2, SSB #3 may be transmitted in symbols #4 to #7 of slot #2, SSB #4 may be transmitted in symbols #4 to #7 of slot #3, SSB #5 may be transmitted in symbols #8 to #11 of slot #3, SSB #6 may be transmitted in symbols #0 to #3 of slot #4, and SSB #7 may be transmitted in symbols #4 to #7 of slot #4.

Referring to FIG. 97, CORESET #0 #0 may be transmitted in symbols #5 and #6 of slot #1. CORESET #0 #1 may be transmitted in symbols #10 and #11 of slot #1. CORESET #0 #2 may be transmitted in symbols #0 and #1 of slot #2. CORESET #0 #3 may be transmitted in symbols #5 and #6 of slot #2. CORESET #0 #4 may be transmitted in symbols #5 and #6 of slot #3. CORESET #0 #5 may be transmitted in symbols #10 and #11 of slot #3. CORESET #0 #6 may be transmitted in symbols #0 and #1 of slot #4. CORESET #0 #7 may be transmitted in symbols #5 and #6 of slot #4.

Figure 98:
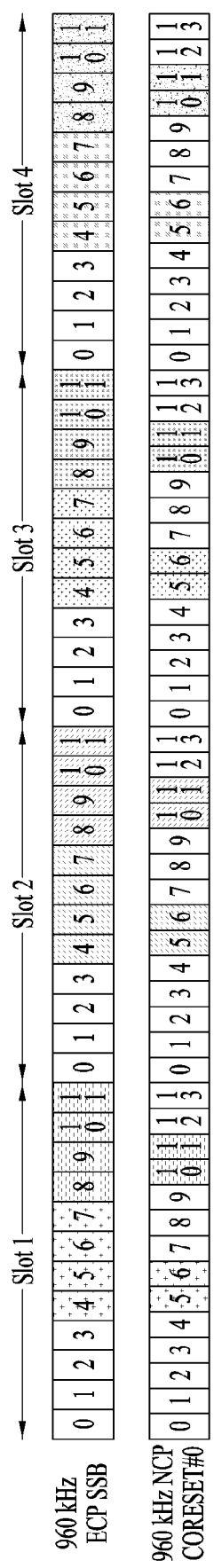

Referring to FIG. 98, when Proposed Method 4-2-2 is applied, SSB #0 may be transmitted in symbols #4 to #7 of slot #1, SSB #1 may be transmitted in symbols #8 to #11 of slot #1, SSB #2 may be transmitted in symbols #4 to #7 of slot #2, SSB #3 may be transmitted in symbols #8 to #11 of slot #2, SSB #4 may be transmitted in symbols #4 to #7 of slot #2, SSB #5 may be transmitted in symbols #8 to #11 of slot #3, SSB #6 may be transmitted in symbols #4 to #7 of slot #3, and SSB #7 may be transmitted in symbols #8 to #11 of slot #4.

Referring to FIG. 98, CORESET #0 #0 may be transmitted in symbols #5 and #6 of slot #1. CORESET #0 #1 may be transmitted in symbols #10 and #11 of slot #1. CORESET #0 #2 may be transmitted in symbols #5 and #6 of slot #2. CORESET #0 #3 may be transmitted in symbols #10 and #11 of slot #2. CORESET #0 #4 may be transmitted in symbols #5 and #6 of slot #3. CORESET #0 #5 may be transmitted in symbols #10 and #11 of slot #3. CORESET #0 #6 may be transmitted in symbols #5 and #6 of slot #4. CORESET #0 #7 may be transmitted in symbols #10 and #11 of slot #4.

Figure 99:
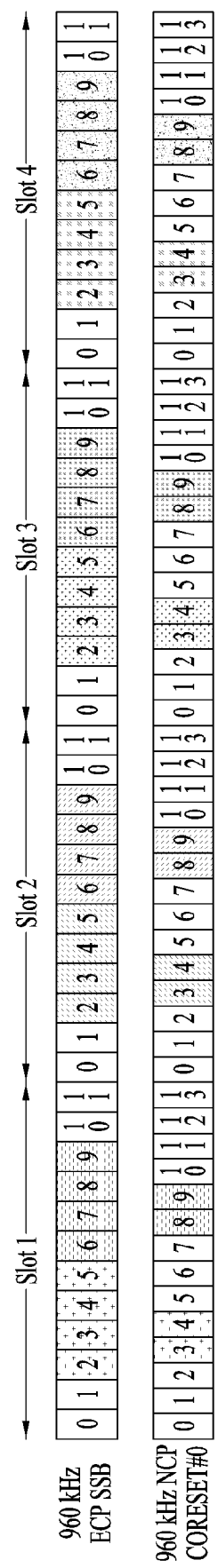

Referring to FIG. 99, when Proposed Method 4-2-2-1 is applied, SSB #0 may be transmitted in symbols #2 to #5 of slot #1, SSB #1 may be transmitted in symbols #6 to #9 of slot #1, SSB #2 may be transmitted in symbols #2 to #5 of slot #2, SSB #3 may be transmitted in symbols #6 to #9 of slot #2, SSB #4 may be transmitted in symbols #2 to #5 of slot #3, SSB #5 may be transmitted in symbols #6 to #9 of slot #3, SSB #6 may be transmitted in symbols #2 to #5 of slot #4, and SSB #7 may be transmitted in symbols #6 to #9 of slot #4.

Referring to FIG. 99, CORESET #0 #0 may be transmitted in symbols #3 and #4 of slot #1. CORESET #0 #1 may be transmitted in symbols #8 and #9 of slot #1. CORESET #0 #2 may be transmitted in symbols #3 and #4 of slot #2. CORESET #0 #3 may be transmitted in symbols #8 and #9 of slot #2. CORESET #0 #4 may be transmitted in symbols #3 and #4 of slot #3. CORESET #0 #5 may be transmitted in symbols #8 and #9 of slot #3. CORESET #0 #6 may be transmitted in symbols #3 and #4 of slot #4. CORESET #0 #7 may be transmitted in symbols #8 and #9 of slot #4.

Figure 100:
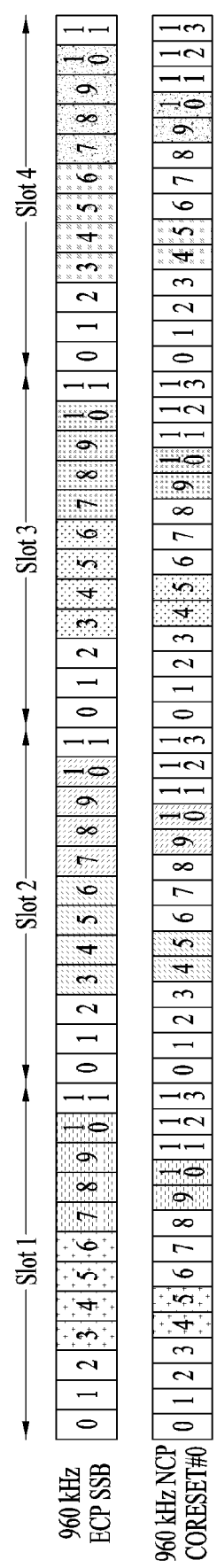

Referring to FIG. 100, when Proposed Method 4-2-2-2 is applied, SSB #0 may be transmitted in symbols #3 to #6 of slot #1, SSB #1 may be transmitted in symbols #7 to #10 of slot #1, SSB #2 may be transmitted in symbols #3 to #6 of slot #2, SSB #3 may be transmitted in symbols #7 to #10 of slot #2, SSB #4 may be transmitted in symbols #3 to #6 of slot #3, SSB #5 may be transmitted in symbols #7 to #10 of slot #3, SSB #6 may be transmitted in symbols #3 to #6 of slot #4, and SSB #7 may be transmitted in symbols #7 to #10 of slot #4.

Referring to FIG. 100, CORESET #0 #0 may be transmitted in symbols #4 and #5 of slot #1. CORESET #0 #1 may be transmitted in symbols #9 to #10 of slot #1. CORESET #0 #2 may be transmitted in symbols #4 and #5 of slot #2. CORESET #0 #3 may be transmitted in symbols #9 to #10 of slot #2. CORESET #0 #4 may be transmitted in symbols #4 and #5 of slot #3. CORESET #0 #5 may be transmitted in symbols #9 to #10 of slot #3. CORESET #0 #6 may be transmitted in symbols #4 and #5 of slot #4. CORESET #0 #7 may be transmitted in symbols #9 to #10 of slot #4.

Figure 101:
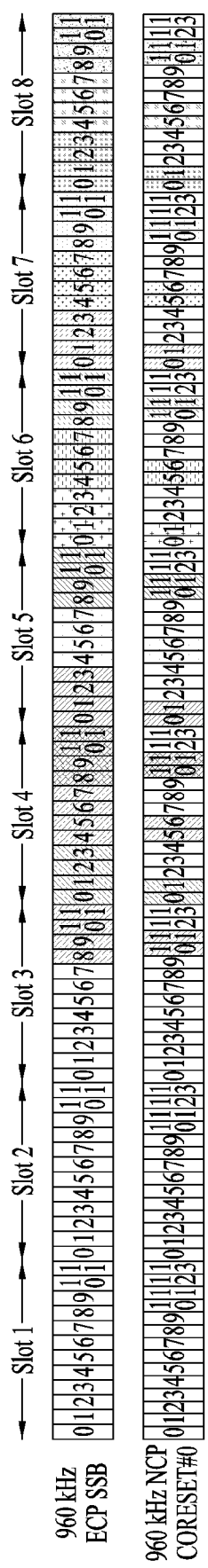

Referring to FIG. 101, when Proposed Method 4-3-1 is applied, SSBs from SSB #0 to SSB #15 may be continuously transmitted in OFDM symbols from OFDM symbol #8 of slot #3 to OFDM symbol #11 of slot #8.

Referring to FIG. 101, CORESET #0 #0 may be transmitted in symbols #10 and #11 of slot #3. CORESET #0 #1 may be transmitted in symbols #0 and #1 of slot #4. CORESET #0 #2 may be transmitted in symbols #5 and #6 of slot #4. CORESET #0 #3 may be transmitted in symbols #10 and #11 of slot #4. CORESET #0 #4 may be transmitted in symbols #0 and #1 of slot #5. CORESET #0 #5 may be transmitted in symbols #5 and #6 of slot #5. CORESET #0 #6 may be transmitted in symbols #10 and #11 of slot #5. CORESET #0 #7 may be transmitted in symbols #0 and #1 of slot #6. CORESET #0 #8 may be transmitted in symbols #5 and #6 of slot #6. CORESET #0 #9 may be transmitted in symbols #10 and #11 of slot #6. CORESET #0 #10 may be transmitted in symbols #0 and #1 of slot #7. CORESET #0 #11 may be transmitted in symbols #5 and #6 of slot #7.

CORESET #0 #12 may be transmitted in symbols #10 and #11 of slot #7. CORESET #0 #13 may be transmitted in symbols #0 and #1 of slot #8. CORESET #0 #14 may be transmitted in symbols #5 and #6 of slot #8. CORESET #0 #15 may be transmitted in symbols #10 and #11 of slot #8.

Figure 102:
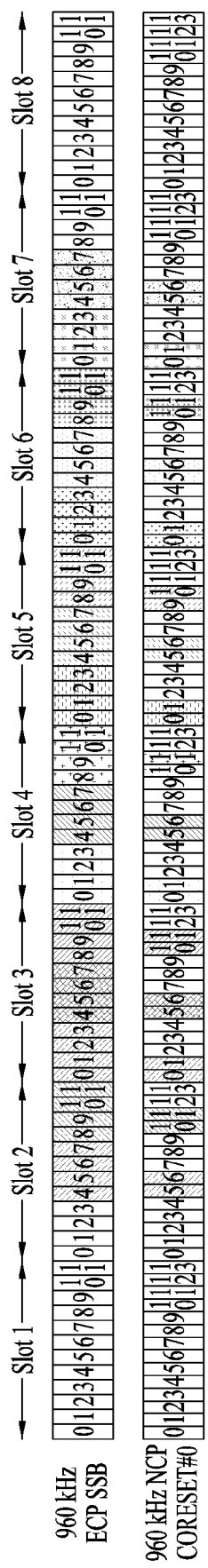

Referring to FIG. 102, when Proposed Method 4-3-1-1 is applied, SSBs from SSB #0 to SSB #15 may be continuously transmitted in OFDM symbols from OFDM symbol #4 of slot #2 to OFDM symbol #7 of slot #7.

Referring to FIG. 102, CORESET #0 #0 may be transmitted in symbols #5 and #6 of slot #2. CORESET #0 #1 may be transmitted in symbols #10 and #11 of slot #2. CORESET #0 #2 may be transmitted in symbols #0 and #1 of slot #3. CORESET #0 #3 may be transmitted in symbols #5 and #6 of slot #3. CORESET #0 #4 may be transmitted in symbols #10 and #11 of slot #3. CORESET #0 #5 may be transmitted in symbols #0 and #1 of slot #4. CORESET #0 #6 may be transmitted in symbols #5 and #6 of slot #4. CORESET #0 #7 may be transmitted in symbols #10 and #11 of slot #4. CORESET #0 #8 may be transmitted in symbols #0 and #1 of slot #5. CORESET #0 #9 may be transmitted in symbols #5 and #6 of slot #5. CORESET #0 #10 may be transmitted in symbols #10 and #11 of slot #5. CORESET #0 #11 may be transmitted in symbols #0 and #1 of slot #6. CORESET #0 #12 may be transmitted in symbols #5 and #6 of slot #6. CORESET #0 #13 may be transmitted in symbols #10 and #11 of slot #6. CORESET #0 #14 may be transmitted in symbols #0 and #1 of slot #7. CORESET #0 #15 may be transmitted in symbols #5 and #6 of slot #7.

Figure 103:
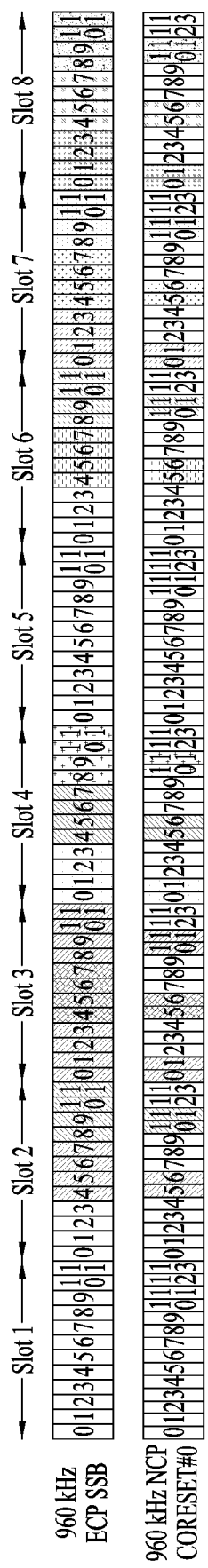

Referring to FIG. 103, when Proposed Method 4-3-2 is applied, SSBs from SSB #0 to SSB #7 may be continuously transmitted in OFDM symbols from OFDM symbol #4 of slot #2 to OFDM symbol #11 of slot #4, and SSBs from SSB #8 to SSB #15 may be continuously transmitted in OFDM symbols from OFDM symbol #4 of slot #6 to OFDM symbol #11 of slot #8.

Referring to FIG. 103, CORESET #0 #0 may be transmitted in symbols #5 and #6 of slot #2. CORESET #0 #1 may be transmitted in symbols #10 and #11 of slot #2. CORESET #0 #2 may be transmitted in symbols #0 and #1 of slot #3. CORESET #0 #3 may be transmitted in symbols #5 and #6 of slot #3. CORESET #0 #4 may be transmitted in symbols #10 and #11 of slot #3. CORESET #0 #5 may be transmitted in symbols #0 and #1 of slot #4. CORESET #0 #6 may be transmitted in symbols #5 and #6 of slot #4. CORESET #0 #7 may be transmitted in symbols #10 and #11 of slot #4. CORESET #0 #8 may be transmitted in symbols #5 and #6 of slot #6. CORESET #0 #9 may be transmitted in symbols #10 and #11 of slot #6. CORESET #0 #10 may be transmitted in symbols #0 and #1 of slot #7. CORESET #0 #11 may be transmitted in symbols #5 and #6 of slot #7. CORESET #0 #12 may be transmitted in symbols #10 and #11 of slot #7. CORESET #0 #13 may be transmitted in symbols #0 and #1 of slot #8. CORESET #0 #14 may be transmitted in symbols #5 and #6 of slot #8. CORESET #0 #15 may be transmitted in symbols #10 and #11 of slot #8.

Figure 104:
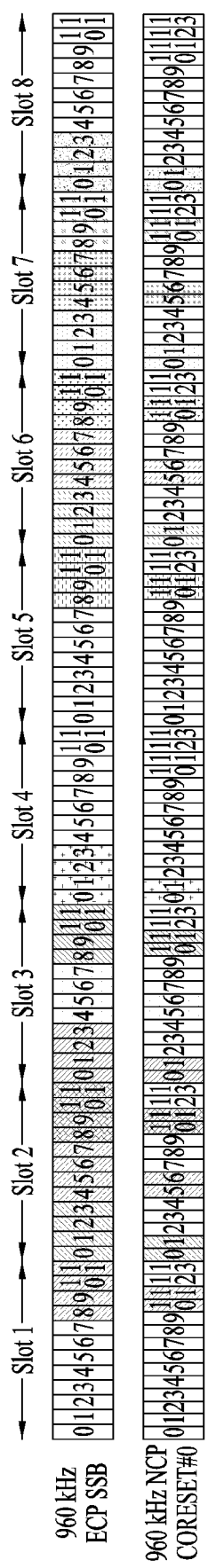

Referring to FIG. 104, when Proposed Method 4-3-2-1 is applied, SSBs from SSB #0 to SSB #7 may be continuously transmitted in OFDM symbols from OFDM symbol #8 of slot #1 to OFDM symbol #3 of slot #4, and SSBs from SSB #8 to SSB #15 may be continuously transmitted in OFDM symbols from OFDM symbol #8 of slot #5 to OFDM symbol #3 of slot #8.

Referring to FIG. 104, CORESET #0 #0 may be transmitted in symbols #10 and #11 of slot #1. CORESET #0 #1 may be transmitted in symbols #0 and #1 of slot #2. CORESET #0 #2 may be transmitted in symbols #5 and #6 of slot #2. CORESET #0 #3 may be transmitted in symbols #10 and #11 of slot #2. CORESET #0 #4 may be transmitted in symbols #0 and #1 of slot #3. CORESET #0 #5 may be transmitted in symbols #5 and #6 of slot #3. CORESET #0 #6 may be transmitted in symbols #10 and #11 of slot #3. CORESET #0 #7 may be transmitted in symbols #0 and #1 of slot #4. CORESET #0 #8 may be transmitted in symbols #10 and #11 of slot #5. CORESET #0 #9 may be transmitted in symbols #0 and #1 of slot #6. CORESET #0 #10 may be transmitted in symbols #5 and #6 of slot #6. CORESET #0 #11 may be transmitted in symbols #10 and #11 of slot #6. CORESET #0 #12 may be transmitted in symbols #0 and #1 of slot #7. CORESET #0 #13 may be transmitted in symbols #5 and #6 of slot #7. CORESET #0 #14 may be transmitted in symbols #10 and #11 of slot #7. CORESET #0 #15 may be transmitted in symbols #0 and #1 of slot #8.

Figure 105:
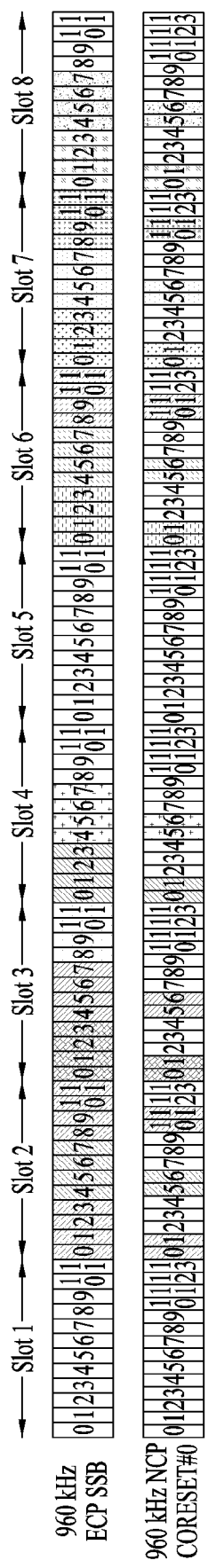

Referring to FIG. 105, when Proposed Method 4-3-2-2 is applied, SSBs from SSB #0 to SSB #7 may be continuously transmitted in OFDM symbols from OFDM symbol #0 of slot #2 to OFDM symbol #7 of slot #4, and SSBs from SSB #8 to SSB #15 may be continuously transmitted in OFDM symbols from OFDM symbol #0 of slot #6 to OFDM symbol #7 of slot #8.

Referring to FIG. 105, CORESET #0 #0 may be transmitted in symbols #0 and #1 of slot #2. CORESET #0 #1 may be transmitted in symbols #5 and #6 of slot #2. CORESET #0 #2 may be transmitted in symbols #10 and #11 of slot #2. CORESET #0 #3 may be transmitted in symbols #0 and #1 of slot #3. CORESET #0 #4 may be transmitted in symbols #5 and #6 of slot #3. CORESET #0 #5 may be transmitted in symbols #10 and #11 of slot #3. CORESET #0 #6 may be transmitted in symbols #0 and #1 of slot #4. CORESET #0 #7 may be transmitted in symbols #5 and #6 of slot #4. CORESET #0 #8 may be transmitted in symbols #0 and #1 of slot #6. CORESET #0 #9 may be transmitted in symbols #5 and #6 of slot #6. CORESET #0 #10 may be transmitted in symbols #10 and #11 of slot #6. CORESET #0 #11 may be transmitted in symbols #0 and #1 of slot #7. CORESET #0 #12 may be transmitted in symbols #5 and #6 of slot #7. CORESET #0 #13 may be transmitted in symbols #10 and #11 of slot #7. CORESET #0 #14 may be transmitted in symbols #0 and #1 of slot #8. CORESET #0 #15 may be transmitted in symbols #5 and #6 of slot #8.

[Proposed Method 5-2-3] Different CP Case 3: {960 ECP. 480 NCP} and Pattern 2

According to Proposed Method 5-2-3, while (maximum) 8 beams are transmitted over four slots, FDM may be performed between the SSB and CORESET #0 to which different numerologies are applied.

Figure 106:
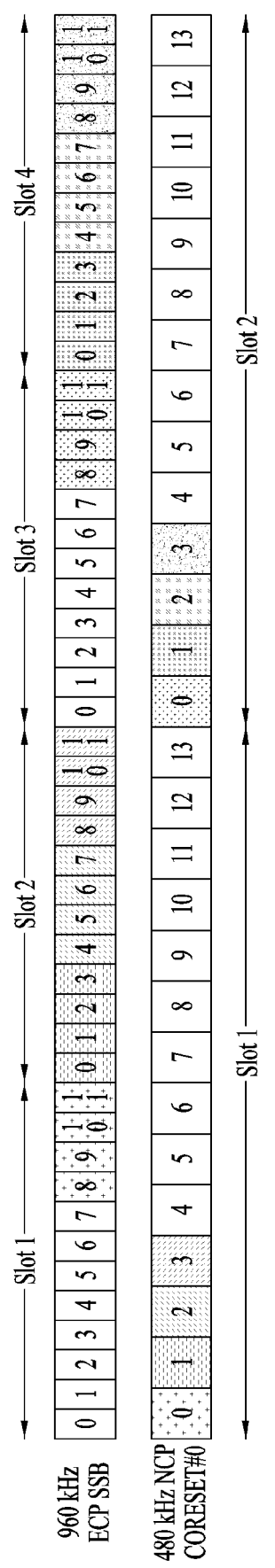

Referring to FIG. 106, when Proposed Method 4-2-1 is applied, SSB #0 may be transmitted in symbols #8 to #11 of slot #1, SSB #1 may be transmitted in symbols #0 to #3 of slot #2, SSB #2 may be transmitted in symbols #4 to #7 of slot #2, SSB #3 may be transmitted in symbols #8 to #11 of slot #2, SSB #4 may be transmitted in symbols #8 to #11 of slot #3, SSB #5 may be transmitted in symbols #0 to #3 of slot #4, SSB #6 may be transmitted in symbols #4 to #7 of slot #4, and SSB #7 may be transmitted in symbols #8 to #11 of slot #4.

Referring to FIG. 106, CORESET #0 #0 is transmitted in symbol #0 of slot #1. CORESET #0 #1 may be transmitted in symbol #1 of slot #1. CORESET #0 #2 may be transmitted in symbol #2 of slot #1. CORESET #0 #3 may be transmitted in symbol #3 of slot #1. CORESET #0 #4 may be transmitted in symbol #0 of slot #2 (aligned with slots #3 and #4 with respect to the 960 kHz SCS). CORESET #0 #5 may be transmitted in symbol #1 of slot #2. CORESET #0 #6 may be transmitted in symbol #2 of slot #2. CORESET #0 #7 may be transmitted in symbol #3 of slot #2.

Figure 107:
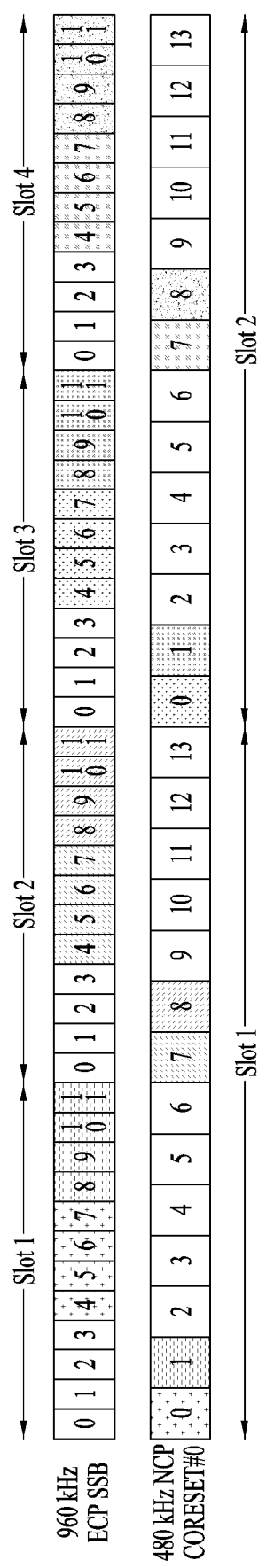

Referring to FIG. 107, when Proposed Method 4-2-2 is applied, SSB #0 may be transmitted in symbols #4 to #7 of slot #1, SSB #1 may be transmitted in symbols #8 to #11 of slot #1, SSB #2 may be transmitted in symbols #4 to #7 of slot #2, SSB #3 may be transmitted in symbols #8 to #11 of slot #2, SSB #4 may be transmitted in symbols #4 to #7 of slot #3, SSB #5 may be transmitted in symbols #8 to #11 of slot #3, SSB #6 may be transmitted in symbols #4 to #7 of slot #4, and SSB #7 may be transmitted in symbols #8 to #11 of slot #4.

Referring to FIG. 107, CORESET #0 #0 may be transmitted in symbol #0 of slot #1. CORESET #0 #1 may be transmitted on the #1 symbol of slot #1. CORESET #0 #2 may be transmitted in symbol #6 of slot #1. CORESET #0 #3 may be transmitted in symbol #7 of slot #1. CORESET #0 #4 may be transmitted in symbol #0 of slot #2 (aligned with slots #3 and #4 with respect to the 960 kHz SCS). CORESET #0 #5 may be transmitted in symbol #1 of slot #2. CORESET #0 #6 may be transmitted in symbol #6 of slot #2. CORESET #0 #7 may be transmitted in symbol #7 of slot #2.

Figure 108:
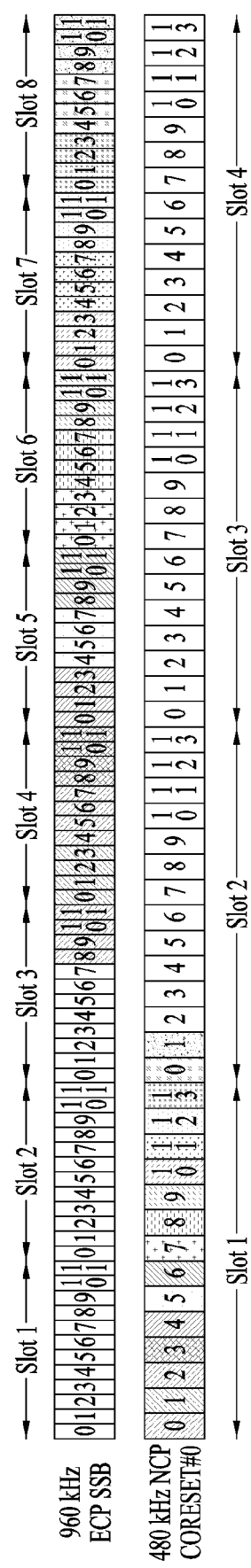

Referring to FIG. 108, when Proposed Method 4-3-1 is applied, SSBs from SSB #0 to SSB #15 may be continuously transmitted in OFDM symbols from OFDM symbol #8 of slot #3 to OFDM symbol #11 of slot #8.

Referring to FIG. 108, CORESET #0s from CORESET #0 #0 to CORESET #0 #15 may be continuously transmitted in OFDM symbols from OFDM symbol #0 of slot #1 to OFDM symbol #1 of slot #2 (aligned with slots #3 and #4 with respect to the 960 kHz SCS). One OFDM symbol may be allocated to one CORESET #0.

Figure 109:
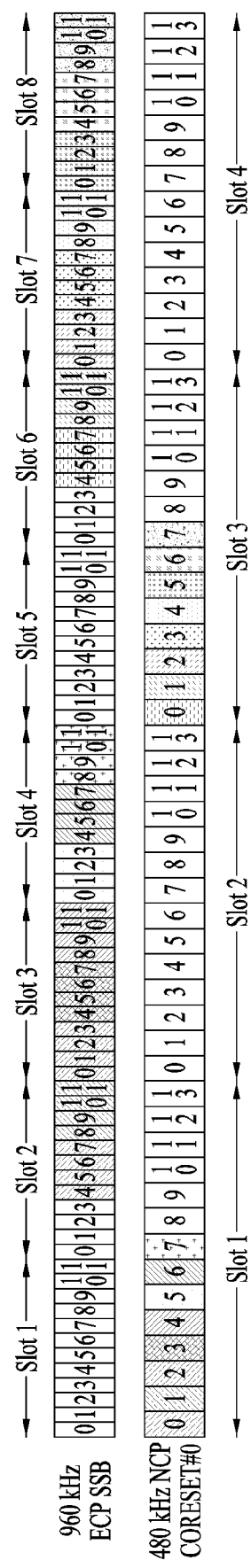

Referring to FIG. 109, when Proposed Method 4-3-2 is applied, SSBs from SSB #0 to SSB #7 may be continuously transmitted in OFDM symbols from OFDM symbol #4 of slot #2 to OFDM symbol #11 of slot #4, and SSBs from SSB #8 to SSB #15 may be continuously transmitted in OFDM symbols from OFDM symbol #4 of slot #6 to OFDM symbol #11 of slot #8.

Referring to FIG. 109, CORESET #0s from CORESET #0 #0 to CORESET #0 #7 may be continuously transmitted in OFDM symbols #0 to #7 of slot #1. CORESET #0s from CORESET #0 #8 to CORESET #0 #15 may be continuously transmitted in OFDM symbols #0 to #7 of slot #3 (aligned with slots #5 and #6 with respect to the 960 kHz SCS). One OFDM symbol may be allocated to one CORESET #0.

Figure 110:
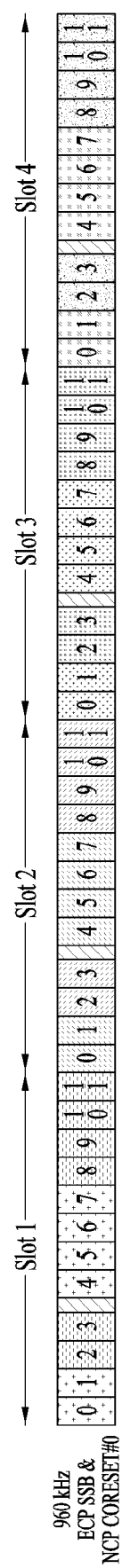

Additionally, the ECP and NCP may coexist in the same slot. For example, the SSB may be transmitted in a symbol to which the ECP is applied, and CORESET #0 may be transmitted in a symbol to which the NCP is applied. FIG. 110 illustrates an example in which the ECP and NCP are configured in the same slot. In each slot, the NCP may be configured in OFDM symbols #0 to #3, and the ECP may be configured in OFDM symbols #4 to #11. CORESET #0 may be transmitted in symbols in which the NCP is configured, and the SSB may be transmitted in symbols in which the ECP is configured. The method in which both the ECP and NCP are configured in the same slot may be applied when the UE receives a DL signal such as a PDCCH/PDSCH/CSI-RS or transmits a UL signal such as a PUSCH/PUCCH/SRS/PRACH in a slot in which the SSB is transmitted. Specifically, an NCP symbol that overlaps with an SSB on an ECP symbol in a slot may operate as the ECP (such a symbol is referred to as a Type 1 symbol), and an NCP symbol that does not overlaps with the SSB on the ECP symbol in the same slot may operates as the NCP (such a symbol is referred to as a Type 2 symbol). When receiving a DL signal in the Type 1 symbol, the UE may apply a CP length and a fast Fourier transform (FFT) window reception period by assuming the ECP symbol. When receiving a DL signal in the Type 2 symbol, the UE may apply a CP length and an FFT window reception period by assuming the NCP symbol. In addition, the UE may expect that no UL signal is transmitted in the Type 1 symbol or ignore a UL grant indicating transmission in the corresponding symbol. When transmitting a UL signal in the Type 2 symbol, the UE may transmit the UL signal by assuming the NCP symbol.

Meanwhile, an ECP based slot and an NCP based slot may be distinguished. For example, the SSB may be transmitted in the ECP based slot, and CORESET #0 may be transmitted in the NCP based slot. In this case, if the CP length of a semi-static signal/channel is different from those of other signals/channels, a control/data channel may be received in symbols and/or slots in which the semi-static signal/channel is configured by applying the CP length of the corresponding semi-static signal/channel thereto. For example, if different CP lengths are configured between an SSB and a CORESET, a control/data channel (e.g., PDCCH, PDSCH, etc.) may be received in symbols and/or slots in which the SSB is configured by applying the CP length of the SSB thereto. Alternatively, a UL signals (e.g., PUSCH/PUCCH/SRS/PRACH, etc.) may be transmitted in the symbols and/or slots in which the SSB is configured by applying the CP length of the SSB thereto.

Implementation Examples

The embodiments of the present disclosure may be implemented by organically combining at least one of the above-described operations.

Figure 111:
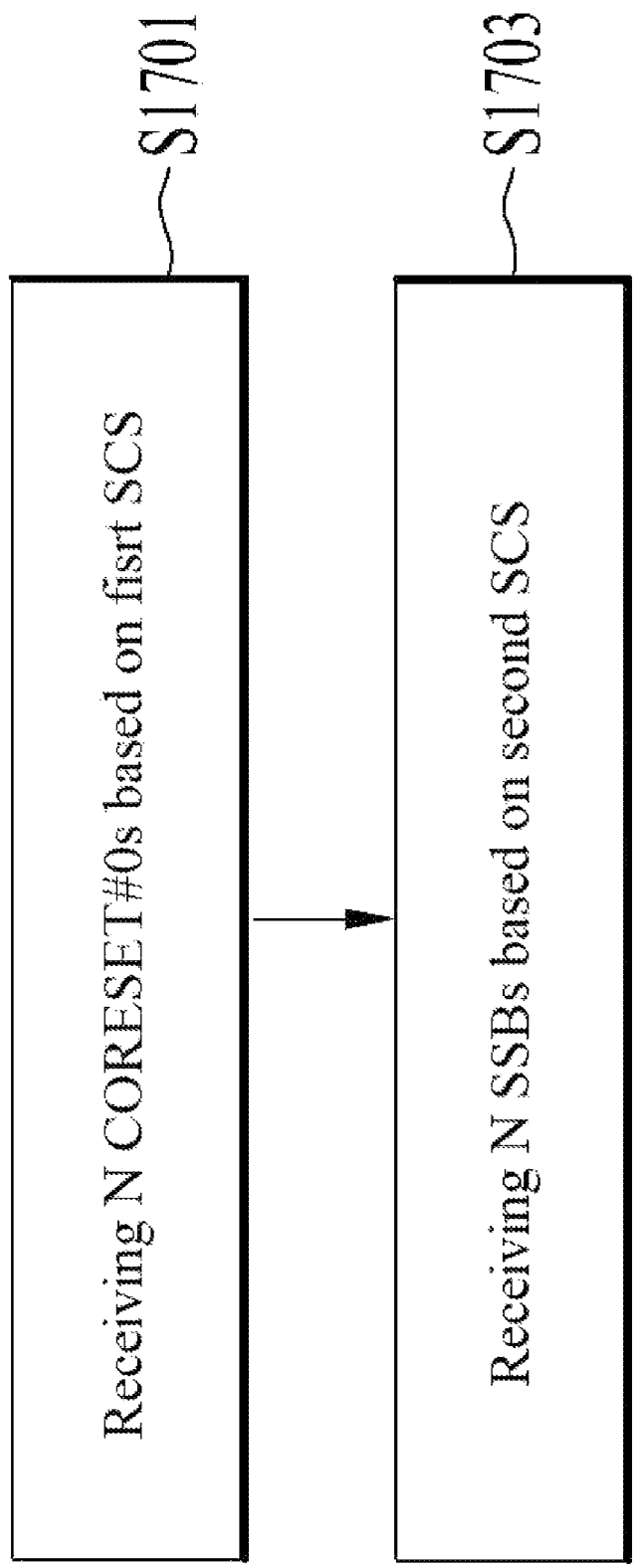
FIG. 111 illustrates a flowchart according to an embodiment of the present disclosure.

In FIG. 111, one of the embodiments implemented by a combination of the above-described operations is illustrated.

FIG. 111 is a flowchart illustrating a signal transmission and reception method according to an embodiment of the present disclosure.

Referring to FIG. 111, an embodiment of the present disclosure implemented by a communication device may include receiving N CORESET #0s based on a first SCS (S1701) and receiving N SSBs based on a second SCS (S1703).

The positions of the N CORESET #0s and the positions of the N SSBs may be configured based on at least one of the methods proposed in Sections 4 and 5 of this document.

For example, as described in Proposed Methods 5-1-1 and 5-1-2, SSBs may be located continuously in the time domain. In addition, CORESET #0s may be located in a slot including the earliest SSB in the time domain among the SSBs, and the CORESET #0s may be located continuously from symbol #0 in the slot.

The first SCS may be twice the second SCS. Alternatively, the first SCS may be the same as the second SCS.

If the first SCS is different from the second SCS, a first ECP may be applied to the CORESET #0s, and a second ECP may be applied to the SSBs.

Each ECP may be configured based on at least one of the methods proposed in Section 3 of the specification.

For example, when the ECPs are configured based on the slot level alignment of Proposed Method 3-1, the first ECP may be configured such that the length of one slot with a reference SCS matches the length of M slots, and the second ECP may be configured such that the length of one slot with the reference SCS matches the length of L slots. In this case, M is $2^{\mu2-\mu1}$, L is $2^{\mu3-\mu1}$, μ1 denotes the value of g related to the reference SCS, μ2 denotes the value of related to the first SCS, and 3 denotes the value of μ related to the second SCS.

When the ECPs are configured based on the half-slot level alignment of Proposed Method 3-1, the ECP may be configured such that the length of a half-slot with a reference SCS matches the length of M slots, and the second ECP may be configured such that the length of the half-slot with the reference SCS matches the length of L slots. In this case, M is $2^{\mu2-\mu1-1}$, L is $2^{\mu3-\mu1-1}$, μ1 denotes the value of related to the reference SCS, μ2 denotes the value of related to the first SCS, and μ3 denotes the value of related to the second SCS.

The value of μ corresponds to an SCS configuration value, which is determined by an SCS value, $\Delta f=2\mu \cdot 15$. For example, when the SCS value Δf is 120 kHz, μ has a value of 3. When the SCS value Δf is 240 kHz, μ has a value of 4. When the SCS value Δf is 480 kHz, μ has a value of 5. When the SCS value Δf is 960 kHz, μ has a value of 6.

The operations described with reference to FIG. 111 may be additionally performed in combination with at least one of the operations described with reference to FIGS. 1 to 110.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 112 illustrates a communication system 1 applied to the present disclosure.

Referring to FIG. 112, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the A1 server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g., V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g., relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

FIG. 113 illustrates wireless devices applicable to the present disclosure.

Referring to FIG. 113, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 112.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

FIG. 114 illustrates another example of a wireless device applied to the present disclosure. The wireless device may be implemented in various forms according to a use case/service (refer to FIG. 112).

Referring to FIG. 114, wireless devices 100 and 200 may correspond to the wireless devices 100 and 200 of FIG. 113 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 113. For example, the transceiver(s) 114 may include the one or more transceivers 106 and 206 and/or the one or more antennas 108 and 208 of FIG. 113. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 112), the vehicles (100b-1 and 100b-2 of FIG. 112), the XR device (100c of FIG. 112), the hand-held device (100d of FIG. 112), the home appliance (100e of FIG. 112), the IoT device (100f of FIG. 112), a digital broadcasting terminal, a hologram device, a public safety device, an MTC device, a medical device, a FinTech device (or a finance device), a security device, a climate/environment device, the AI server/device (400 of FIG. 112), the BSs (200 of FIG. 112), a network node, or the like. The wireless device may be mobile or fixed according to a use case/service.

In FIG. 114, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Example of Vehicle or Autonomous Driving Vehicle to which the Present Disclosure is Applied FIG. 115 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 115, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 114, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

As described above, the present disclosure is applicable to various wireless communication systems.

The invention claimed is:

1. A method of transmitting and receiving a signal by a user equipment (UE) in a wireless communication system, the method comprising:
receiving N control resource set #0s (CORESET #0s) based on a first subcarrier spacing (SCS); and
receiving N synchronization signal blocks (SSBs) based on a second SCS different from the first SCS,
wherein the SSBs are continuously located in a time domain, and
wherein the CORESET #0s are located in a slot including an earliest SSB in the time domain among the SSBs, and the CORESET #0s are continuously located from symbol #0 in the slot.

2. The method of claim 1, wherein the first SCS is twice the second SCS.

3. The method of claim 2, wherein a first extended cyclic prefix (ECP) is applied to the CORESET #0s, and
wherein a second ECP is applied to the SSBs.

4. The method of claim 3, wherein the first ECP is configured such that a length of one slot with a reference SCS matches a length of M slots,
wherein the second ECP is configured such that the length of the one slot with the reference SCS matches a length of L slots,
wherein M and L are $2^{\mu2-\mu1}$ and $2^{\mu3-\mu1}$, respectively, and
wherein μ1 denotes a value of related to the reference SCS, μ2 denotes a value of μ related to the first SCS, and μ3 denotes a value of related to the second SCS.

5. The method of claim 3, wherein the first ECP is configured such that a length of a half-slot with a reference SCS matches a length of M slots,
wherein the second ECP is configured such that the length of the half-slot with the reference SCS matches a length of L slots,
wherein M and L are $2^{\mu2-\mu1}$ and $2^{\mu3-\mu1-1}$, respectively, and
wherein μ1 denotes a value of μ related to the reference SCS, μ2 denotes a value of μ related to the first SCS, and μ3 denotes a value of related to the second SCS.

6. A user equipment (UE) configured to transmit and receive a signal in a wireless communication system, the UE comprising:
at least one transceiver;
at least one processor; and
at least one memory operably connected to the at least one processor and configured to store instructions that, when executed, cause the at least one processor to perform operations comprising:
receiving N control resource set #0s (CORESET #0s) based on a first subcarrier spacing (SCS); and
receiving N synchronization signal blocks (SSBs) based on a second SCS different from the first SCS,
wherein the SSBs are continuously located in a time domain, and
wherein the CORESET #0s are located in a slot including an earliest SSB in the time domain among the SSBs, and the CORESET #0s are continuously located from symbol #0 in the slot.

7. The UE of claim 6, wherein the first SCS is twice the second SCS.

8. The UE of claim 7, wherein a first extended cyclic prefix (ECP) is applied to the CORESET #0s, and
wherein a second ECP is applied to the SSBs.

9. The UE of claim 8, wherein the first ECP is configured such that a length of one slot with a reference SCS matches a length of M slots,
wherein the second ECP is configured such that the length of the one slot with the reference SCS matches a length of L slots,
wherein M and L are $2^{\mu2-\mu1}$ and $2^{\mu3-\mu1}$, respectively, and
wherein μ1 denotes a value of μ related to the reference SCS, μ2 denotes a value of μ related to the first SCS, and μ3 denotes a value of μ related to the second SCS.

10. The UE of claim 8, wherein the first ECP is configured such that a length of a half-slot with a reference SCS matches a length of M slots,
wherein the second ECP is configured such that the length of the half-slot with the reference SCS matches a length of L slots,
wherein M and L are $2^{\mu2-\mu1-1}$ and $2^{\mu3-\mu1-1}$, respectively, and
wherein μ1 denotes a value of μ related to the reference SCS, μ2 denotes a value of μ related to the first SCS, and μ3 denotes a value of μ related to the second SCS.

11. An apparatus for a user equipment (UE), the apparatus comprising:
at least one processor; and
at least one computer memory operably connected to the at least one processor and configured to, when executed, cause the at least one processor to perform operations comprising:

receiving N control resource set #0s (CORESET #0s) based on a first subcarrier spacing (SCS); and receiving N synchronization signal blocks (SSBs) based on a second SCS different from the first SCS, wherein the SSBs are continuously located in a time domain, and wherein the CORESET #0s are located in a slot including an earliest SSB in the time domain among the SSBs, and the CORESET #0s are continuously located from symbol #0 in the slot.

12. The apparatus of claim 11, wherein the first SCS is twice the second SCS.

13. The apparatus of claim 12, wherein a first extended cyclic prefix (ECP) is applied to the CORESET #0s, and wherein a second ECP is applied to the SSBs.

14. The apparatus of claim 13, wherein the first ECP is configured such that a length of one slot with a reference SCS matches a length of M slots, wherein the second ECP is configured such that the length of the one slot with the reference SCS matches a length of L slots, wherein M and L are $2^{\mu 2-\mu 1}$ and $2^{\mu 3-\mu 1}$, respectively, and wherein $\mu 1$ denotes a value of $\mu$ related to the reference SCS, $\mu 2$ denotes a value of $\mu$ related to the first SCS, and $\mu 3$ denotes a value of $\mu$ related to the second SCS.

15. The apparatus of claim 13, wherein the first ECP is configured such that a length of a half-slot with a reference SCS matches a length of M slots, wherein the second ECP is configured such that the length of the half-slot with the reference SCS matches a length of L slots, wherein M and L are $2^{\mu 2-\mu 1-1}$ and $2^{\mu 3-\mu 1-1}$, respectively, and wherein $\mu 1$ denotes a value of $\mu$ related to the reference SCS, $\mu 2$ denotes a value of $\mu$ related to the first SCS, and $\mu 3$ denotes a value of $\mu$ related to the second SCS.

* * * * *